US009633526B2

(12) United States Patent
Polis

(10) Patent No.: US 9,633,526 B2
(45) Date of Patent: Apr. 25, 2017

(54) ELECTRONIC GAMING DEVICE WITH NEAR FIELD FUNCTIONALITY

(71) Applicant: Cadillac Jack, Inc., Duluth, GA (US)

(72) Inventor: Matthew Jarrett Polis, Alpharetta, GA (US)

(73) Assignee: Cadillac Jack, Inc., Duluth, GA (US)

( * ) Notice: Subject to any disclaimer, the term of this patent is extended or adjusted under 35 U.S.C. 154(b) by 316 days.

(21) Appl. No.: 14/262,353

(22) Filed: Apr. 25, 2014

(65) Prior Publication Data

US 2015/0310698 A1 Oct. 29, 2015

(51) Int. Cl.

*A63F 13/00* (2014.01)
*G07F 17/34* (2006.01)
*G07F 17/32* (2006.01)

(52) U.S. Cl.

CPC ............ *G07F 17/34* (2013.01); *G07F 17/323* (2013.01); *G07F 17/3237* (2013.01); *G07F 17/3206* (2013.01)

(58) Field of Classification Search

None
See application file for complete search history.

(56) References Cited

U.S. PATENT DOCUMENTS

| | | | | | |
|---|---|---|---|---|---|
| 2004/0053688 | A1* | 3/2004 | Hosaka | G07F 17/3211 | 463/30 |
| 2005/0239546 | A1* | 10/2005 | Hedrick | G07F 17/0014 | 463/29 |
| 2007/0259717 | A1* | 11/2007 | Mattice | A63F 3/00157 | 463/36 |
| 2007/0270224 | A1* | 11/2007 | Abbott | G07F 17/32 | 463/42 |
| 2008/0318656 | A1* | 12/2008 | Walker | G07F 17/32 | 463/20 |
| 2009/0118002 | A1* | 5/2009 | Lyons | G07F 17/32 | 463/29 |
| 2010/0227670 | A1* | 9/2010 | Arezina | G07F 17/32 | 463/25 |
| 2010/0234094 | A1* | 9/2010 | Gagner | G07F 17/32 | 463/20 |
| 2010/0279755 | A1* | 11/2010 | Pacey | G07F 17/3211 | 463/6 |
| 2012/0142403 | A1* | 6/2012 | Prather | G06Q 20/10 | 463/13 |
| 2013/0023337 | A1* | 1/2013 | Bowers | G07F 17/32 | 463/25 |
| 2013/0324219 | A1* | 12/2013 | Vann | G07F 17/32 | 463/25 |
| 2014/0045586 | A1* | 2/2014 | Allen | G07F 17/3288 | 463/25 |

* cited by examiner

*Primary Examiner* — Jason Yen
(74) *Attorney, Agent, or Firm* — Weide & Miller, Ltd.

(57) ABSTRACT

Examples disclosed herein relate to an electronic gaming device including a memory, a processor, and a plurality of reels. The memory may include one or more near field modules. A processor may generate one or more symbols to be located in the one or more areas. The processor may initiate one or more game play functions based on location data.

7 Claims, 50 Drawing Sheets

ELECTRONIC GAMING DEVICE WITH NEAR FIELD FUNCTIONALITY

FIELD

The subject matter disclosed herein relates to an electronic gaming device. More specifically, the disclosure relates to providing one or more near field functionalities on a gaming device.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successfully matches the predetermined winning symbols in one of the predetermined patterns.

A player's entertainment while playing one or more games may be enhanced by utilizing one or more near field functionalities on the gaming device. By increasing the player's entertainment level, the player's enjoyment of the game may be enhanced, which may increase a player's game playing period.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
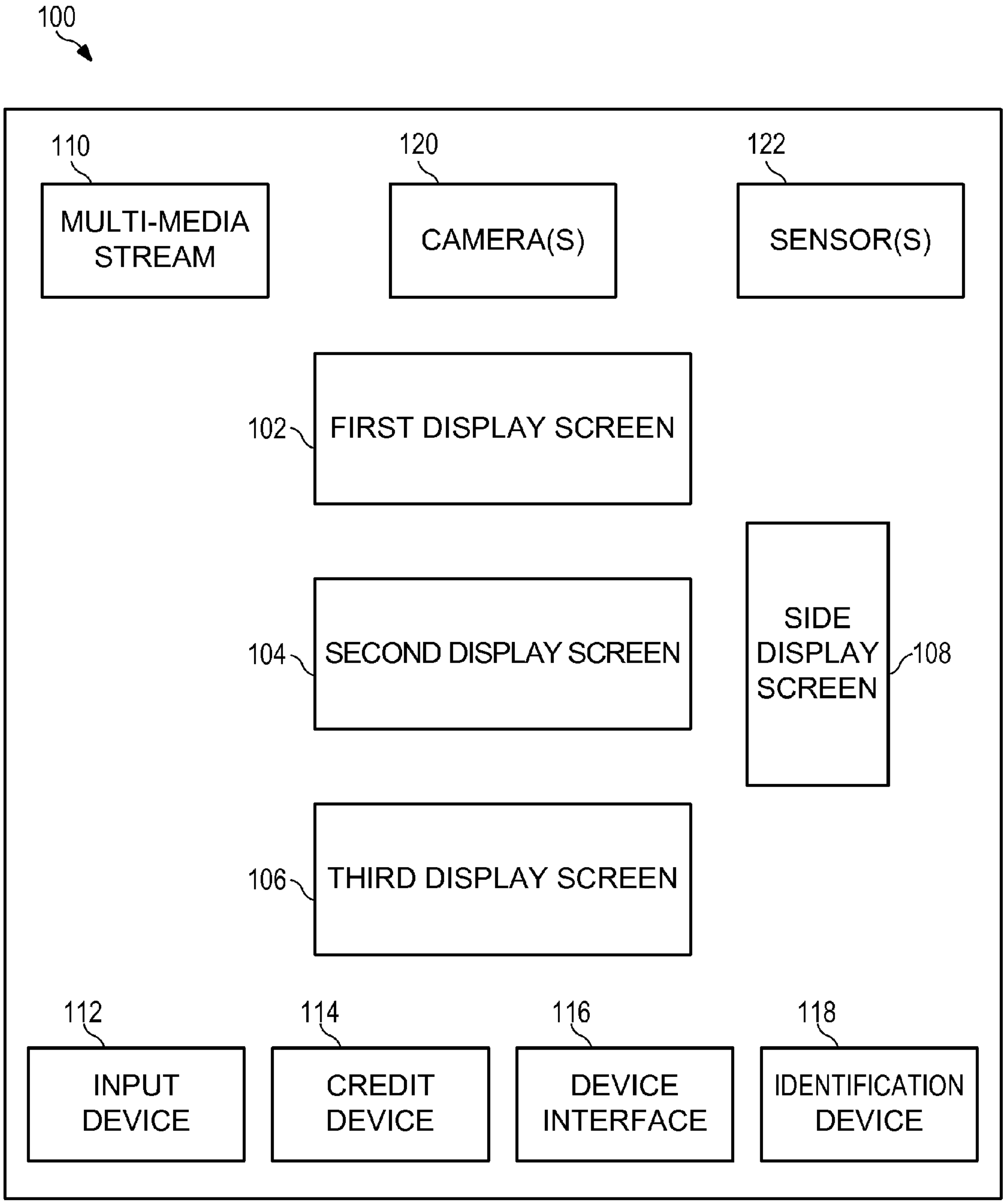
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to select one or more near field gaming options, to make a wager, to make a pseudo wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, a near field gaming option may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include near field gaming options only. Therefore, only games which include near field gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to one or more audio devices, one or more display devices, one or more electrical wires, one or more springs, one or more motors, one or more adjustable devices, and/or one or more sensors, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

One or more cameras 120 and/or one or more sensors 122 may be utilized as one or more depth image sensing devices, which may be located in various locations, including but not limited to, above the base display, above second display, in one or more locations on gaming cabinet front, on a side of the gaming cabinet other than gaming cabinet front, and/or any other location.

In one embodiment, electronic gaming device 100 may not include separate one or more input devices, but instead may only utilize one or more depth image sensing devices. In another embodiment, a player may utilize one or more input devices and/or may utilize gestures that electronic gaming device 100, via one or more depth image sensing devices, recognizes in order to make inputs for a play of a game. A player may interact with electronic gaming device 100 via one or more depth image sensing devices for a plurality of various player inputs.

In one embodiment, one or more depth image sensing devices may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

Electronic gaming device 100 may include at least one display device. Electronic gaming device 100 may include a base display and/or a second display. In one embodiment, base display may be the primary display for a first game and/or one or more near field games. In another embodiment, second display may be the primary display for a second, bonus game, and/or one or more near field games. For example, base display may display: a reel-type video slot game; and upon a bonus game triggering condition; second display may display a bonus game; and upon a near field game feature triggering event; first and/or second display (and/or Nth displays) may display a near field game feature. In various examples, the reserving an electronic gaming device function may be initiated and/or displayed on a first screen, a second screen, an Nth screen, and/or any combination thereof. In one example, a reserved game play function for a first player may be initiated, displayed, and played on a first screen of the electronic gaming device while a normal game play function for a second player may be initiated, displayed, and played on a second screen of the electronic gaming device.

In one embodiment, base display and second display may display separate portions of a common image. For example, second display may display a top portion of a wheel spinning while base display may display the bottom portion of the same wheel spinning.

Electronic gaming device 100 may also include one or more speakers. In one embodiment, one or more speakers may work in a synchronized manner to provide a surround sound effect. For example, as an object is displayed moving across base display from left to right, one or more speakers may produce sound in such a manner as to create an audible sense of similar left to right movement. In another embodiment, one or more speakers may work asynchronously. In a further embodiment, a first speaker may produce sounds associated with a first symbol appearing in a play of a game, and a second speaker may produce sounds associated with a second symbol appearing in a play of the game.

Figure 2:
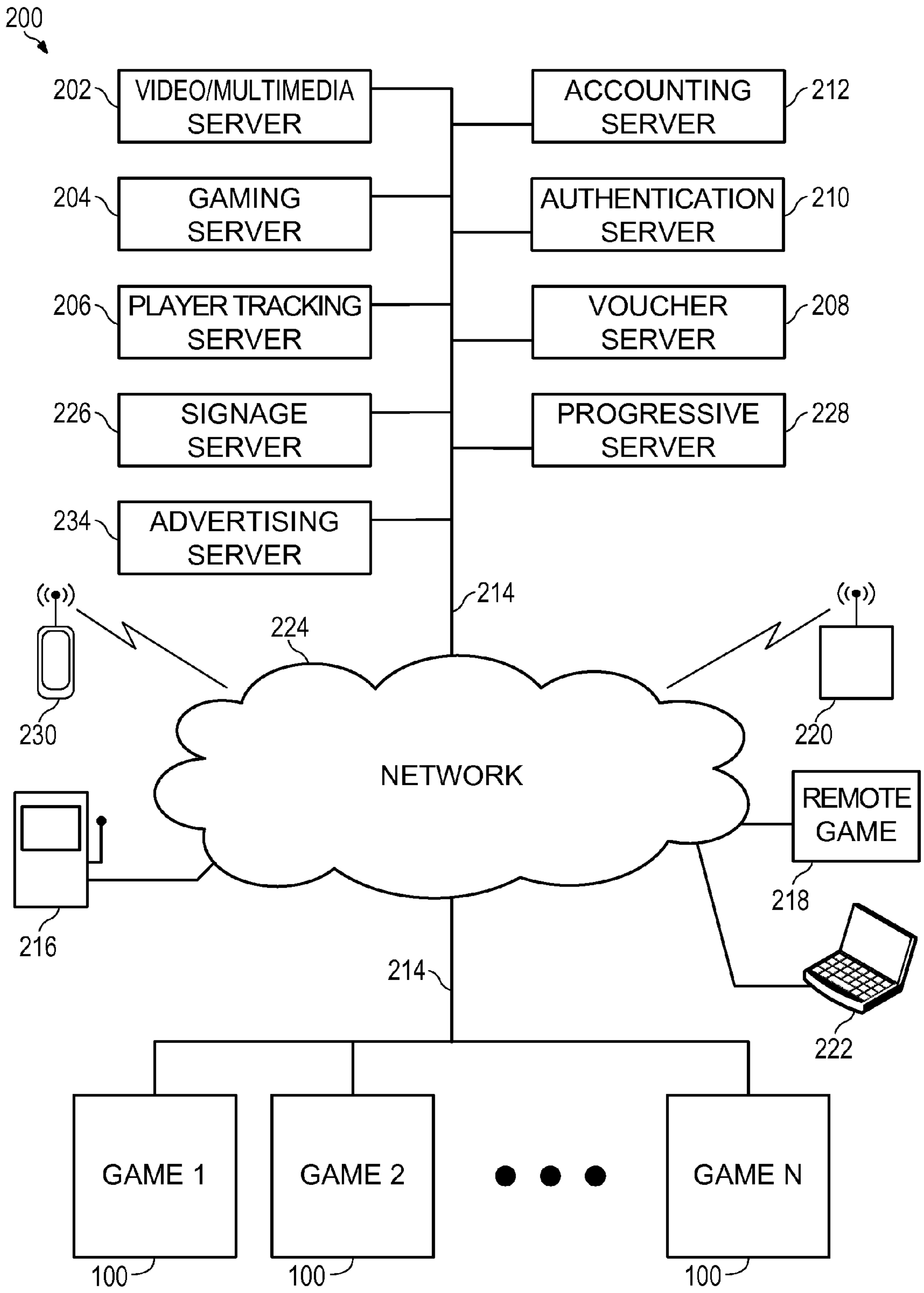
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities (including near field wagers) to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of: a near field game feature functionality; a near field game feature evaluation functionality; a payout functionality; a base and/or bonus game play functionality; a base and/or bonus game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include near field wagering data and/or payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, near field wagering data, and/or other transaction data. Transaction data may include the number of wagers, the size of these wagers, the date and time for these wagers, the identity of the players making these wagers, the frequency of the wagers, and/or verification data, and/or confirmation data. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play and/or near field wagering data for one or more electronic gaming devices 100 and/or other events. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Searching server 232 may implement a search on one or more gaming devices to obtain gaming data. Searching server 232 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 232 may implement a wagering function, which may be an automatic wagering mechanism. These functions of searching server 232 may be integrated into one or more servers.

Searching server 232 may include one or more searching structures, one or more searching algorithms, and/or any other searching mechanisms. In general, the search structures may cover which EGMs paid out the most money during a time period, which EGMs kept the most money from players during a time period, which EGMs are the most popular (e.g., top games), which EGMs are the least popular, which EGMs have the most amount of money bet during a period, which EGMs have the highest bet volume, which EGMs are more volatile (e.g., volatility, or deviation from the statistical norms of bet volume, bet amount, pay out, etc.) during a time period, and the like. These searches may also be associated with location queries, time queries, and/or people queries (e.g., where are the electronic gaming machines that allow persistent game play options, where are the table games that most of my friends bet on, where are my favorite EGMs, what are players betting on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., a first EGM type, a second EGM type, etc.). Searching structure may search one or more of these games. In one example, a player may utilize a searching function to find one or more games that allow persistent game play options and/or to find one or more specific game types (e.g., game theme 1) which the player may utilize to reload their persistent game configuration data and/or to restart a specific game type game play.

In another example, the searching structure may be based on a player's preferences, past transactional history, player input, a particular EGM, a particular casino, a particular location within a casino, game outcomes over a time period, payout over a time period, and/or any other criteria.

Figure 3:
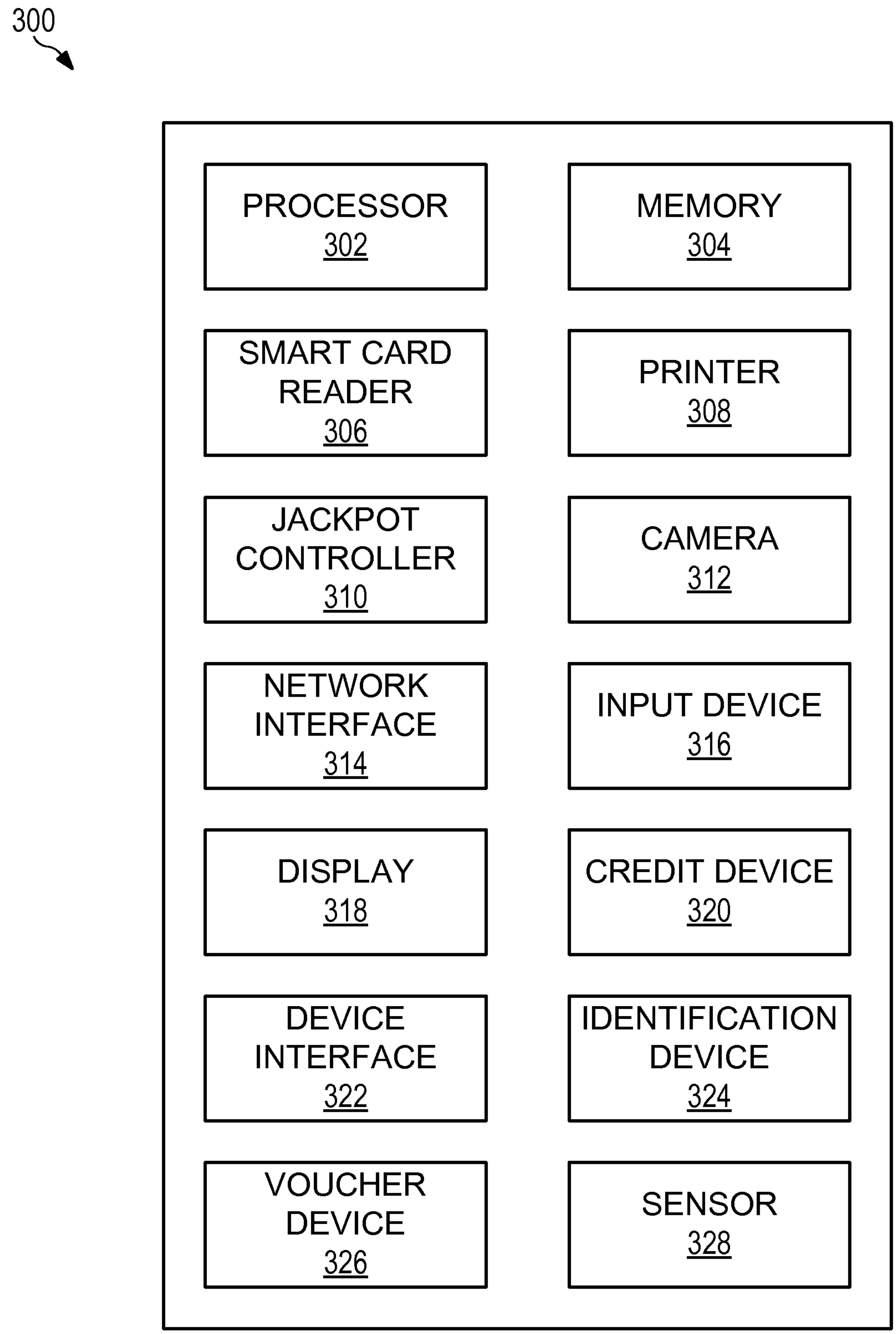
FIG. 3 is a block diagram of the electronic gaming device, according to one embodiment.

FIG. 3 shows a block diagram 300 of electronic gaming device 100.

Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher and/or a persistent game play receipt (and/or any other form). Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, persistent game play data receipts, near field wager payouts, near field wagering vouchers, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine his or her picture may be taken to include his or her image into the game play. A picture of a player may be an actual image as taken by camera 312. A picture of a player may be a computerized caricature (i.e., avatar) of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes and/or a validating procedure (e.g., persistent gaming receipt validation, etc.). For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212, and/or any other near field wagering related server (e.g., server to confirm another event (e.g., a horse race, football game, etc.)).

Input device 316 may be mechanical buttons, electronic buttons, a touch screen, and/or any combination thereof. Input device 316 may be utilized to make a wager, to make a pseudo wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one of one or more audio devices, one or more display devices, one or more electrical wires, one or more springs, one or more motors, one or more adjustable devices, and/or one or more sensors, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
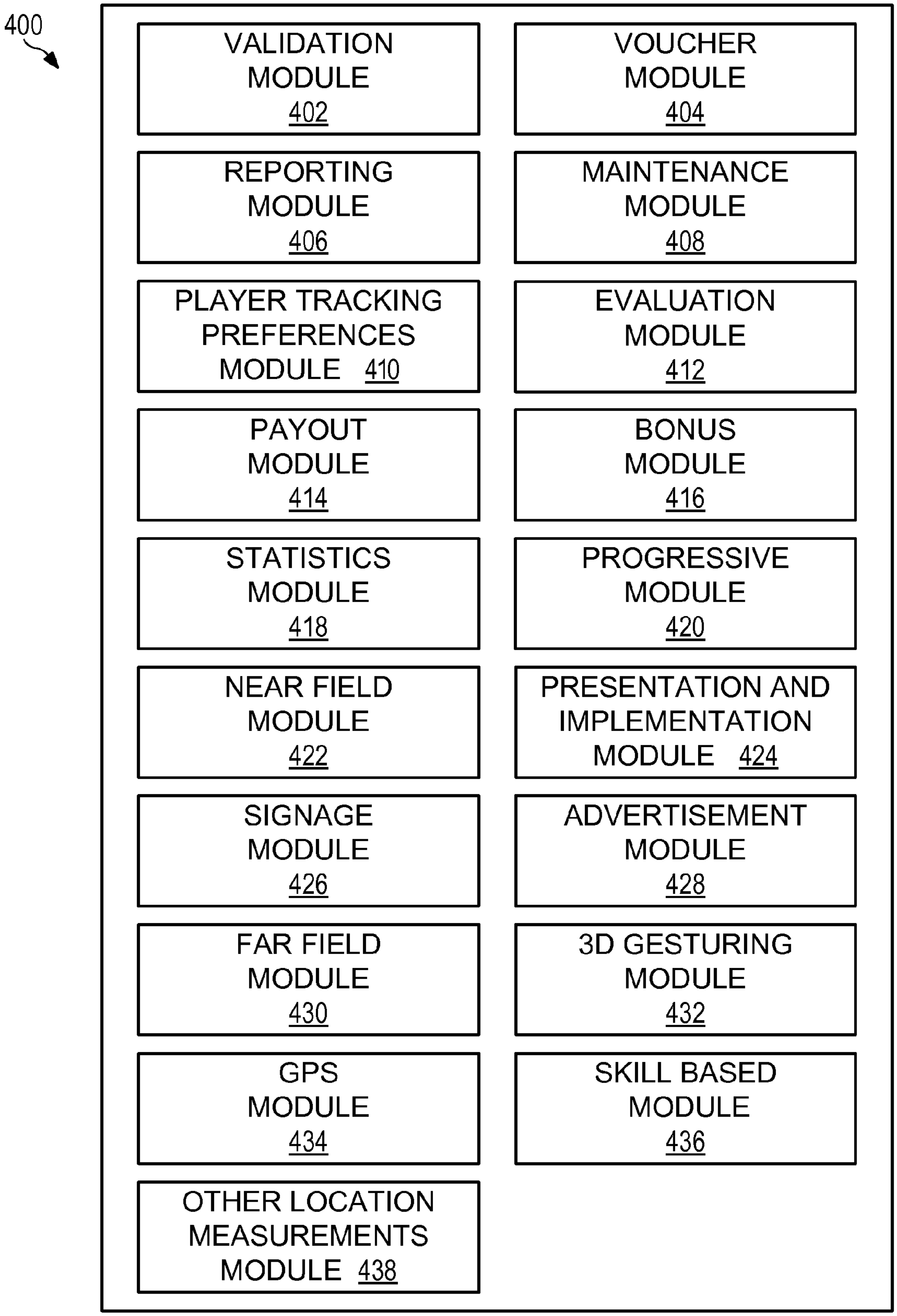
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an animation module, a game evaluation module 412, a payout module 414, a sensor module, a scene module, a sensor and scene evaluation module, a sensor and scene output module, a reference models module, an audio module, an audio device adjustment module, a display device adjustment module, a bonus module 416, a statistics module 418, a progressive module 420, a near field game module 422, a presentation and implementation module 424, a tracking module, a signage module 426, an advertisement module 428, a subscription-based progressive module, a pseudo module, a skill-based module 436, a far field module 430, a 3D gesturing module 432, a GPS module 434, a scatter module, a wild module, a mobile device module, other location measurements module 438, and a game configuration module.

Validation module 402 may utilize data received from voucher device 326 to confirm the validity of the voucher and/or a persistent gaming data (e.g., a persistent gaming receipt validation procedure).

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Animation module may generate, compile, transmit, and/or store one or more animations and/or presentations based on one or more scene data, one or more scenes, one or more reference models, one or more game play data, one or more player profiles, and/or any combination thereof.

Game evaluation module 412 may evaluate one or more outcomes for one or more events relating to game play.

Payout module 414 may determine one or more payouts which may relate to one or more inputs received from the player, electronic gaming device 100, and/or electronic gaming system 200.

Sensor module may generate, compile, transmit, and/or store any data relating to one or more scene data, one or more scene, and/or any other sensor data. This data may include one or more gestures (e.g., body movement made by one or more players).

Scene module may generate, compile, transmit, and/or store on one or more scene data, one or more scenes, one or more reference models, one or more game play data, one or more player profiles, and/or any combination thereof.

Sensor and scene evaluation module may evaluate any data stored on, transmitted to, and/or transmitted from sensor module and scene module. Sensor and scene evaluation module may obtain data including one or more gestures (e.g., body movement made by one or more players) from sensor module and compare this data to one or more body reference models, body part reference models, device reference models, gaming device reference models, floor plan reference models, and/or any other reference models from reference models module to determine one or more actions.

Sensor and scene output module may evaluate the combined output of sensor module and scene module.

Reference models module may generate, compile, transmit, and/or store one or more body reference models, body part reference models, device reference models, gaming device reference models, floor plan reference models, and/or any other reference models which can be utilized by any of the other modules.

Audio module may generate, compile, transmit, and/or store one or more audio structures, sound wave configurations, and/or any other audio data.

Audio device adjustment module may adjust one or more audio devices. These devices may be adjusted physically (e.g., moved) and/or by changing one or more device characteristics.

Display device adjustment module may adjust one or more display devices. These devices may be adjusted physically (e.g., moved) and/or by changing one or more device characteristics.

Bonus module 416 may generate a bonus game, evaluate the results of the bonus game, trigger bonus game presentations, generate bonus game payouts, and/or display any data relating to the bonus game.

Statistics module 418 may be used to maintain data relating to historical game play (including pseudo wagering data—(dollar amount, credit amount, spins, credits per line bet, time period, maximum win amount, one or more triggering events to stop game play, etc.)) for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Progressive module 420 may generate, transmit, compile, and/or store one or more data points relating to one or more progressives and/or subscription progressives (e.g., a progressive a player selects and pays to enter).

Near field game module 422 may generate, transmit, compile, and/or store one or more data points and/or presentations relating to one or more near field gaming options and/or near field gaming functions.

Presentation and implementation module 424 may generate, transmit, compile, implement, and/or store one or more presentations.

Tracking module may generate, transmit, compile, and/or store one or more data points related to tracking one or more near field wagers and/or near field wager players.

Signage module 426 may generate, transmit, compile, initiate, and/or store one or more presentations for one or more signs.

Advertisement module 428 may generate, transmit, compile, present, implement, initiate, and/or store one or more advertisements.

Searching module may implement a search on one or more gaming devices to obtain gaming data. Searching module may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching module may implement a wagering function, which may be an automatic wagering mechanism. These functions of searching module may be integrated into one or more servers.

Searching module may include one or more searching structures, one or more searching algorithms, and/or any other searching mechanisms. In general, the search structures may cover which EGMs paid out the most money during a time period, which EGMs kept the most money from players during a time period, which EGMs are the most popular (e.g., top games), which EGMs are the least popular, which EGMs have the most amount of money bet during a period, which EGMs have the highest bet volume, which EGMs are more volatile (e.g., volatility, or deviation from the statistical norms of bet volume, bet amount, pay out, etc.) during a time period, and the like. These searches may also be associated with location queries, time queries, and/or people queries (e.g., where are the near field game play functionality games, where are theme 1 gaming machines, where are the table games that most of my friends bet on, where are my favorite EGMs, what are players betting on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., a first EGM type, a second EGM type, etc.). Searching structure may search one or more of these games.

In another example, the searching structure may be based on a player's preferences, past transactional history, player input, a particular EGM, a particular casino, a particular location within a casino, game outcomes over a time period, payout over a time period, and/or any other criteria.

Wild module 432 may generate a wild game, evaluate the results of the wild game, trigger wild game presentations, generate wild game payouts, and/or display any data relating to the wild game. Further, wild module may determine one or more outcomes of one or more interactions (e.g., collisions of one or more symbols).

Scatter module 430 may generate a scatter game, evaluate the results of the scatter game, trigger scatter game presentations, generate scatter game payouts, and/or display any data relating to the scatter game.

Near field evaluation module 438 may evaluate one or more outcomes for one or more events relating to near field game play. Further, near field evaluation module may determine one or more outcomes of one or more interactions and/or one or more skill based (semi-skilled and/or perceived skill based) game inputs.

Advertisement module 428 may generate, compile, transmit, and/or store advertisement information relating to one or more near fields, subscription based progressive, and/or any other gaming feature. These advertisements may be presented on one or more display screens, an internet website, and/or any other advertisement avenue.

Subscription-based progressive module may generate, compile, transmit, and/or store one or more subscription based progressive structures and/or any other data relating to one or more subscription based progressive structures and/or subscription based near field game play.

3D gesturing module 432 may generate, compile, transmit, and/or store one or more data points, presentations, reference modules, and/or structure relating to any aspect of 3D gesturing.

Pseudo module may generate, transmit, compile, and/or store one or more data points and/or presentations relating to one or more pseudo gaming options and/or pseudo gaming wagers.

Skill-based module 436 may generate, compile, store, and/or transmit one or more skill-based structures and/or one or more skill-based tournament structures. Skill-based evaluation module may evaluation one or more outcomes of one or more skill-based games and/or skill-based tournament games.

Mobile device module may generate, compile, store, and/or transmit one or more data relating to the mobile device. Further, mobile device module 434 may interact and communicate with mobile device to transfer and/or receive data from and/or to mobile device.

Game configuration module may generate, compile, store, and/or transmit one or more game configuration data. Further, mobile device may also include a game configuration module.

Far field module 430 may generate, compile, store, and/or transmit one or more locational data points.

GPS module 434 may generate, compile, store, and/or transmit one or more locational data points.

Other location measurements module 438 may generate, compile, store, and/or transmit one or more locational data points.

Installation verification module may verify the installation parameters on one or more of audio devices, one or more display devices, one or more electrical wires, one or more springs, one or more motors, one or more adjustable devices, and/or one or more sensors to one or more reference data points. Installation verification module may generate a warning when the data points are outside of a specific parameter range. One or more warnings may be transmitted to an external device, a server, a mobile device, and/or a warning display on electronic gaming device 100 based on the verification data.

Locking module may control the locking mechanism for one or more audio devices, one or more display devices, one or more electrical wires, one or more springs, one or more motors, one or more adjustable devices, and/or one or more sensors. Locking module may control any locking mechanism for electronic gaming device 100. Locking module may generate a warning when a locking data point is outside of a specific parameter. These warnings may be transmitted to an external device, a server, a mobile device, and/or a warning display on electronic gaming device 100.

It should be noted that one or more modules may be combined into one module. Further, there may be one evaluation module where the determined payout does not depend on whether there were any wild symbols, scatter symbols, treasure based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

In one embodiment, a system, device, and/or method may offer bets that are dependent on a function of a primary slot machine and/or any other device. For example, a second window may open on a primary game screen (and/or any other display and/or any other output device) that offers a wager on the outcome of the next game (e.g., spin, etc.). In one example, the pseudo wagering option may be whether the next game (e.g., spin, etc.) will be a winner or a loser. The player may make the wager and play the game. If the results of the game play is consistent with the player's bet, the player wins and is awarded a prize. In one example, the gaming system does not determine the outcome of the future game play before the wager and/or odds are accepted and/or created. In this example, this pseudo gaming option may not need to be approved as a gaming device and may not be subject to the rigorous standards of a regulated gaming device. In this example, an accounting system that accepts bets and pays winning bets may be utilized. In these examples, the player is betting on some characteristic of slot machine play and/or another verifiable event outcome.

In one example, the types of pseudo wagers that can be accepted are not relegated to the outcomes of the player's slot machine. In various examples, the possibilities for betting options are related to the events and/or occurrences that can be observed, recorded, and/or verified by the system. For example, one wagering option may be whether the progressive jackpot will be triggered and/or hit in the next 3 minutes and/or next 10 spins. In another example, one wagering option may be whether another person (e.g., a friend, a wife, a husband, a stranger, etc.) will win on the next spin. In this example, a loyalty card (and/or some other identification method) may be utilized to identify the player and/or a specific gaming device identification number may be utilized. In another example, one wagering option may be whether the mystery progressive will be hit (e.g., won) before it reaches a certain number (e.g., $300, $1,000, etc.).

In another example, the credits for the wager and the winnings may be moved to and from the primary gaming device through automatic fund transfer ("AFT") transactions from the system. Further, the system may act as the book maker for the bets. The system may meter and account for all transfers in total and by each game in which pseudo wagers have been made.

In another example, the system may determine the one or more event outcomes via SAS communications, communications with a class II server, and/or other communication protocol and/or other forms of communication methods. The system may record one or more outcomes for the wager and relays the results to the player and/or one or more EGMs. In addition, the system may allow for a ticket to be printed as a pseudo wager receipt but this may not be necessary as the pseudo wager information is already stored on the system. In addition, in cases where the pseudo wager cannot be completed, the pseudo wager may be returned to the player or to the player's account. In various examples, one or more rules may be implemented for pseudo wagers that depend on an event occurring over a time period and/or as other events happen to prevent the player from trying to cancel wagers as a limit is approached. For example, a player may want to cancel a bet that the next four spins will be winner once the second spin was not a winner. However, the system may not allow this.

Figure 5A:
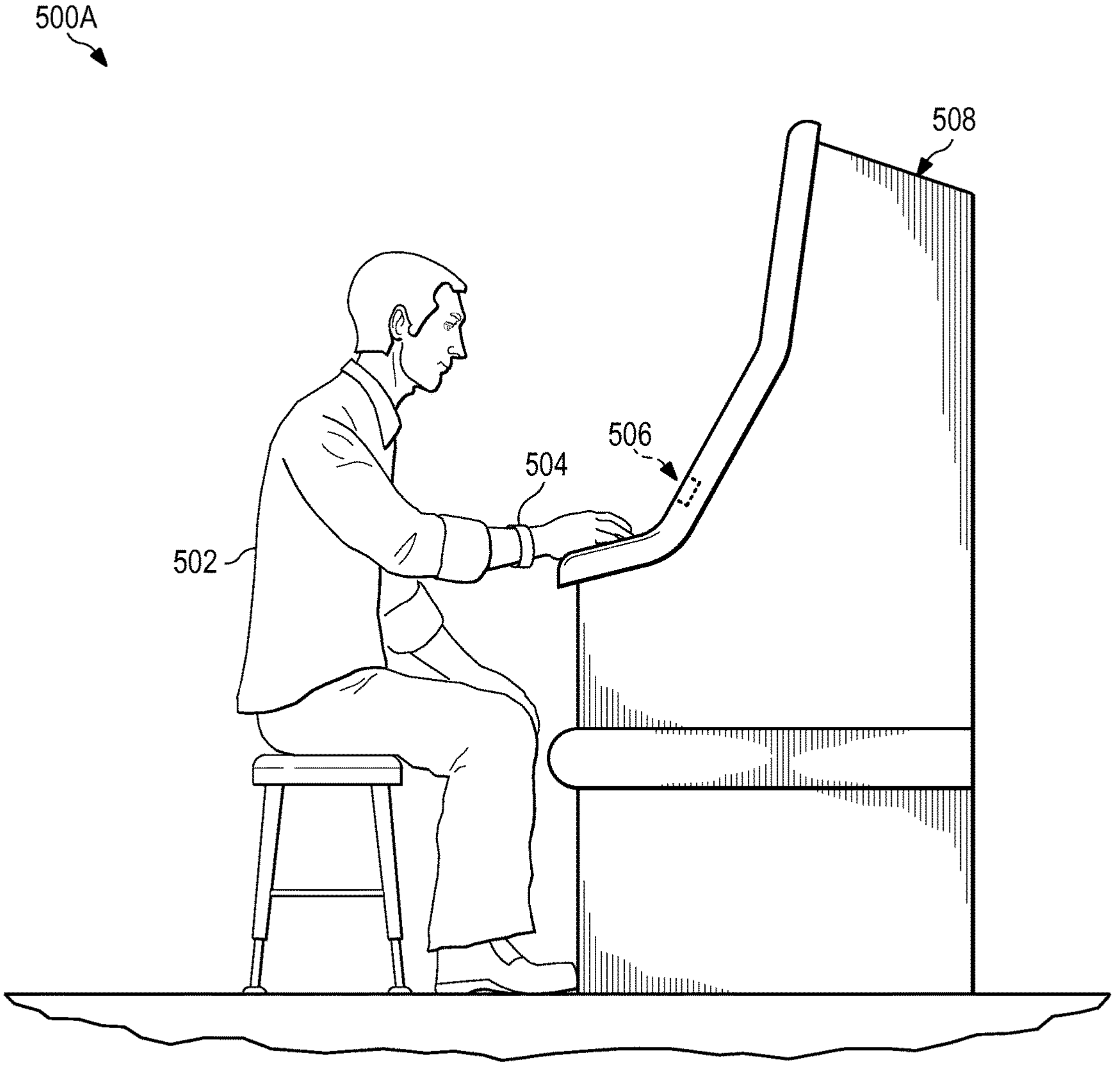
FIG. 5A is an illustration of game play on a gaming device, according to one embodiment.

In FIG. 5A, an illustration of a gaming device cabinet 508 is shown, according to one embodiment. A gaming device may include an overhead display, a side display, a main game display, a left speaker, a right speaker, one or more output devices (e.g., a ticket in/ticket out device), one or more sensors 506, and/or one or more input devices (e.g., buttons, bill validators, etc.). In one example, overhead display includes a leadership board sponsor and/or a ranking of tournament players. In this example, the XYZ company has sponsored the leadership board and the leadership board states "XYZ LEADER BOARD." In another example, leadership display may include data relating to one or more tournaments, such as, the time remaining (e.g., 1 HOUR 31 MINUTES REMAINING). In this example, side display may display a current mode of operation. For example, a current mode may be a tournament mode, a normal mode, a practice mode, a team mode, an individual mode, any combination thereof, etc. In this example, gaming device may include an output area, a near field player device 504 (the near field player device 504 may be independent and/or combined and/or interact with one or more sensors 506), a near field activation device, a near field voice activated device, and/or a near field motion activation device may be utilized to activate one or more near field functionalities.

Near field player device 504 may initiate one or more near field gaming functionality. For example, the near field activation may be initiated via a mechanical button. Further, near field voice activated device 518 may initiate one or more near field gaming functionality via a voice command. For example, the near field activation may be initiated via a voice command, such as, initiate near field game play and/or save game play. In addition, near field motion activation device may initiate one or more near field gaming functionality via a motion gesture. For example, the near field activation may be initiated via a gesturing motion, such as, arm wave, head nod, etc. Further, any of these functions (e.g., mechanical button, voice command, motion gesturing, etc.) may be combined to initiate one or more near field gaming functionality. In addition, the near field functionalities may be initiated because the near field device is within a predetermined range (e.g., a range where the near field device can interact with one or more sensors).

In various examples, loyalty point data; drink delivery; food delivery; dinner reservations; customizing a game (e.g., only x type, 3D games, etc.); free play awards; hotel reservations; bank transfers; and/or any player card function; and/or any other gaming entity function can be accomplished via the near field communication device.

The near field communication device movements may be utilized in skill-based games, semi-skill based game, non-skill based games, and/or perceived skill based games. For example, slashing motions, tennis motions, shooting motions, fishing motions, and/or any other motions may be implemented via the near field communication device. A player may be notified that a game is open to place via the near field communication device. The player may be able to reserve this device remotely utilizing their near field communication device. Further, the player may transfer credits to the electronic gaming device when they reserve the device. In addition, a bonus may be offered to the player if they start playing the gaming device within a specific time frame. The near field device may change colors back on a player's performance. If they are a big winner, then the device may turn green. Further, the near field device may be color coded to indicate the level of play of a player (e.g., black—best level player, gray—second best level player, etc.). Further, the near field device may change colors based on distance from a specific person (e.g., it turns red when you are close to your wife).

Figure 5B:
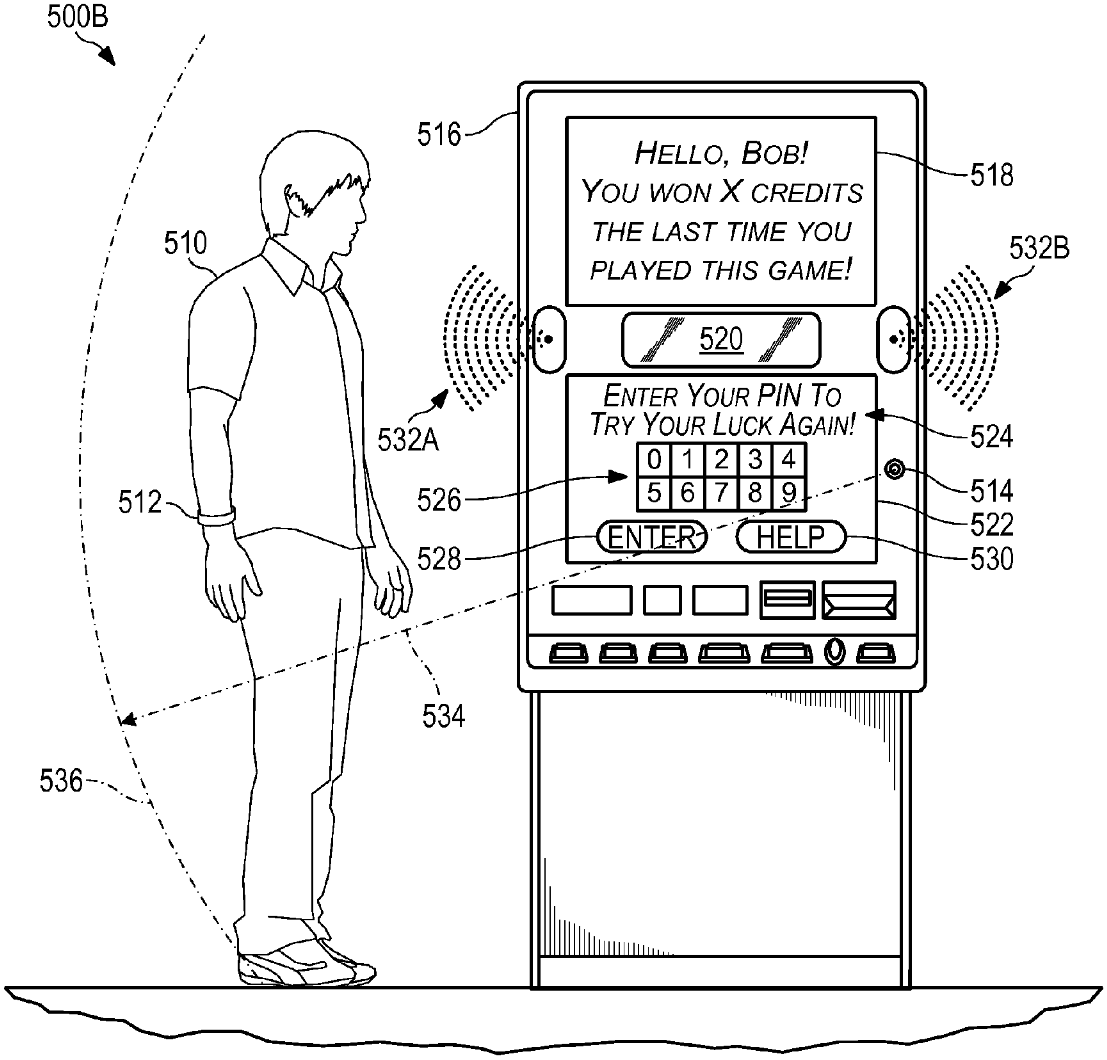
FIG. 5B is an illustration of a near field game play on a gaming device, according to one embodiment.
Figure 5C:
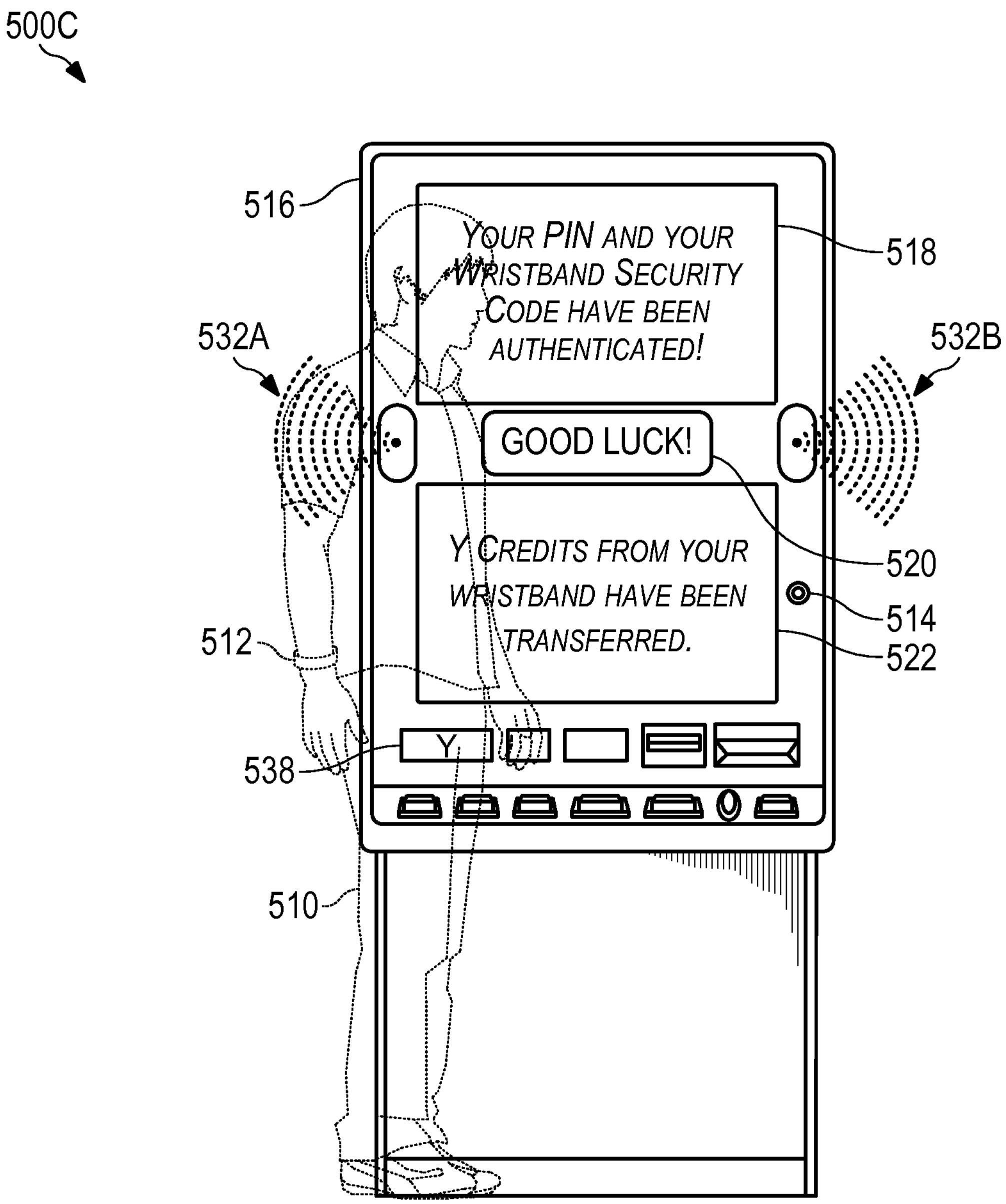
FIG. 5C is an illustration of near field game play on a gaming device, according to one embodiment.

In FIG. 5B, an illustration of a near field game play on a gaming device is shown, according to one embodiment. A first image 500B may include a player 510 wearing a near field player device 512 where the near field player device 512 is within a near field range 536 (via one or more sensors 514). In this example, an electronic gaming device 516 includes one or more sensors 514, a top display screen 518, a middle display screen 520, a bottom display screen 522, a left speaker 532A, a right speaker 532B, an enter button 528, a help button 530, a key entry area 526, and a message area 524. Message area 524 may state "ENTER YOUR PIN TO TRY YOUR LUCK AGAIN!" In this example, player 510 wearing near field player device 512 may enter a near field range 536. Based on the player entering the near field range 536, the electronic gaming device 516 may generate and/or display a message that states "HELLO, BOB! YOU WON X CREDITS THE LAST TIME YOU PLAYED THIS GAME!" In various examples, electronic gaming device 516 may generate and/or display any message based on player 510 entering the near field range 536. Further, electronic gaming device 516 may reconfigure (e.g., modify the game theme, set the bet per payline, set the music, and/or any other game characteristic) the electronic gaming device 516 based on the player 510 entering the near field range 536 while wearing the near field player device 512. In one example, one or more verification steps may be required to verify the player's identity. In one example shown in FIG. 5C, the player's entry of their PIN has been accepted by the electronic gaming device. The electronic gaming device may display the message of "YOUR PIN AND YOUR WRISTBAND SECURITY CODE HAVE BEEN AUTHENTICATED!" Further, credits may be transferred to electronic gaming device 516 via the near field player device 512 where the electronic gaming device 516 may acknowledge the transfer by stating "Y CREDITS FROM YOUR WRISTBAND HAVE BEEN TRANSFERRED." In addition, the Y credits may be displayed on a credit area 538 (e.g., by displaying Y).

Figure 5D:
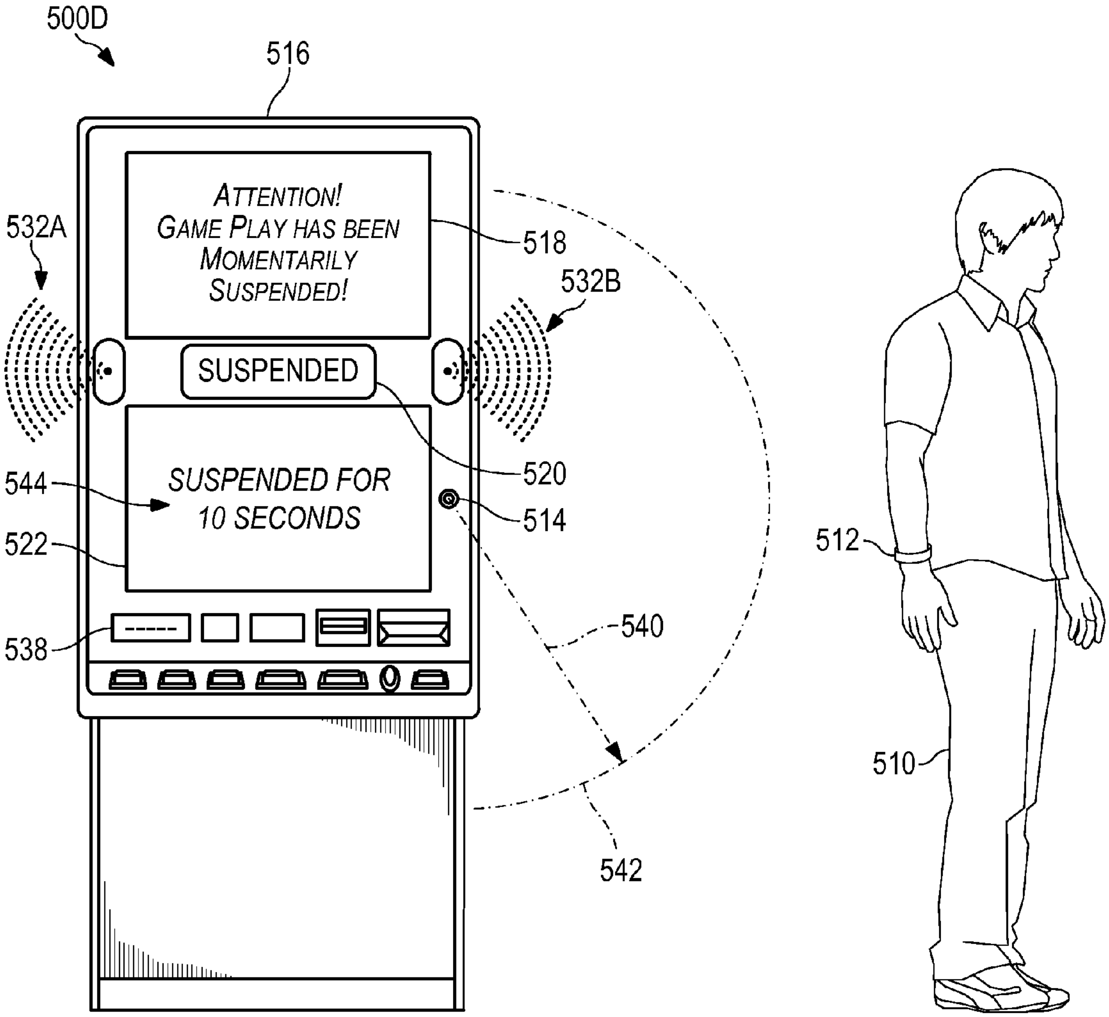
FIG. 5D is an illustration of near field game play on a gaming device, according to one embodiment.

In FIG. 5D, an illustration of near field game play on a gaming device is shown, according to one embodiment. In one example, player 510 may initiate game play (e.g., bet 5 credits on 10 paylines, bet maximum amount on all paylines, etc.) to automatically occur (e.g., without any other action by the player) while the player 510 (as determined by near field player device 512 and/or any other sensor detection method—3D sensors, etc.) is within a predetermined distance 542 of the electronic gaming device 516. If the player 510 is determined to have left the predetermined distance 542 via one or more interactions between near field player device 512, one or more sensors, and/or one or more player movements, then one or more processors may suspend game play for a predetermined time period (e.g., Suspended for 10 seconds, etc.) and/or generate one or more messages (e.g., Attention! Game play has been momentarily suspended! Please come closer to the gaming device.). The message may be transmitted via one or more speakers. Further, credit area 538 may be frozen and/or blanked out until the player either comes back within the predetermined range 542 and/or game play is discontinued. If the game play is discounted, then any credits remaining on the electronic gaming device 516 may be transferred (via one or more servers and/or any other devices) back to the player account and/or to near field player device 512.

Figure 5E:
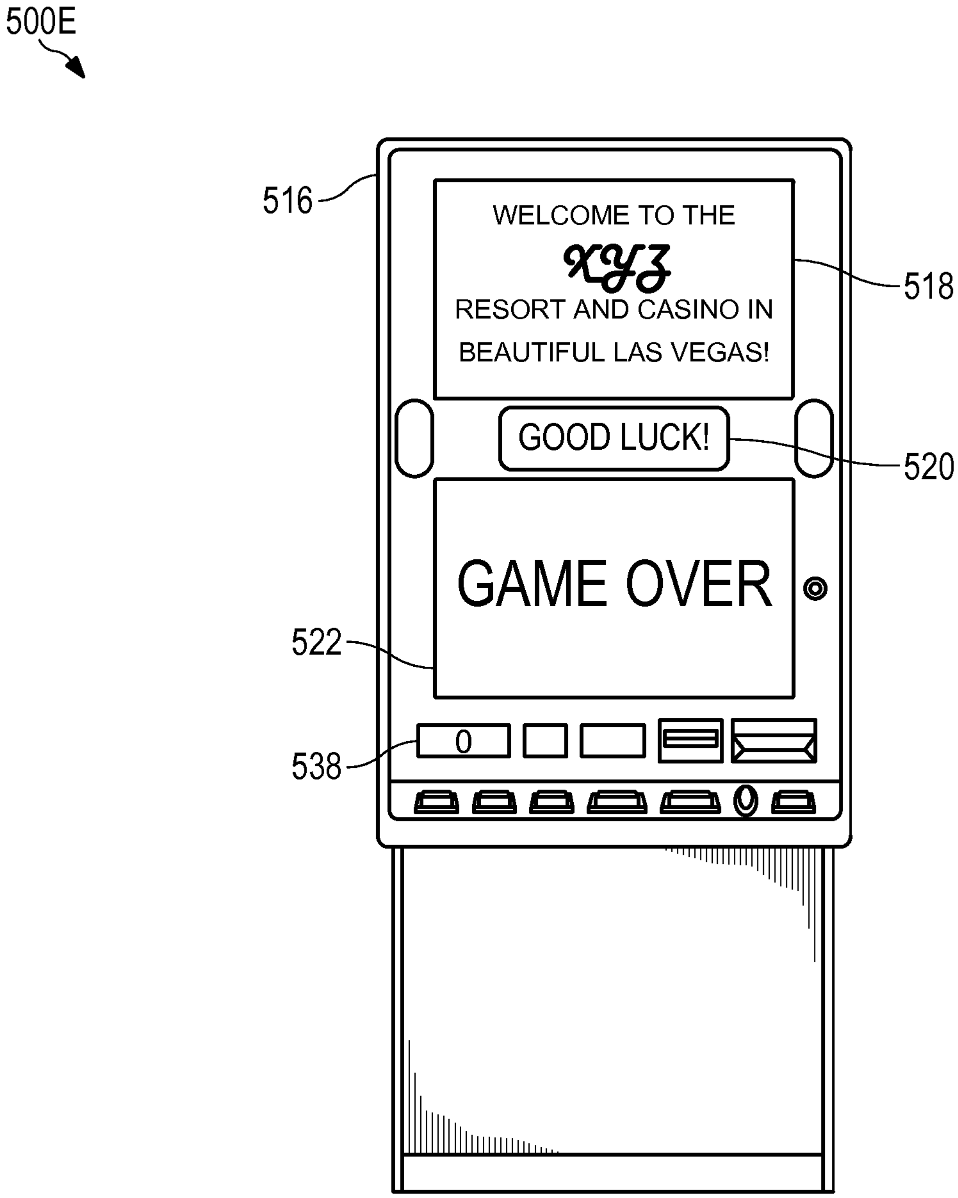
FIG. 5E is another illustration of near field game play on a gaming device, according to one embodiment.

In FIG. 5E, another illustration of near field game play on a gaming device is shown, according to one embodiment. In this example, based on a player (wearing a communication device) coming with a near field range (e.g., a communicate range), the electronic gaming device 516 may generate and/or display a message such as “WELCOME TO THE XYZ RESORT AND CASINO IN BEAUTIFUL LAS VEGAS! . . . GOOD LUCK!”

Figure 5F:
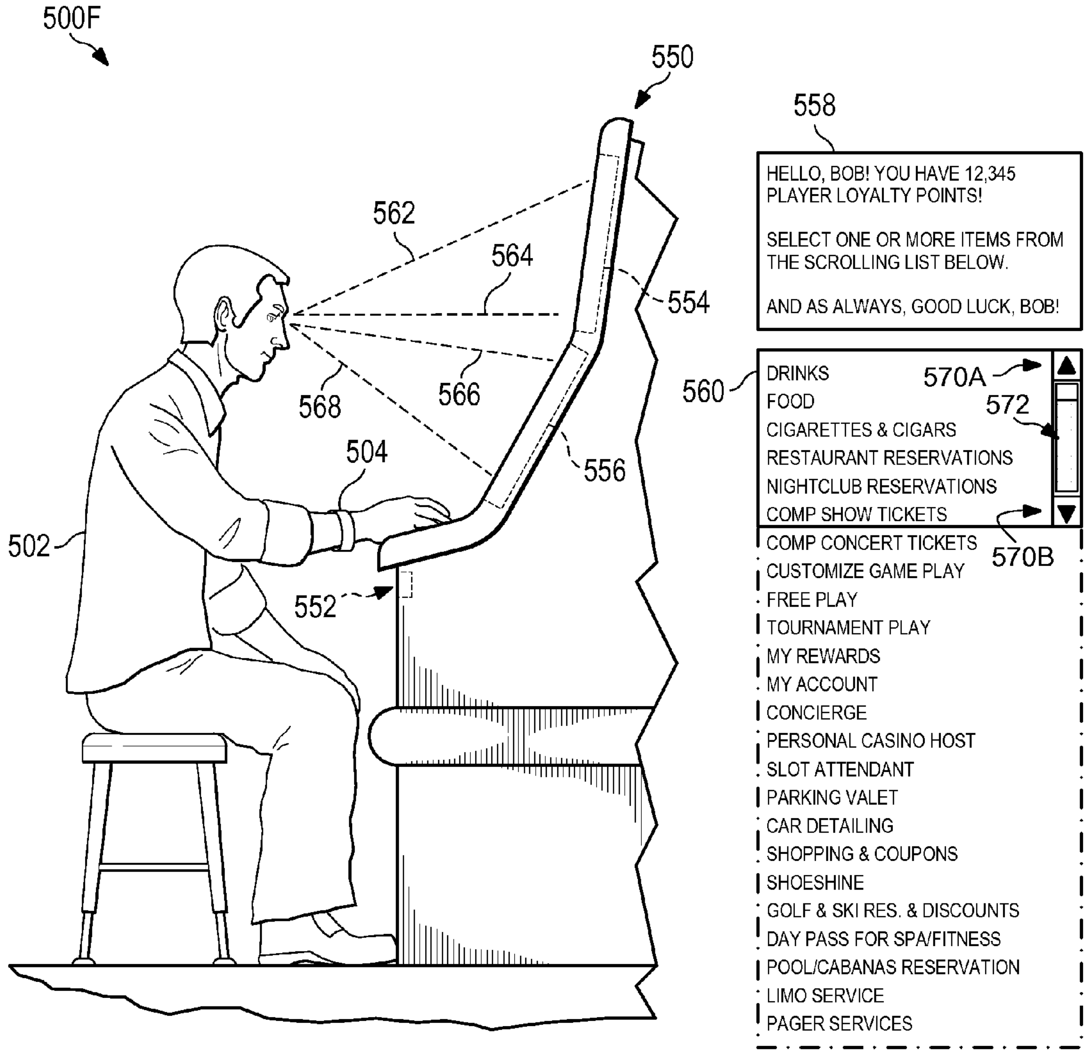
FIG. 5F is another illustration of near field game play on a gaming device, according to one embodiment.

In FIG. 5F, another illustration of near field game play on a gaming device is shown, according to one embodiment. In this example, a first display screen 554 and a second display screen 556 are located at angles that optimize a player’s view. The first display screen 554 and/or the second display screen 556 may be moved based on a player’s physical characteristics (e.g., height, eye location, etc.). Further, based on near field player device 504, the electronic gaming device 550 may determine one or more player loyalty data (e.g., the number of player points, the player preferences (e.g., gaming characteristics, betting style, etc.), and/or player redemption preferences (e.g., drinks, food, tickets, cigarettes, cigars, shopping, golfing, etc.). In one example, a message area 558 may state “HELLO, BOB! YOU HAVE 12,345 PLAYER LOYALTY POINTS! SELECT ONE OR MORE ITEMS FROM THE SCROLLING LIST BELOW.” The player may select one or more items via the scrollers (e.g., reference numbers 570A, 570B, and/or 572) based on a touch screen mechanism, an electronic button, a mechanical button, and/or by placing the near field player device 504 over and/or in proximity to the selection item.

Figure 5G:
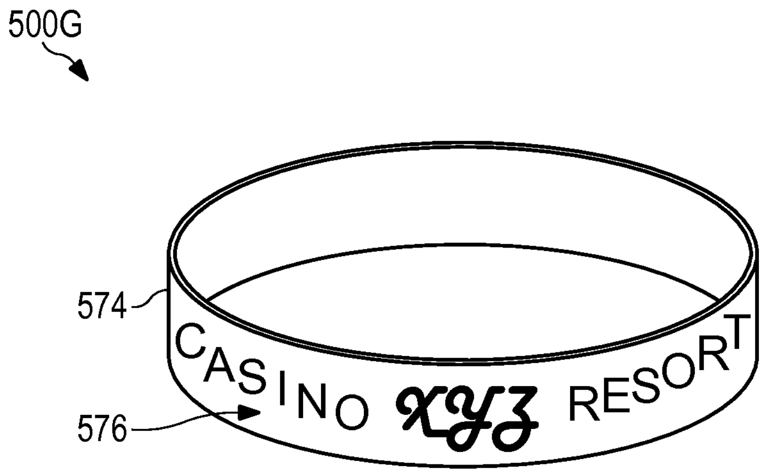
FIG. 5G is another illustration of near field game play on a gaming device, according to one embodiment.
Figure 5H:
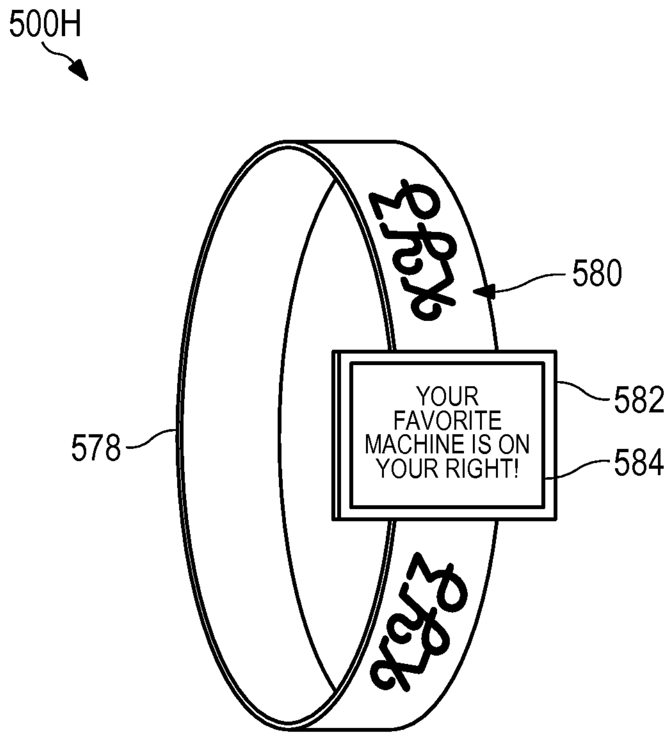
FIG. 5H is another illustration of near field game play on a gaming device, according to one embodiment.

In FIG. 5G, another illustration of near field game play on a gaming device is shown, according to one embodiment. In one example, a communication device 574 (e.g., near field device, mobile device, etc.) may be branded (e.g., a message area 576 may state “CASINO XYZ RESORT”). In another example shown in FIG. 5H, a near field player device 578 may include a branding message 580 (e.g., XYZ, etc.) and a display screen 582. Display screen 582 may display data relating to the resort, the person, one or more gaming devices, and/or any other data. For example, display screen 582 may state “YOUR FAVORITE MACHINE IS ON YOUR RIGHT!”.

Figure 6A:
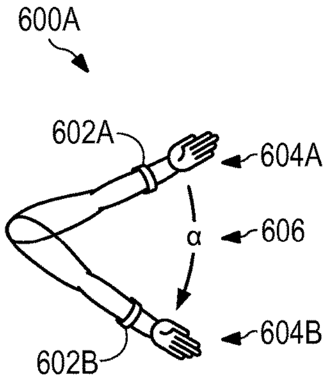
FIG. 6A is another illustration of near field game play on a gaming device, according to one embodiment.

In one example shown in FIG. 6A, a player may move a communication device (e.g., near field device, etc.) from a first near field device position 602A to a second near field device position 602B by moving their hand from a first hand position 604A to a second hand position 604B creating a first angle 606. By moving the near field device and/or by the first angle 606 being created, the player may initiate game play, signal for a service (e.g., drinks, assistance, etc.), modify game play, select one or more game play items (e.g., pick a prize), and/or participate in a skill based game.

Figure 6B:
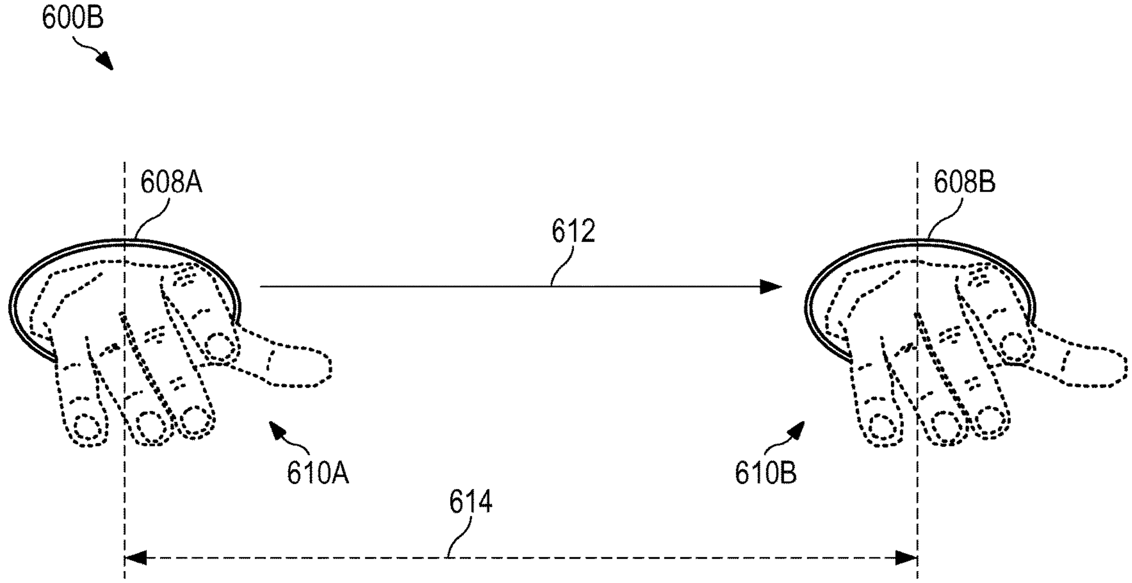
FIG. 6B is another illustration of near field game play on a gaming device, according to one embodiment.

In another example shown in FIG. 6B, a player may move a communication device (e.g., near field device, etc.) from a first near field device position 608A to a second near field device position 608B by moving their hand from a first hand position 610A to a second hand position 610B creating a first distance 614 and/or a first velocity 612 and/or a first acceleration. By moving the near field device and/or by creating the first distance 614, first velocity 612, and/or the first acceleration, the player may initiate game play, signal for a service (e.g., drinks, assistance, etc.), modify game play, select one or more game play items (e.g., pick a prize), order one or more items (e.g., concert tickets), cash out, transfer money into the electronic gaming device, and/or participate in a skill based game play. In one example, 610A represents a position in space at time t-sub-zero; 610B represents another position in space at time t-sub-one. If the movement of the bracelet (and/or near field device) is sampled at a constant rate (samples/second), then the interval in time (t-sub-one minus t-sub-zero) represents the sampling period. For example if the sampling period is 50 millisecond, then the movement of the bracelet is being sampled at a constant rate of 20 samples/second. In one example, 612 shows the direction of movement and 614 represents the distance traveling during the sampling period.

Figure 6C:
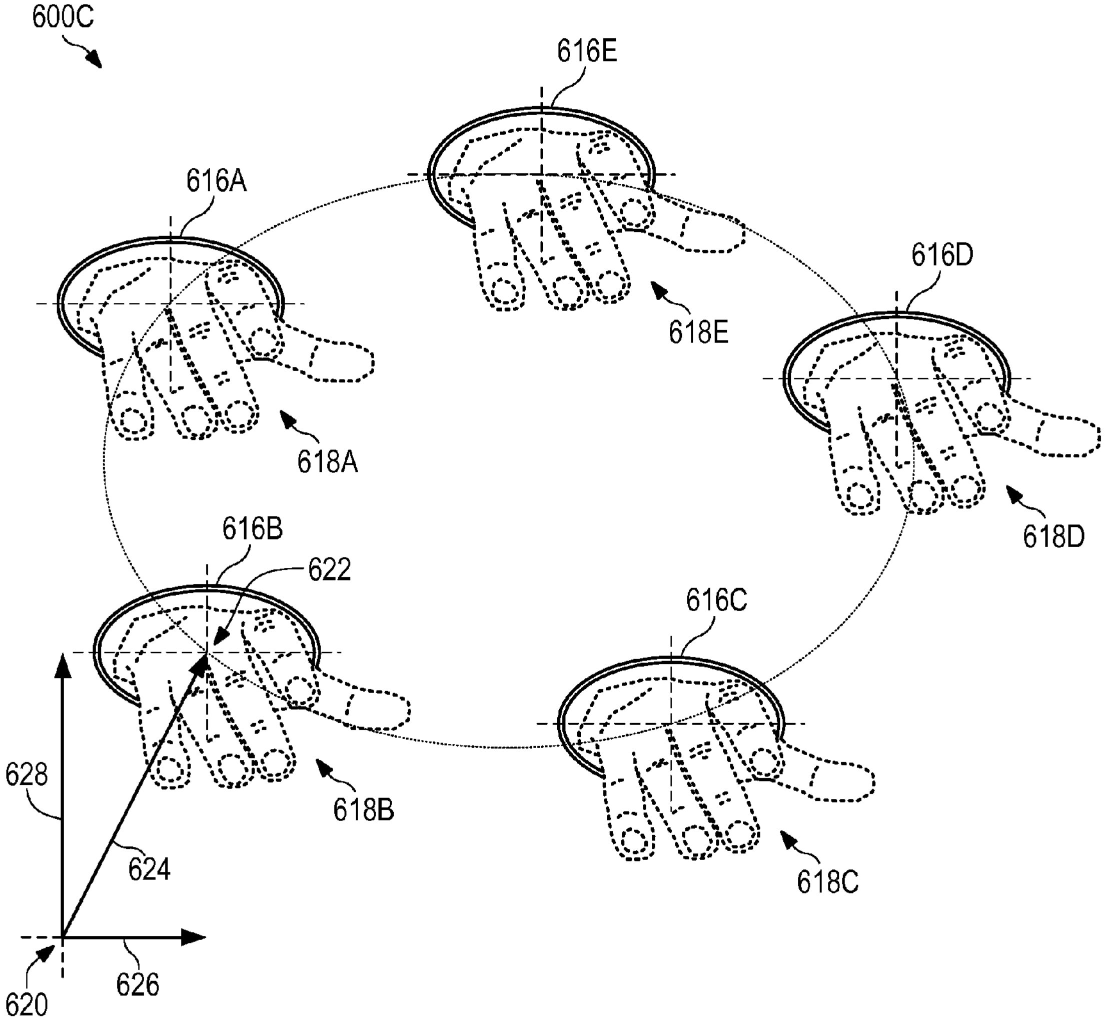
FIG. 6C is another illustration of near field game play on a gaming device, according to one embodiment.

In another example shown in FIG. 6C, a Cartesian coordinate system may be utilized to complete any of the items disclosed in FIGS. 6A and 6B. In this example, a player may move a communication device (e.g., near field device, etc.) from a first near field device position 616A to a second near field device position 616B to a third near field device position 616C to a fourth near field device position 616D and to a fifth near field device position 616E. In this example, a Cartesian coordinate system 620 may include an X axis 626, a Y axis 628, and a Z axis 624. Further, the player’s hand may have moved from a first hand position 618A to a second hand position 618B to a third hand position 618C to a fourth hand position 618D and to a fifth hand position 618E to correspond with the first near field device position 616A to second near field device position 616B to third near field device position 616C to fourth near field device position 616D and to fifth near field device position 616E. Please note that a 2D representation is shown here for clarity; however this disclosure can be expanded into 3D. Further, the bracelet may be moved in a counter-clockwise fashion (from the point of view of the EGM; it’s clockwise from the player’s point of view). The near field sensor derives the “center” of the bracelet (622) and the EGM may compute horizontal (626) and vertical (628) displacements as needed for vector math (such as calculating trajectory/path of motion). In other words at each sampling period, a position of the bracelet relative to the near field sensor/transducer is recorded and processed in real-time. The sampled vectors may be scaled as needed for game play. In another embodiment the sampled vectors are “normalized” so that a large diameter circle has the same effect on game play as a smaller diameter circle would have.

Figure 6D:
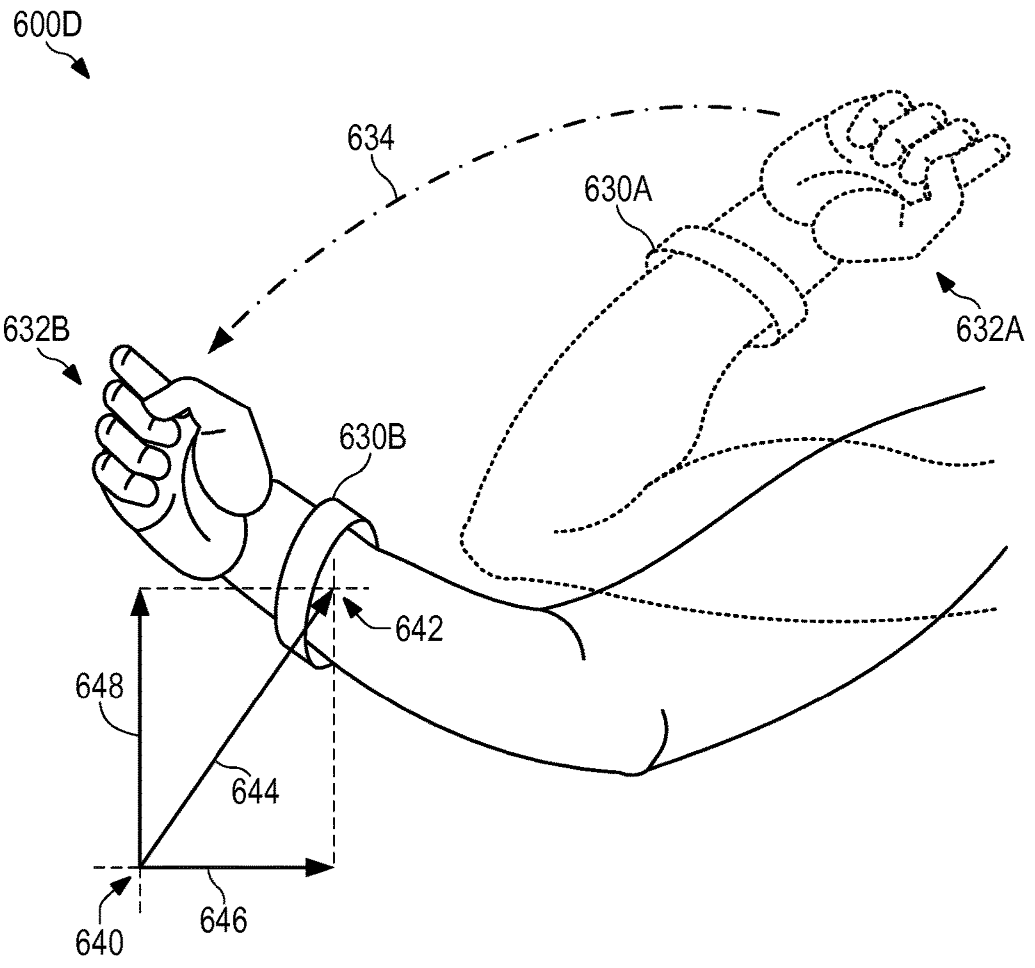
FIG. 6D is another illustration of near field game play on a gaming device, according to one embodiment.
Figure 6E:
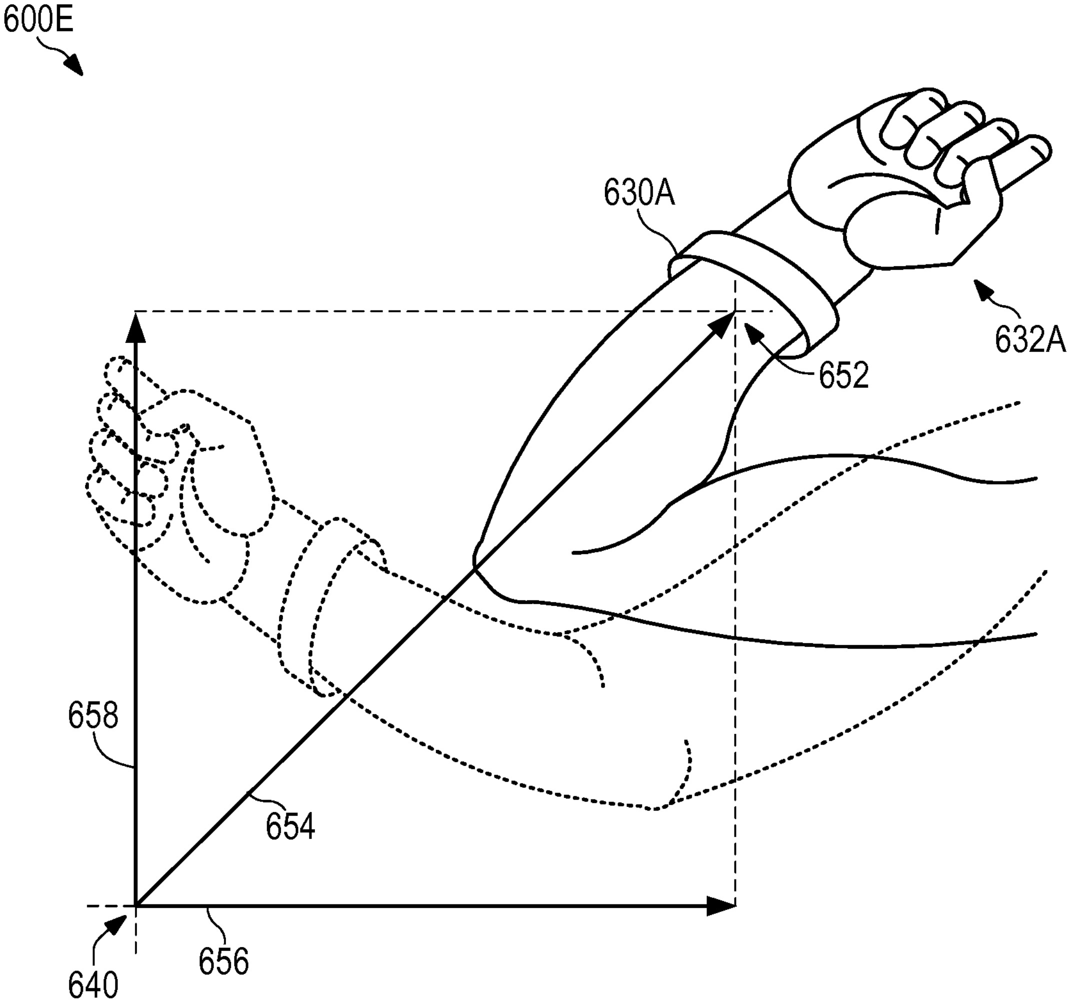
FIG. 6E is another illustration of near field game play on a gaming device, according to one embodiment.
Figure 6F:
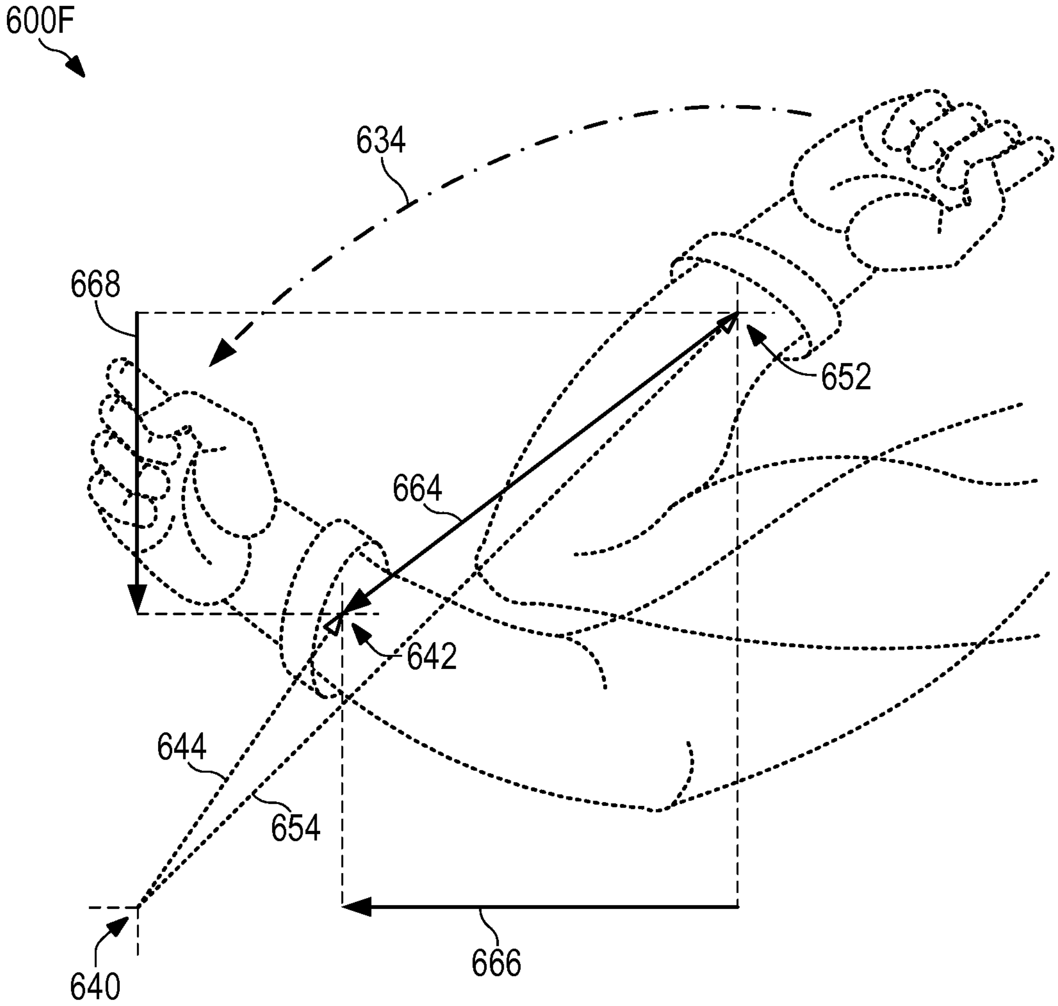
FIG. 6F is another illustration of near field game play on a gaming device, according to one embodiment.

In another example shown in FIG. 6D, the player may move a communication device from a first near field device location 630A (e.g., first hand position 632A) to a second near field device location 630B (e.g., second hand position 6328) to generate a first path 634 which may be utilized to initiate game play, signal for a service (e.g., drinks, assistance, etc.), modify game play, select one or more game play items (e.g., pick a prize), order one or more items (e.g., concert tickets), cash out, transfer money into the electronic gaming device, and/or participate in a skill based game play. Further, a second path 654 may be generated and/or utilized to initiate game play, signal for a service (e.g., drinks, assistance, etc.), modify game play, select one or more game play items (e.g., pick a prize), order one or more items (e.g., concert tickets), cash out, transfer money into the electronic gaming device, and/or participate in a skill based game play (see FIG. 6E). Further, one or more paths (reference numbers 642, 644, 654, and 664) may be utilized to initiate the above-referenced functions (see FIG. 6F). In addition, FIGS. 6D-E-F take FIG. 6C further by illustrating two consecutive sample periods in time, and the resultant vector (624 of 6F). Vector 624 shows the net direction and magnitude of movement during the sampling period.

Figure 7A:
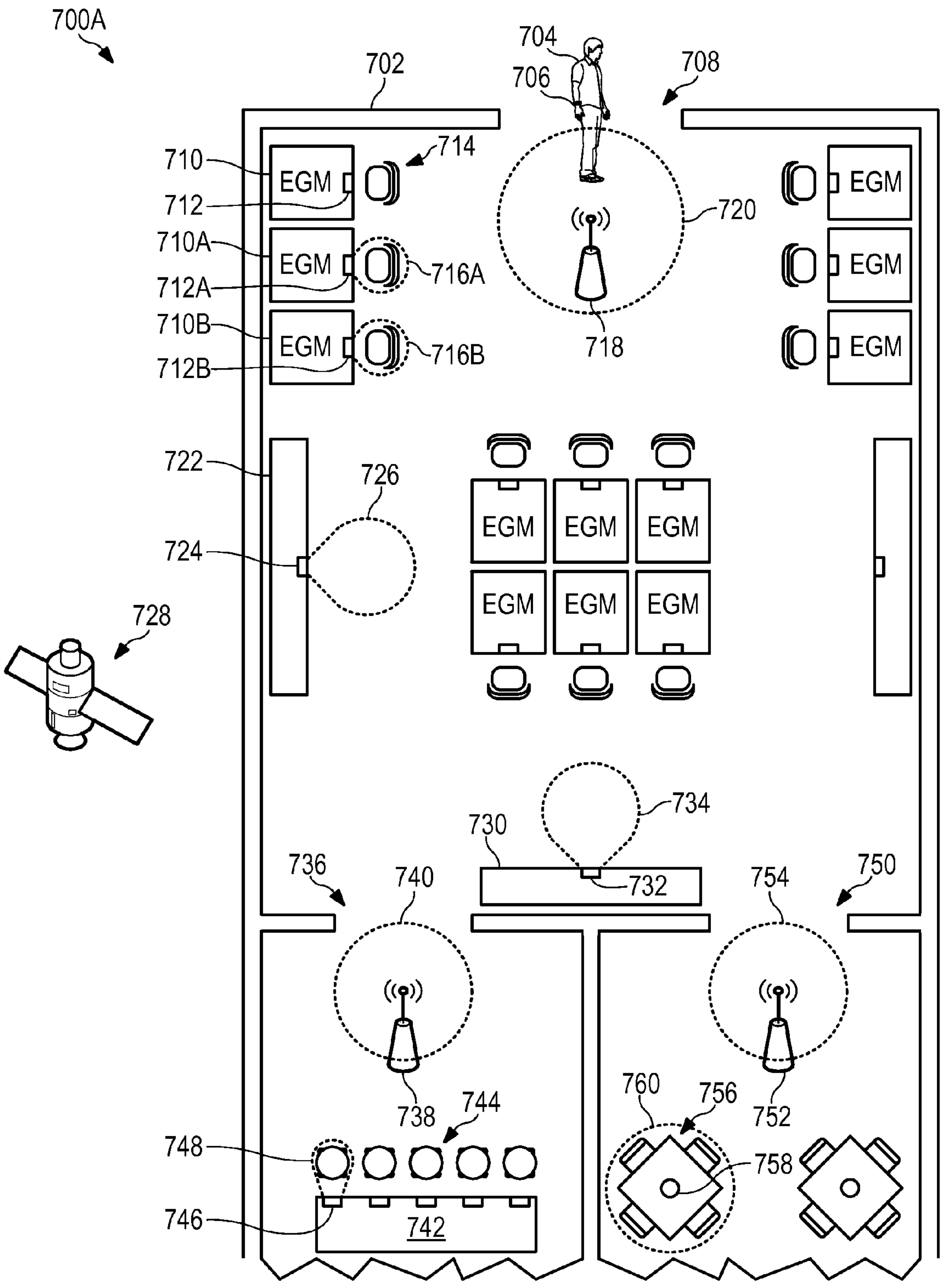
FIG. 7A is another illustration of near field game play on a gaming device, according to one embodiment.

In FIG. 7A, another illustration of near field game play on a gaming device is shown, according to one embodiment. A first image 700A includes a gaming entity area 702, a player 704, a near field player device 706, a gaming entity entry area 708, a first electronic gaming device 710, a second electronic gaming device 710A, an Nth electronic gaming device 710B, a first near field sensor 712, a second near field sensor 712A, a third near field sensor 7128, a first gaming chair 714, a first near field communication range 716A, a second near field communication range 7168, a first far field sensor 718, a first far field communication range 720, a first advertising board 722, a fourth near field sensor 724, a third near field communication range 726, a GPS 728, a second advertising board 730, a fifth near field sensor 732, a fourth near field communication range 734, a bar entrance 736, a second far field sensor 738, a second far field communication range 740, a bar 742, one or more bar seats 744, a sixth near field sensor 746, a fifth near field communication range 748, a restaurant entrance 750, a third far field sensor 752, a third far field communication range 754, a first restaurant table 756, a seventh near field sensor 758, and a sixth near field communication range 760. In one example, player 704 wearing near field player device 706 is first tracked by GPS 728 and one or more far field sensors (e.g., reference numbers 718, 738, and 752). Once player 704 wearing near field player device 706 enters one or more near field communication ranges (e.g., reference numbers 716A, 716B, 726, 734, 748, 760, etc.), than one or more near field communication systems may communicate with player 704 via near field player device 706, one or more electronic gaming devices (e.g., first electronic gaming device 710, second electronic gaming device 710A, Nth electronic gaming device 710B), one or more advertising boards and/or display screens (e.g., first advertising board 722, second advertising board 730, etc.), one or more devices in a bar, one or more devices in a restaurant, one or more devices at a show, one or more devices at one or more table games, and/or any other device in the gaming entity.

In one example, the player may be playing all three electronic gaming machines (e.g., 710, 710A, and 710B) at the same time. The near field sensors may be networked together to determine that even though the player is outside of one or more of the near field ranges for the three electronic gaming machines, the player is still playing all three machines (which means the system should not discontinue usage of any of the three machines) because the player's position is still within one or more of the three near field ranges. In this example, the player may be focusing on one machine which is winning and/or in an exciting bonus round which positioned the player outside of one or more near field ranges.

Figure 7B:
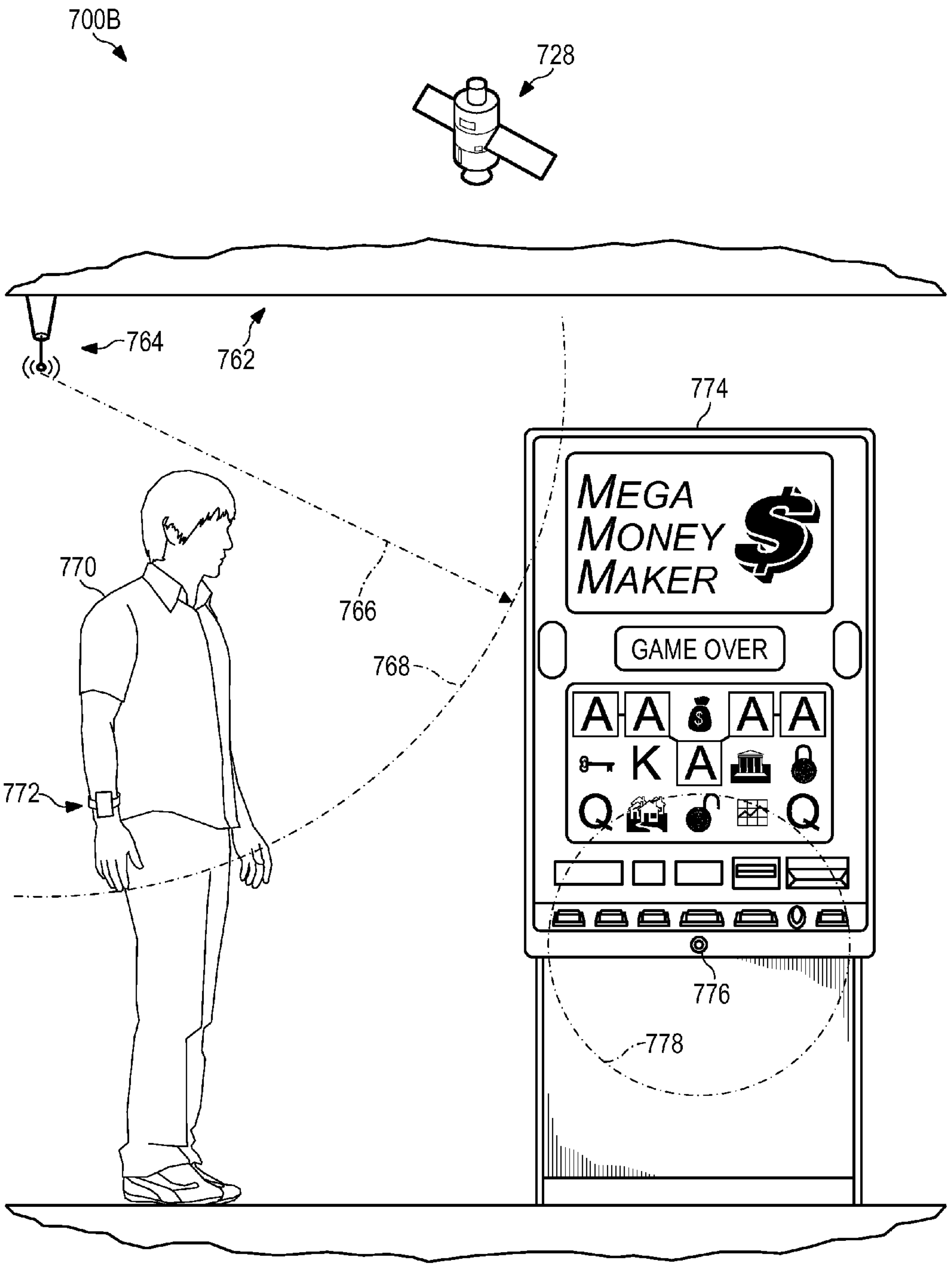
FIG. 7B is another illustration of near field game play on a gaming device, according to one embodiment.

In FIG. 7B, another illustration of near field game play on a gaming device is shown, according to one embodiment. A second image 700B includes a player 770 wearing a near field player device 772 being within a far field communication range 768. Therefore, a far field sensor 764 may generate positional data relating to player 770 which can be accomplished in conjunction with GPS 728 but can also be accomplished independent of GPS 728. In this example, the positional data relating to player 770 may be transmitted from far field sensor 764 and/or GPS 728 to an electronic gaming device 774. In one example, even though player 770 is not within a near field communication range 778 (e.g., not within range of electronic gaming device near field sensor), electronic gaming device 774 may generate one or more presentations (e.g., attraction mode) based on the positional data relating to player 770 which was transmitted from far field sensor 764 and/or GPS 728. In another example, once player 770 enters into near field communication range 778, then electronic gaming device 774 may start one or more near field functions (e.g., attraction mode, initiate game play, transfer credits, and/or any other function discussed in this disclosure and/or and other function discussed in Figure set 5).

Figure 7C:
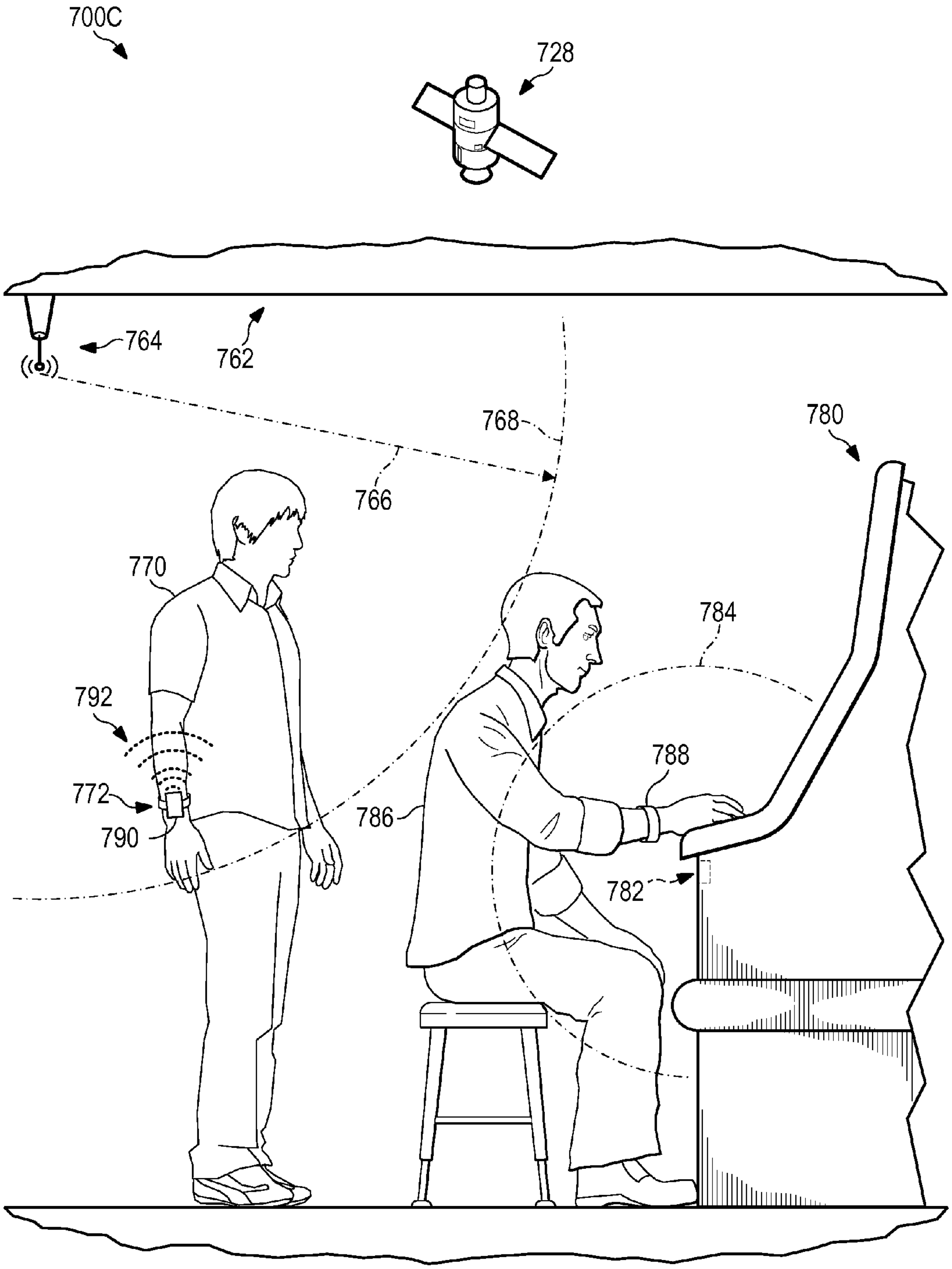
FIG. 7C is another illustration of near field game play on a gaming device, according to one embodiment.

In FIG. 7C, another illustration of near field game play on a gaming device is shown, according to one embodiment. A third image 700C includes a first player 786 wearing a first near field player device 788 playing on a first electronic gaming device 780. In this example, first electronic gaming device 780 is interacting with first player via a near field sensor 782 because first player is within a first near field communication range 784. Further, a second player 770 wearing a second near field player device 772 may be communicated to by first electronic gaming device 780 if second player 770 is within first near field communication range 784. However, in this example, second player 770 is not within first near field communication range 784 but is within a first far field communication range 768 which may allow the system (e.g., server, first electronic gaming device 780, etc.) to communicate with second player 770. In various examples, one or more messages may be sent to the second near field player device 772 which may be displayed on a near field device screen 790 and/or one or more sound messages 792 may be generated.

Figure 7D:
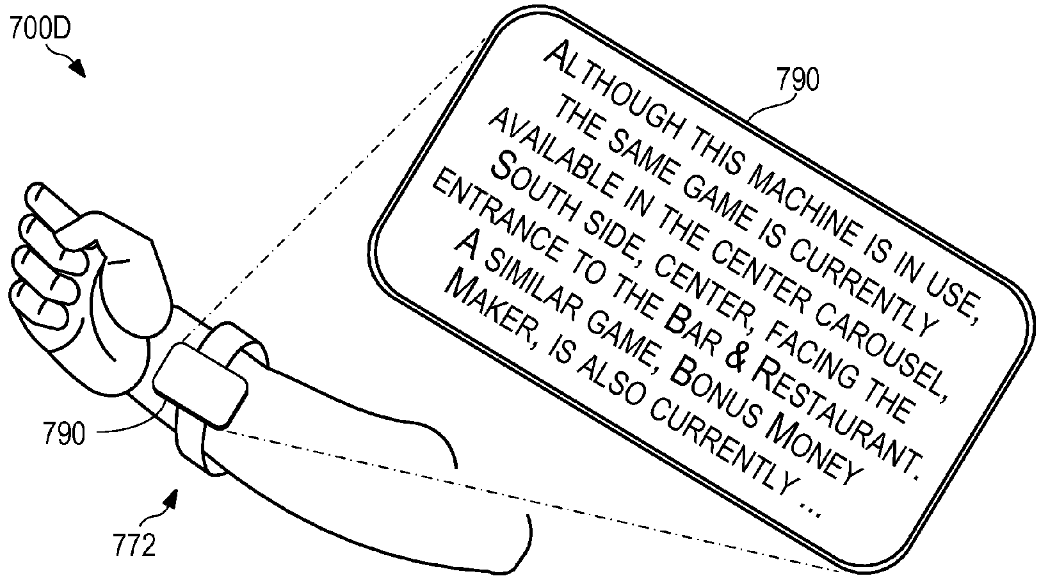
FIG. 7D is another illustration of near field game play on a gaming device, according to one embodiment.
Figure 7E:
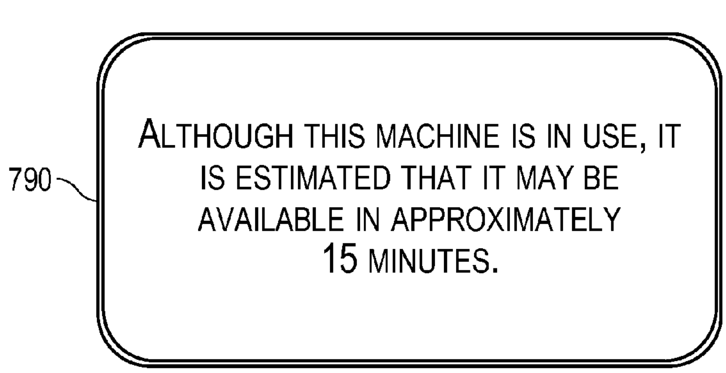
FIG. 7E is another illustration of near field game play on a gaming device, according to one embodiment.
Figure 7F:
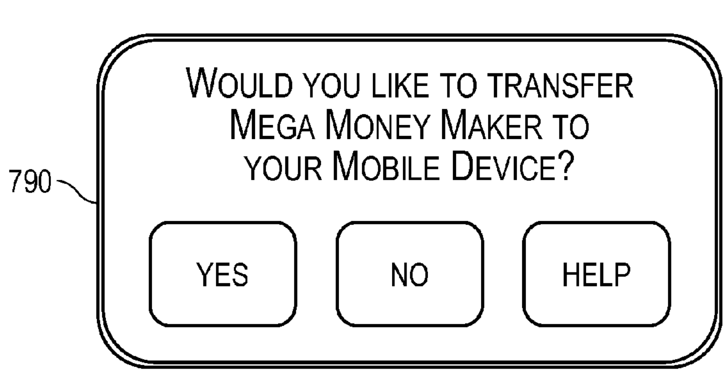
FIG. 7F is another illustration of near field game play on a gaming device, according to one embodiment.

In one example shown in FIG. 7D, the system may generate, transmit, and/or display one or more recommendations. For example, the system may transmit and/or display the message that "ALTHOUGH THIS MACHINE IS IN USE, THE SAME GAME IS CURRENTLY AVAILABLE IN THE CENTER CAROUSEL, SOUTH SIDE, CENTER, FACING THE ENTRANCE TO THE BAR AND RESTAURANT. A SIMILAR GAME, BONUS MAKER IS ALSO CURRENTLY . . . . " Further, the system may provide step-by-step directions to the recommended machines (see FIGS. 12A-12R). In another example, the electronic gaming device and/or system may utilize one or more algorithm to determine when this specific gaming device will become available to play (e.g., when the current player is likely to leave) and generate one or more message relating to this prediction. For example as seen in FIG. 7E, the system may generate, display, and/or transmit the message that "ALTHOUGH THIS MACHINE IS IN USE, IT IS ESTIMATED THAT IT MAY BE AVAILABLE IN APPROXIMATELY 15 MINUTES." In another example, the player may be able to transfer game play to a mobile device, reserve the game when it becomes available, and/or be notified when the game is available. For example as seen in FIG. 7F, the system may state "WOULD YOU LIKE TO TRANSFER MEGA MONEY MAKER TO YOUR MOBILE DEVICE?" The player may then select yes, no, and/or a help button.

Figure 7G:
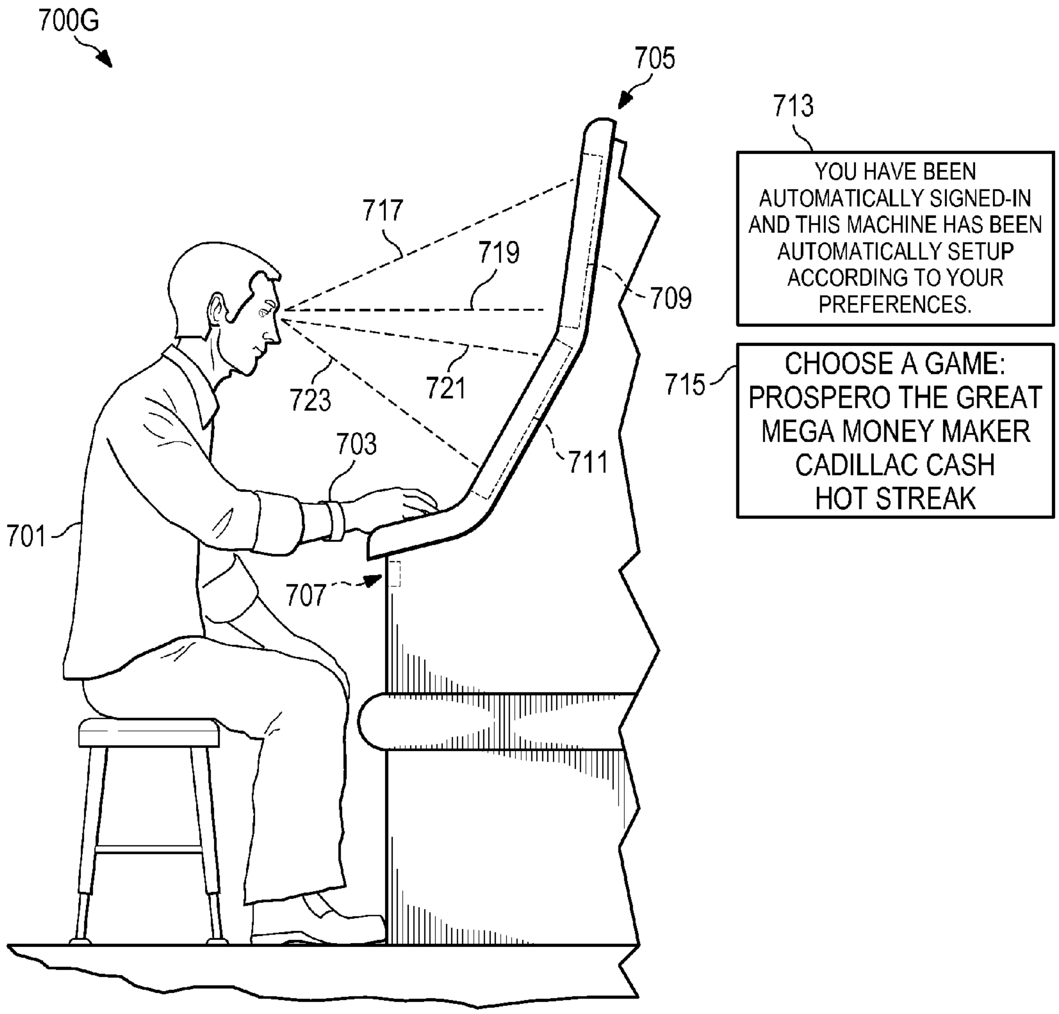
FIG. 7G is another illustration of near field game play on a gaming device, according to one embodiment.

In FIG. 7G, another illustration of near field game play on a gaming device is shown, according to one embodiment. A third image 700G may include a player 701 wearing a communication device 703 (e.g., near field player device, far field communication device, GPS communication device, and/or a combination thereof) playing an electronic gaming device 705 where the electronic gaming device 705 includes two screens (e.g., 709 and 711) positioned to optimize one or more viewable areas. In this example, the system and/or electronic gaming device may deliver a message that states "YOU HAVE BEEN AUTOMATICALLY SIGNED-IN AND THIS MACHINE HAS BEEN AUTOMATICALLY SETUP ACCORDING TO YOUR PREFERENCES." Further, the message of "CHOOSE A GAME: PROSPERO THE GREAT; MEGA MONEY MAKER; CADILLAC CASH; OR HOT STREAK." The game configuration and gaming options may be based on information relating to the player, the player loyalty card information, and/or past game play history.

Figure 8A:
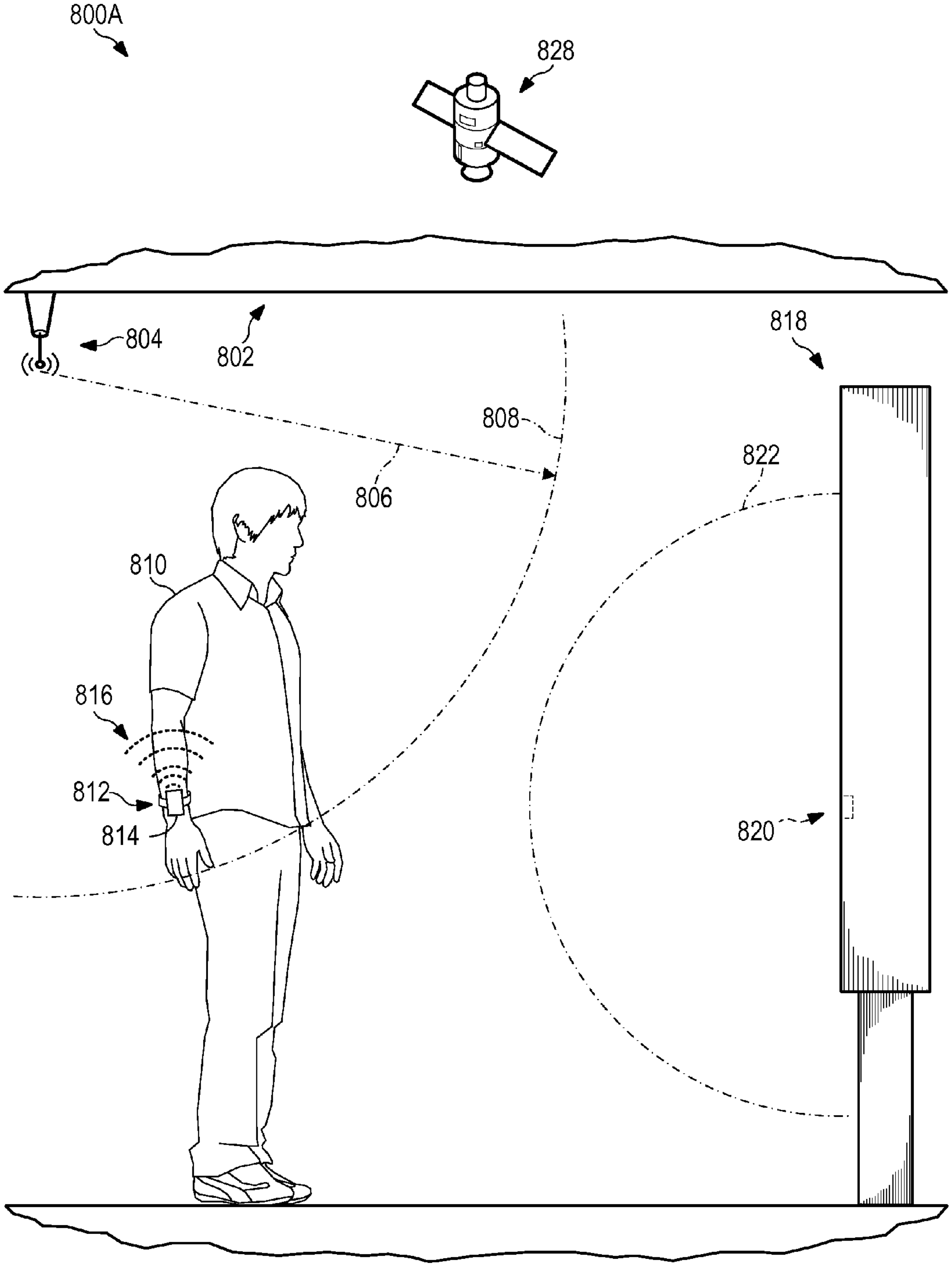
FIG. 8A is another illustration of near field game play on a gaming device, according to one embodiment.

In FIG. 8A, another illustration of near field game play on a gaming device is shown, according to one embodiment. A first image 800A includes a player 810 wearing a near field player device 812 is within a far field communication range 808. Once the player 810 enters a near field communication range 822 and/or based on positional data generated by a far field sensor 804, a screen may generate and/or display a message tailored to player 810.

It should be noted that near field player device 812 may be a combination of near field device, far field device, a GPS device, and/or another locational device.

Figure 8B:
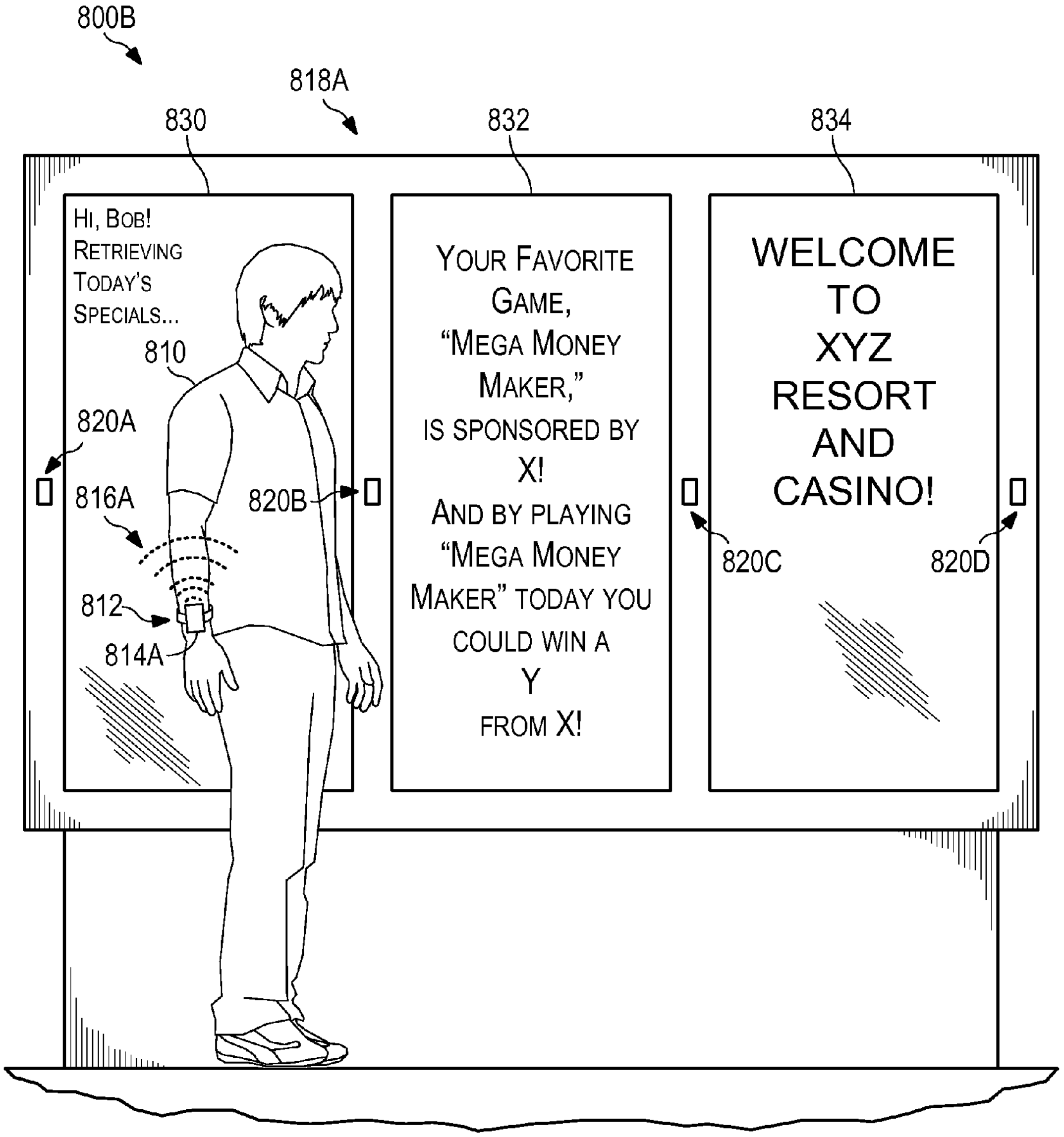
FIG. 8B is another illustration of near field game play on a gaming device, according to one embodiment.
Figure 8C:
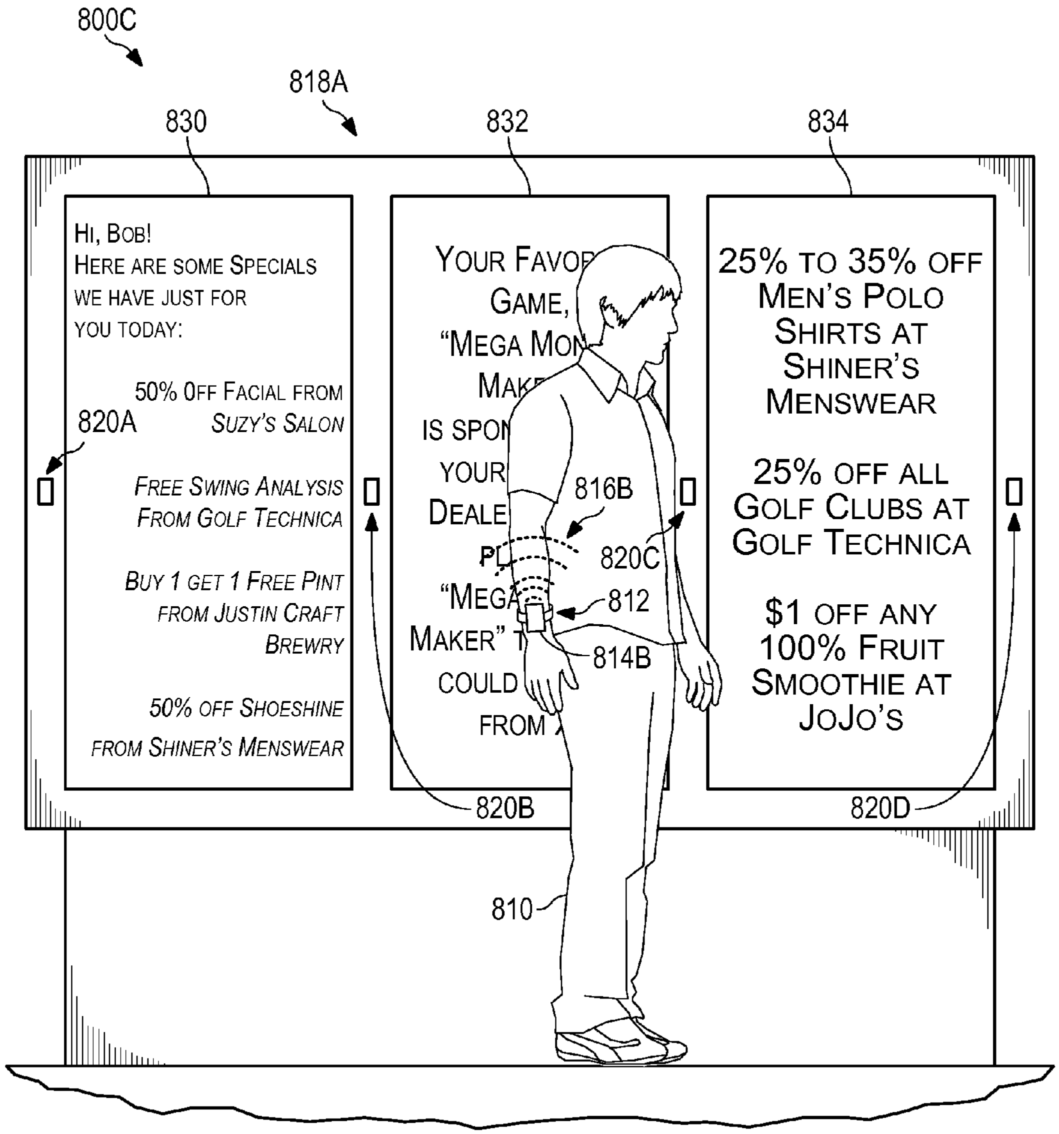
FIG. 8C is another illustration of near field game play on a gaming device, according to one embodiment.

In FIG. 8B, another illustration of near field game play on a gaming device is shown, according to one embodiment. In one example, a first near field sensor 820A, a second near field sensor 820B, a third near field sensor 820C, and an Nth near filed sensor 820D may be utilized to change the message as the player 810 moves from position to position. When the player 810 is at a first position near first near field sensor 820A, a message may state "HI, BOB! RETRIEVING TODAY'S SPECIALS . . . . " Further, when a player is closer to second near field sensor, the message may state "YOUR FAVORITE GAME, 'MEGA MONEY MAKER,' IS SPONSORED BY X! AND BY PLAYING 'MEGA MONEY MAKER' TODAY YOU COULD WIN A Y FROM X!" In addition, once the player is closer to third near field sensor and/or fourth near field sensor, the message may state "WELCOME TO XYZ RESORT AND CASINO!" Any positional data may be utilized to generate any message. In another example shown in FIG. 8C, the messages may be any adverting message, gaming entity message, gaming device message, table game message, and/or any other message.

Figure 9A:
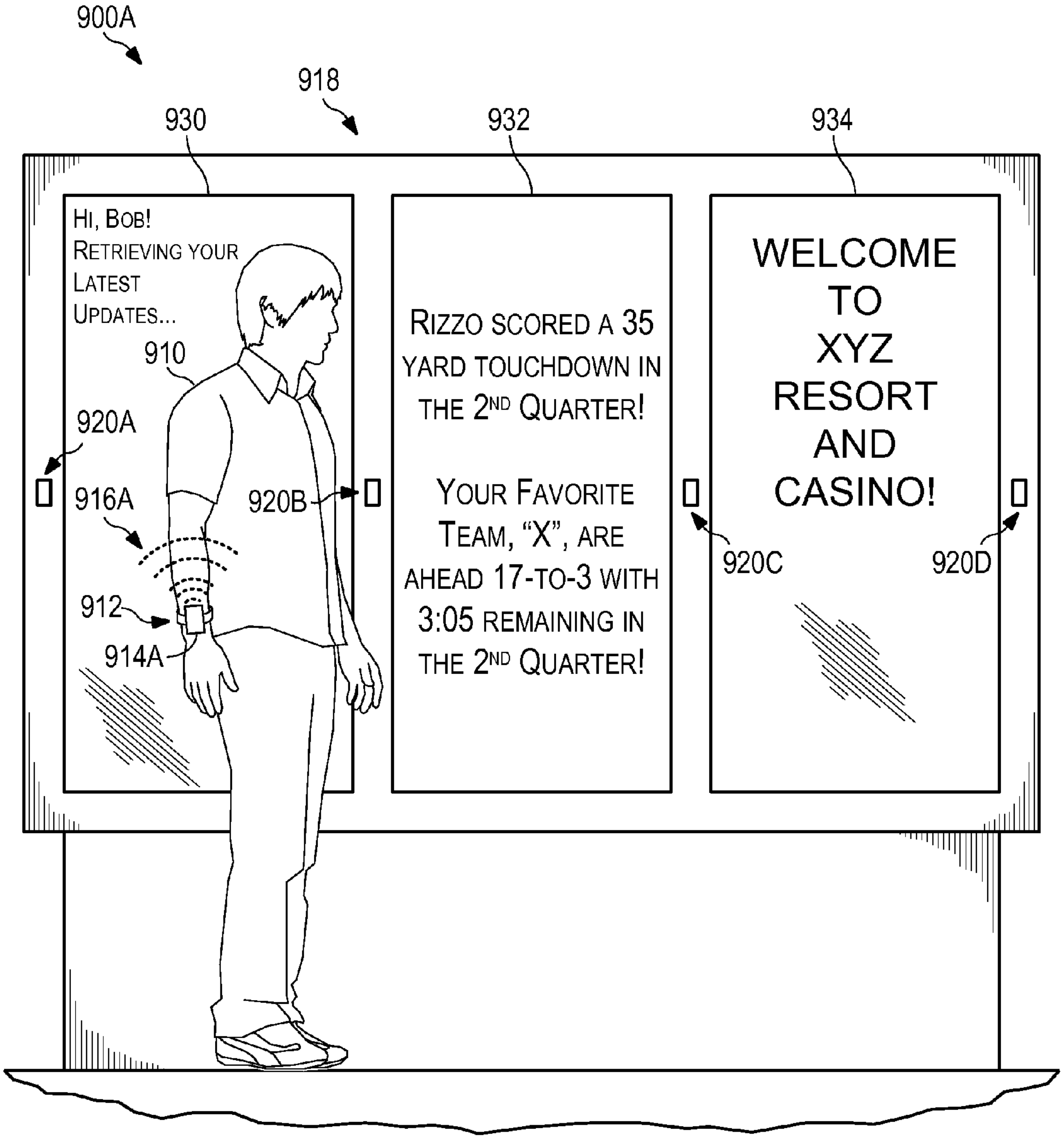
FIG. 9A is another illustration of near field game play on a gaming device, according to one embodiment.
Figure 9B:
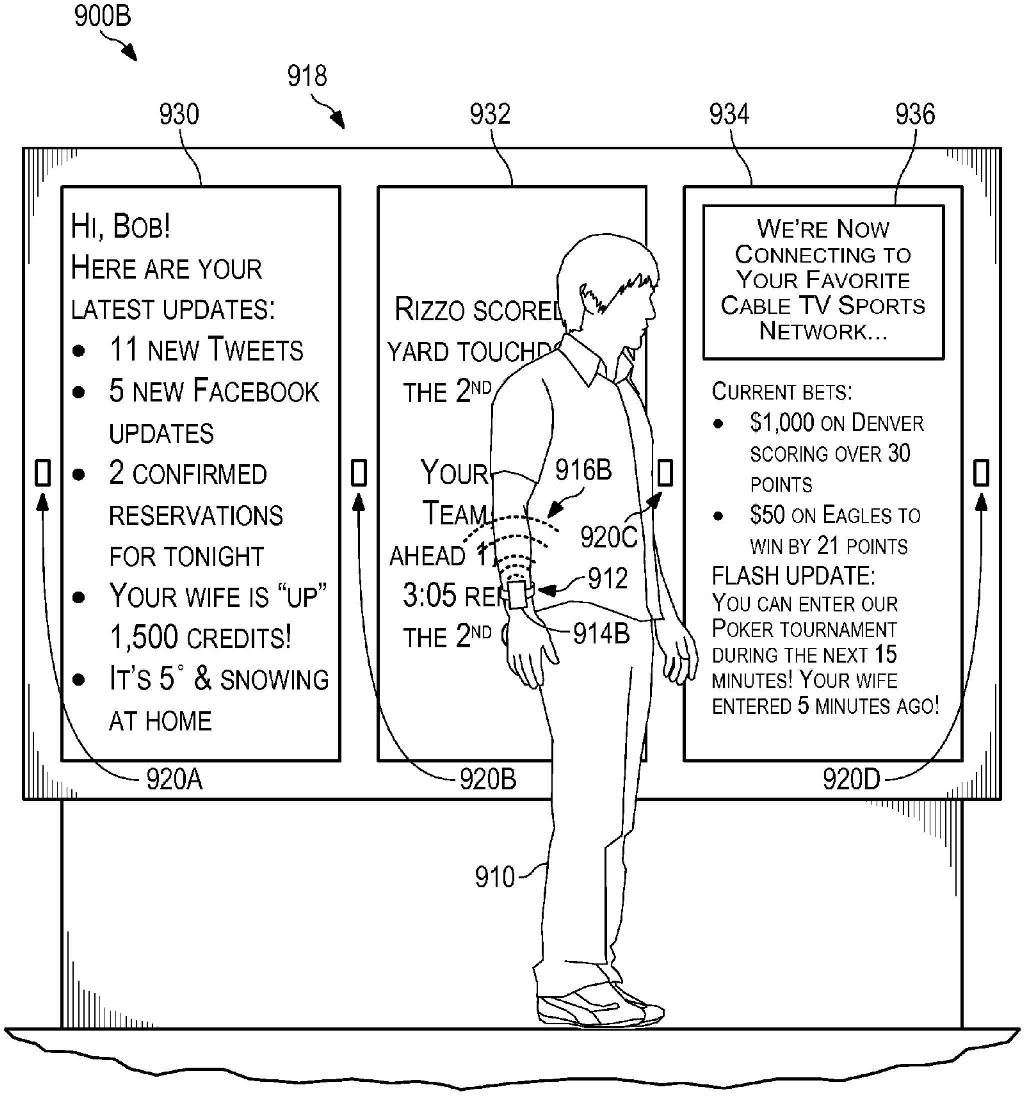
FIG. 9B is another illustration of near field game play on a gaming device, according to one embodiment.
Figure 9C:
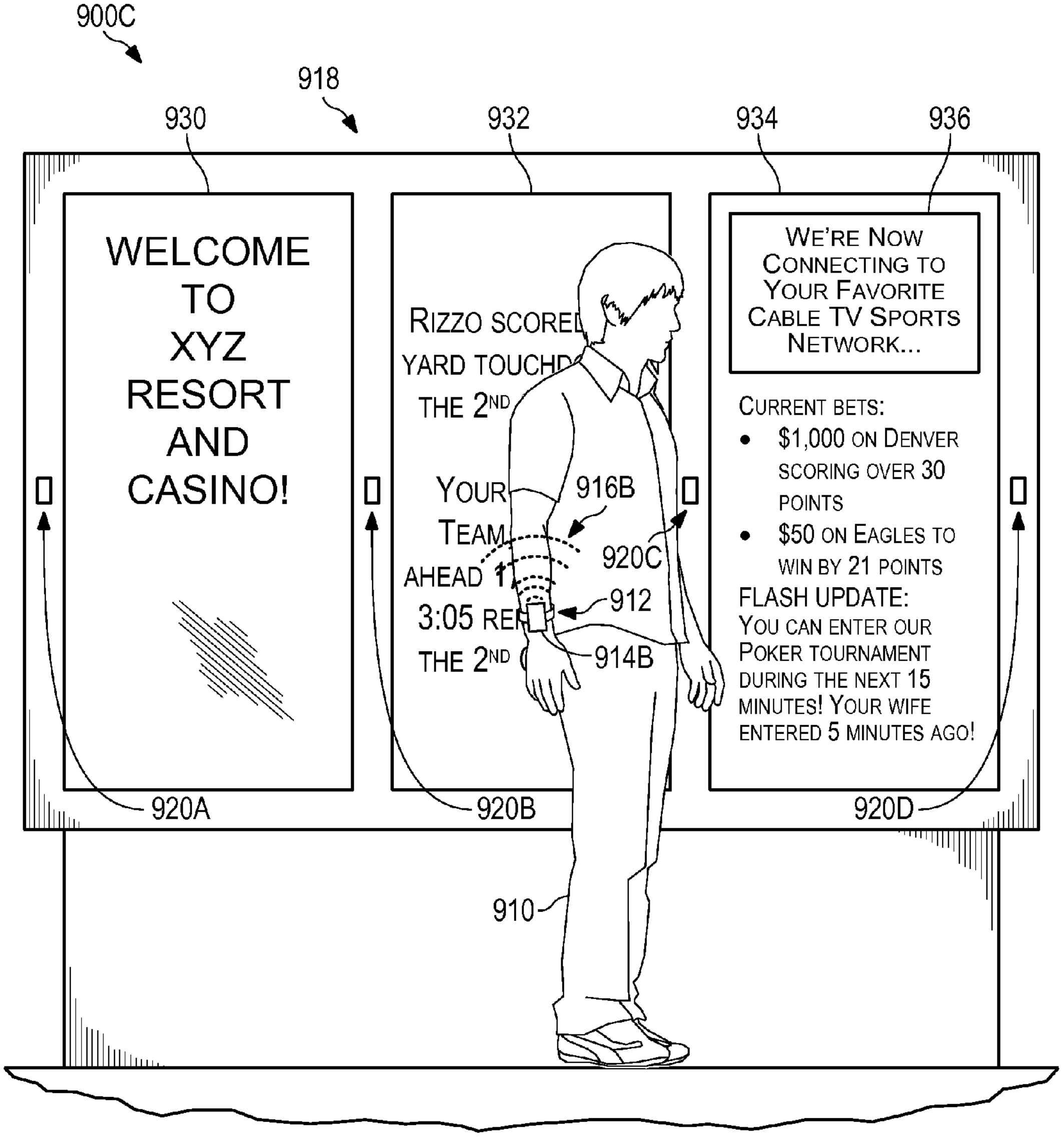
FIG. 9C is another illustration of near field game play on a gaming device, according to one embodiment.

Further, the messages may relate to any event relating to the player. For example, a player's favorite team data may be displayed. In one example, the message may state "RIZZO SCORED A 35 YARD TOUCHDOWN IN THE $2^{ND}$ QUARTER! YOUR FAVORITE TEAM, 'X' ARE AHEAD 17-TO-3 WITH 3:05 REMAINING IN THE $2^{ND}$ QUARTER!" (see FIG. 9A) In addition, betting option messages may be displayed. For example, your current bet of $1000 on Denver scoring over 30 points has a status of X (e.g., Denver has scored 27 points you have a probability of winning of 95 percent, etc.). In another example, your current bet of $50 on the Eagles to win by 21 points has a status of Y (e.g., The Eagles are losing by 15 points you have a probability of winning of 1 percent, etc.). There may be one or more flash updates, such as, you can enter our poker tournament during the next 15 minutes, your wife entered 5 minutes ago! (see FIG. 9B). In one example, the system may display new betting options which may also be based on the player's betting history. For example, do you want to bet on Denver scoring over 40 points next week against Dallas, the odds are 1.5 to 1. In one example, the near field sensors are not networked together, therefore, once the player moves to a location outside of a near field sensor's range (e.g., 920A), the message is transformed into a generic message in a first display area 930 (see FIG. 9C). In these examples, there are a first display area 930, a second display area 932, and an Nth display area 934.

Figure 10A:
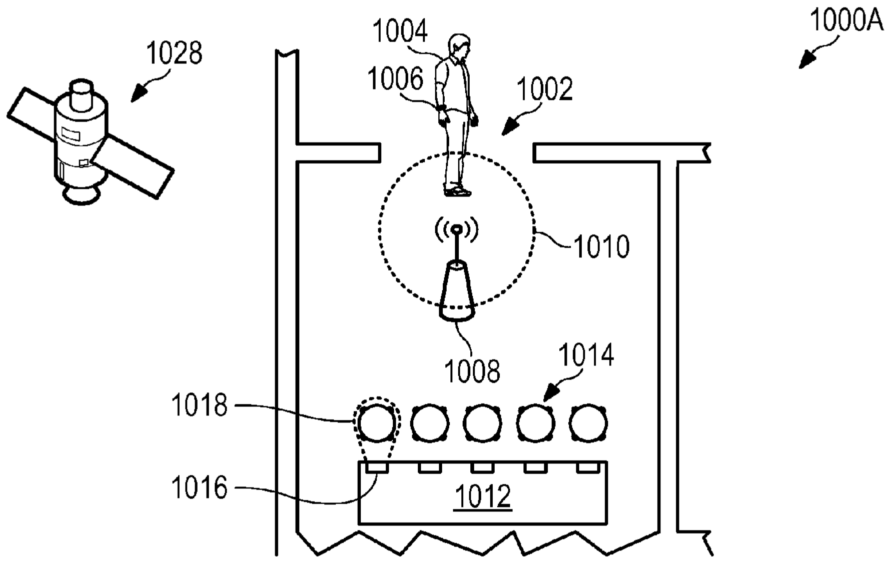
FIG. 10A is another illustration of near field game play on a gaming device, according to one embodiment.
Figure 10B:
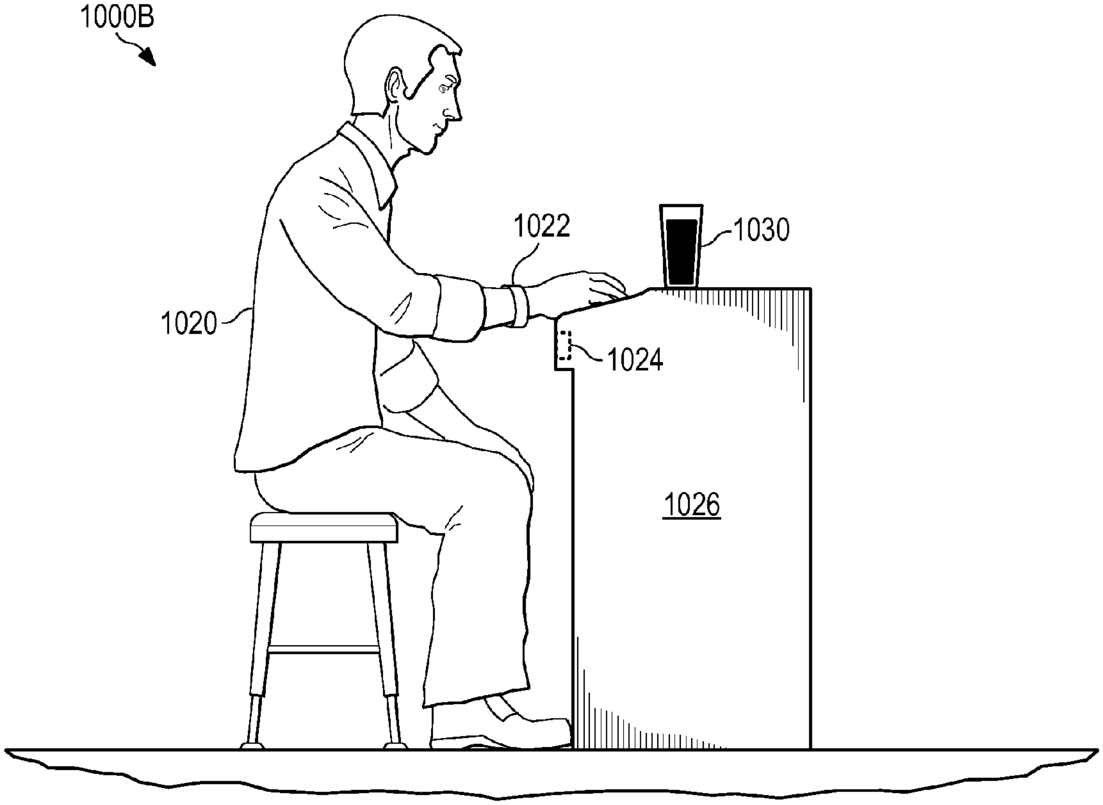
FIG. 10B is another illustration of near field game play on a gaming device, according to one embodiment.

In FIG. 10A, another illustration of near field game play on a gaming device is shown, according to one embodiment. In this example, a player 1004 wearing a communication device 1006 enters a bar entrance 1002. Based on data from a GPS 1028, a far field sensor 1010, and/or a near field sensor 1016, the player 1004 may be served a drink and/or food (where ever they sit because the system knows their location) and/or a gaming device may be configured to initiate game play, transfer balances, and/or reconfigure itself (see FIG. 10B).

Figure 11A:
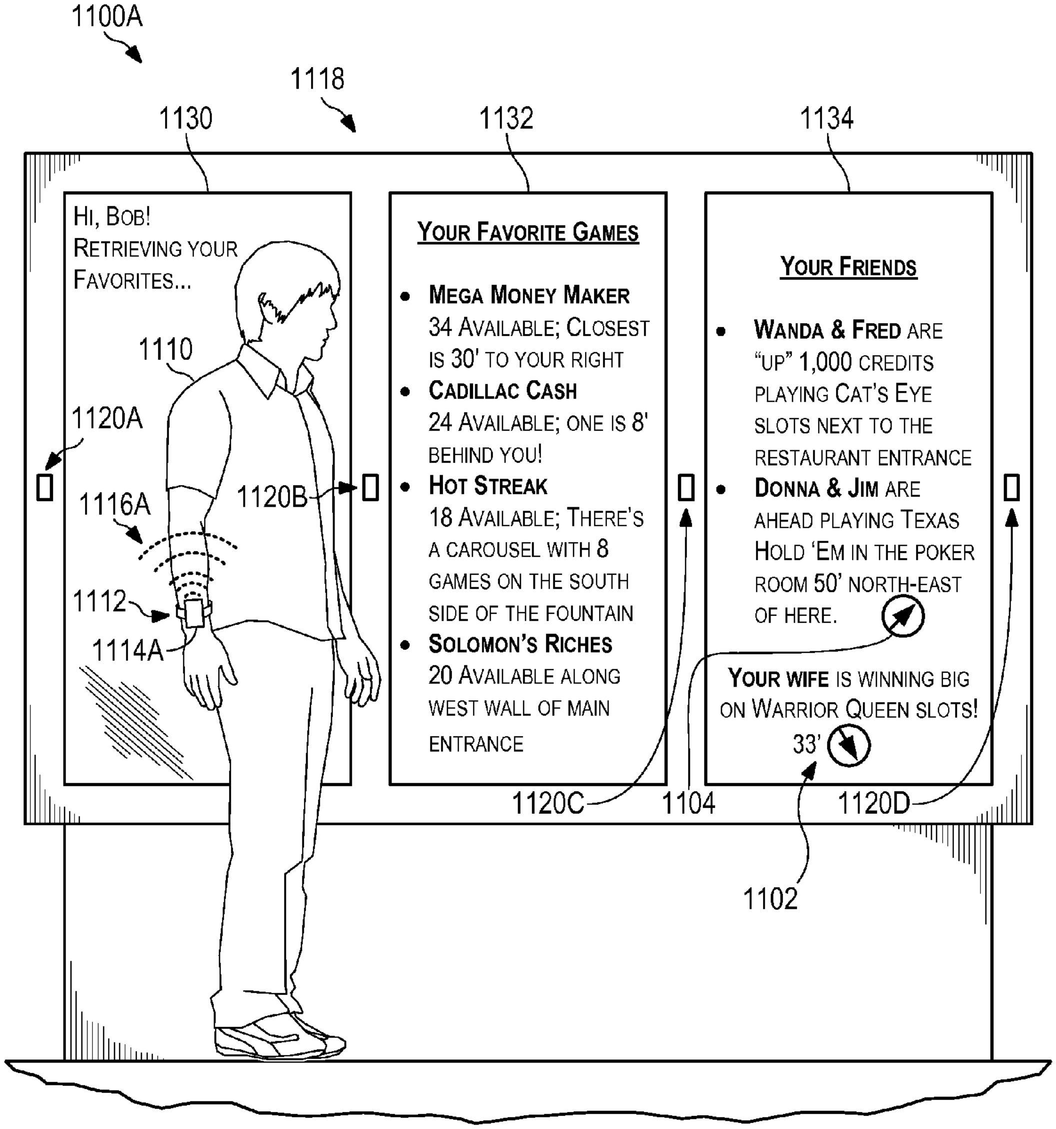
FIG. 11A is another illustration of near field game play on a gaming device, according to one embodiment.
Figure 11B:
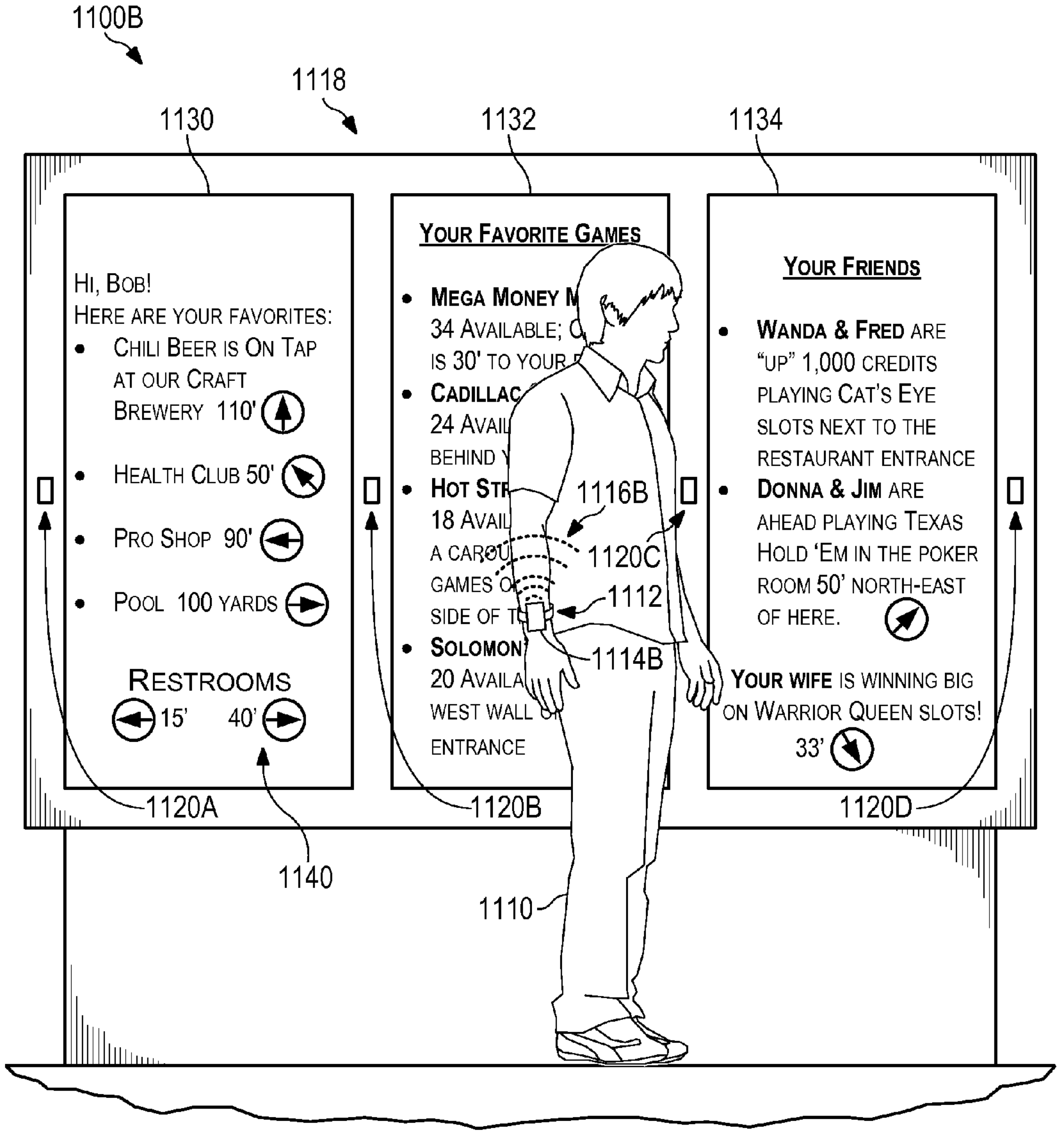
FIG. 11B is another illustration of near field game play on a gaming device, according to one embodiment.
Figure 11C:
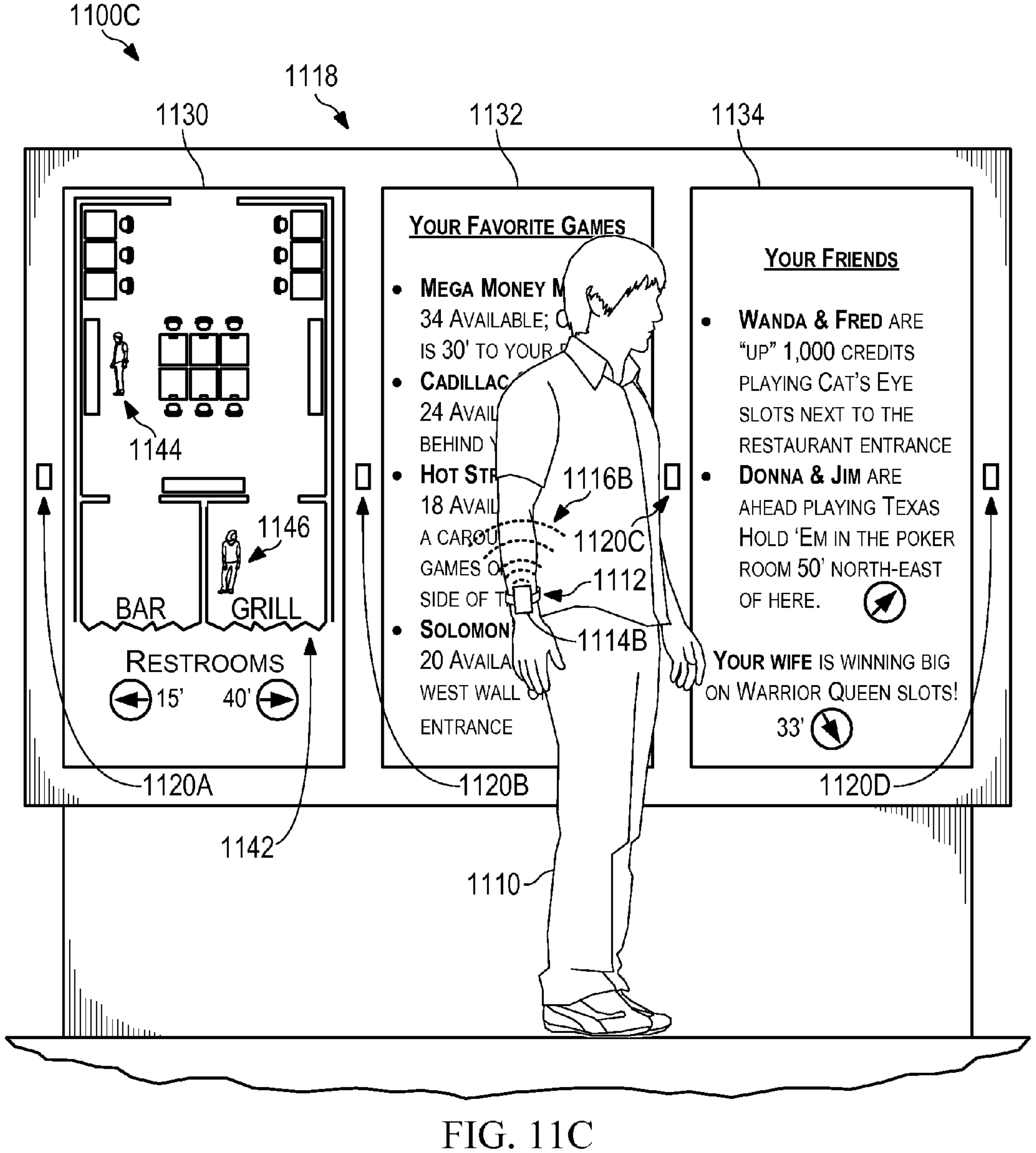
FIG. 11C is another illustration of near field game play on a gaming device, according to one embodiment.

In FIG. 11A, another illustration of near field game play on a gaming device is shown, according to one embodiment. In this example, the player 1110 wearing a communication device 1112 may be provided with the locations of their favorite gaming devices, status reports on their friends and/or family, and/or directions to their family, friends, and/or amenities (see FIG. 11B). These directions may be transmitted by their communication device to give the player step-by-step directions utilizing one or more near field sensors, one or more far field sensors, and/or a GPS. In one example, the system converts a first display area 1130 into a map which shows the location of one or more objects and/or people with a relative position 1146 to the player 1144 (see FIG. 11C).

Figure 12A:
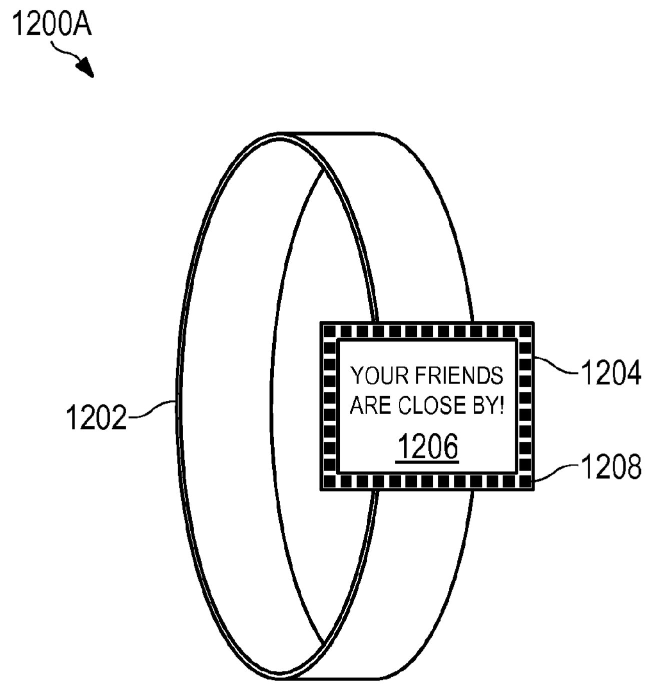
FIG. 12A is another illustration of near field game play on a gaming device, according to one embodiment.
Figure 12B:
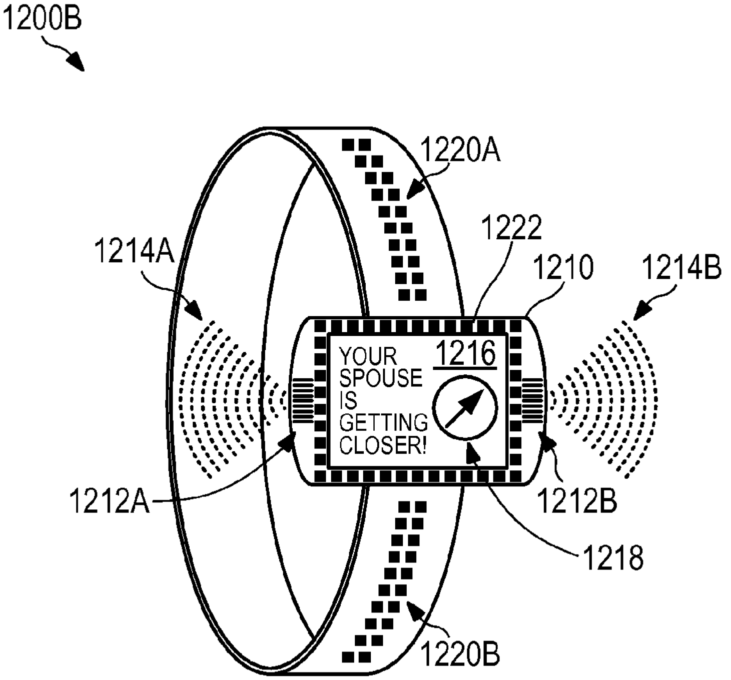
FIG. 12B is another illustration of near field game play on a gaming device, according to one embodiment.

In FIG. 12A, another illustration of near field game play on a gaming device is shown, according to one embodiment. A first image 1200A may include a near field communication device 1202 and a display screen 1204 attached to the near field communication device 1202. In this example, the near field communication device 1202 may determine that a person (e.g., a friend, a family member, a gambling buddy, etc.) is close by and display the message 1206 of "YOUR FRIENDS ARE CLOSE BY!" Further as shown in FIG. 12B, near field communication device 1202 may include a display screen 1210 with a left speaker 1212A, a right speaker 1212B, a directional device 1218, a first set of lights 1220A, a second set of lights 1220B, and a vibrating mechanism 1222. The message may state "YOUR SPOUSE IS GETTING CLOSER!" and indicated where the person is by the directional device 1218. Directions may be verbally stated via a first communication 1214A and/or a second communication 1214B. The first set of lights 1220A and/or the second set of lights 1220B may indicate the direction to take to get to one or more locations. In another example, the vibrating mechanism 1222 may indicate that a message is waiting for the player.

Figure 12C:
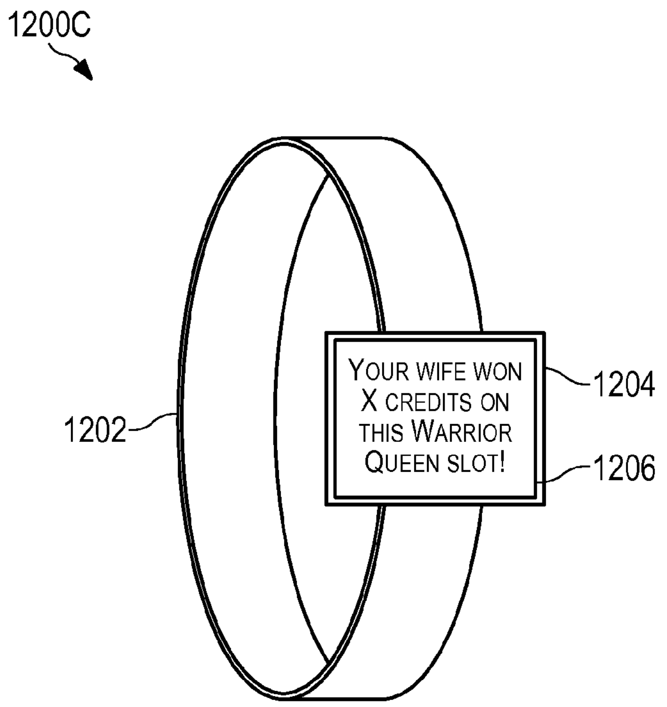
FIG. 12C is another illustration of near field game play on a gaming device, according to one embodiment.
Figure 12D:
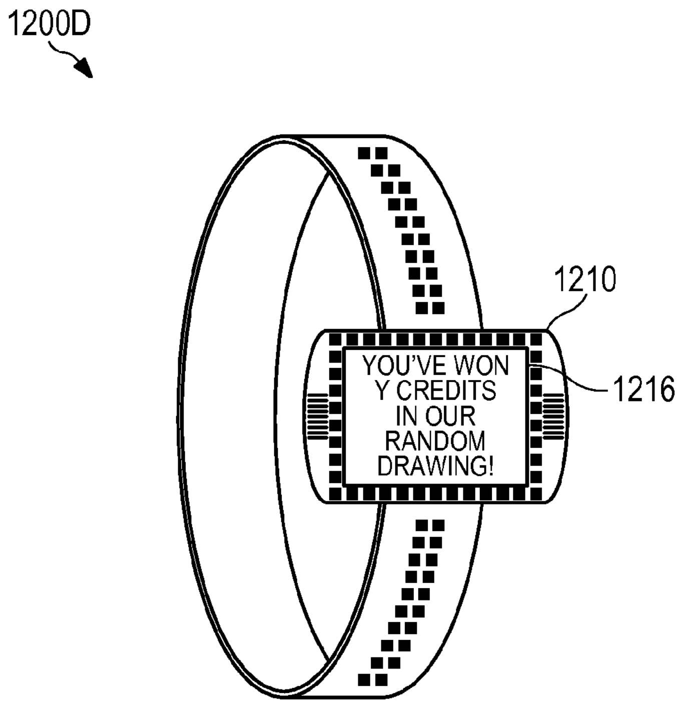
FIG. 12D is another illustration of near field game play on a gaming device, according to one embodiment.

In another example shown in FIG. 12C, near field communication device 1202 may determine and display one or more status reports. For example, a message 1206 may state "YOUR WIFE WON X CREDITS ON THIS WARRIOR QUEEN SLOT!" Further, near field communication device 1202 may determine and display one or more random drawing winners. For example, the message may state "YOU'VE WON Y CREDITS IN OUR RANDOM DRAWING!" (see FIG. 12D).

Figure 12E:
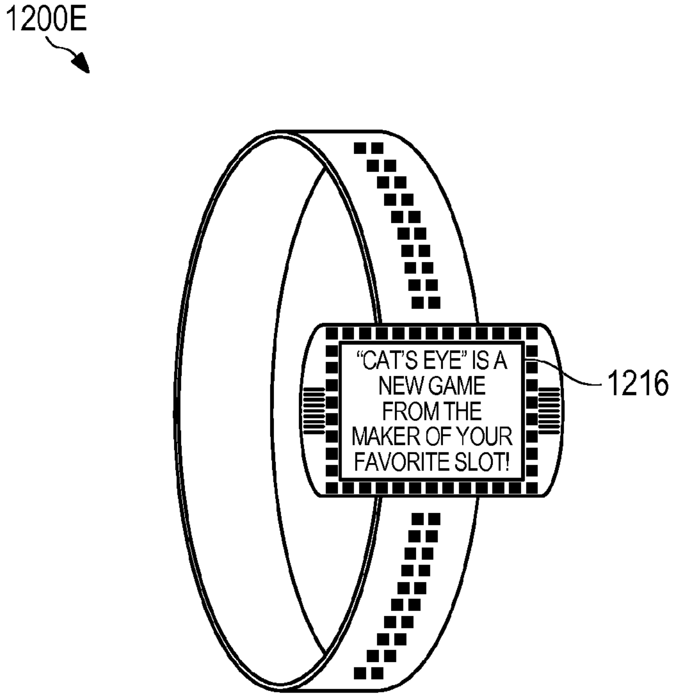
FIG. 12E is another illustration of near field game play on a gaming device, according to one embodiment.
Figure 12F:
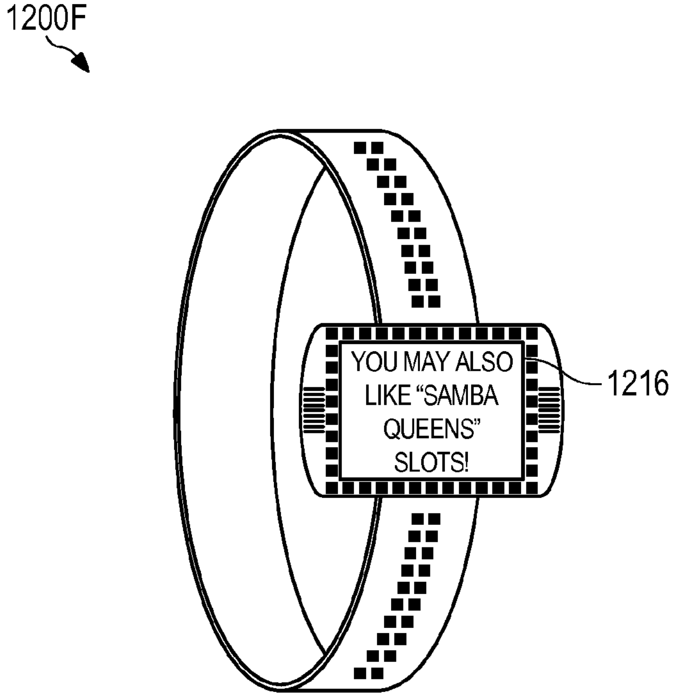
FIG. 12F is another illustration of near field game play on a gaming device, according to one embodiment.
Figure 12G:
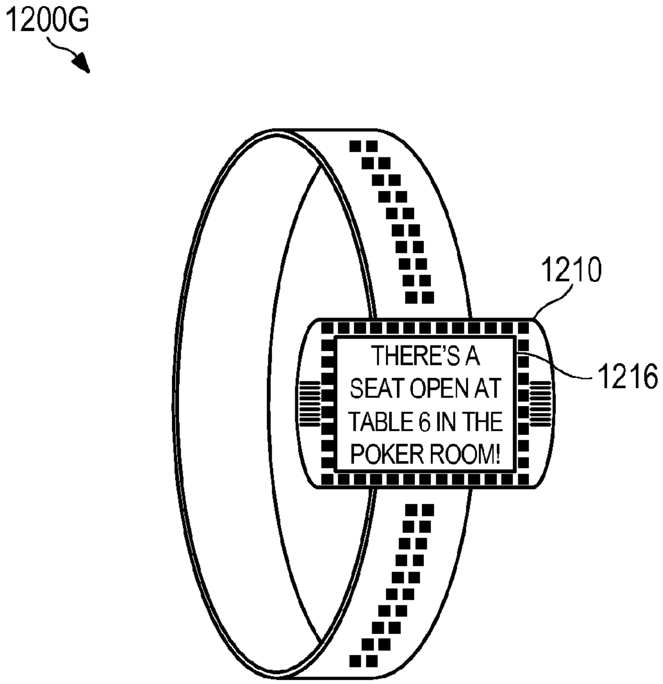
FIG. 12G is another illustration of near field game play on a gaming device, according to one embodiment.
Figure 12H:
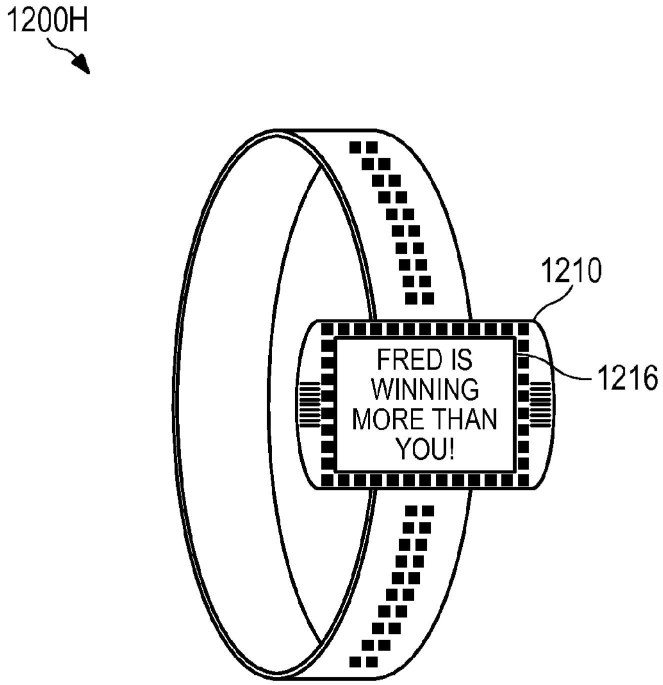
FIG. 12H is another illustration of near field game play on a gaming device, according to one embodiment.

In FIG. 12E, another illustration of near field game play on a gaming device is shown, according to one embodiment. In this example, near field device 1202 may determine that a similar game to one that the player already plays is available and/or new. For example, message area 1216 may state "CAT'S EYE IS A NEW GAME FROM THE MAKER OF YOUR FAVORITE SLOT!" In addition, near field device 1202 may recommend one or more games to play (e.g., YOU MAY ALSO LIKE SAMBA QUEENS SLOTS!) (see FIG. 12F). In addition, an availability notification may be displayed on near field device 1202. For example, a notification message may state "THERE ISA SEAT OPEN AT TABLE 6 IN THE POKER ROOM!" The player may be able to reserve this seat via near field device 1202 (see FIG. 12G). In addition, near field device 1202 may be utilized to see how one or more other people are doing. For example, a message may state "FRED IS WINNING MORE THAN YOU!" (see FIG. 12H). There may be one or more side bet options (e.g., pseudo wagering option) based on which person wins the most amount of money during a specific time frame.

Figure 12J:
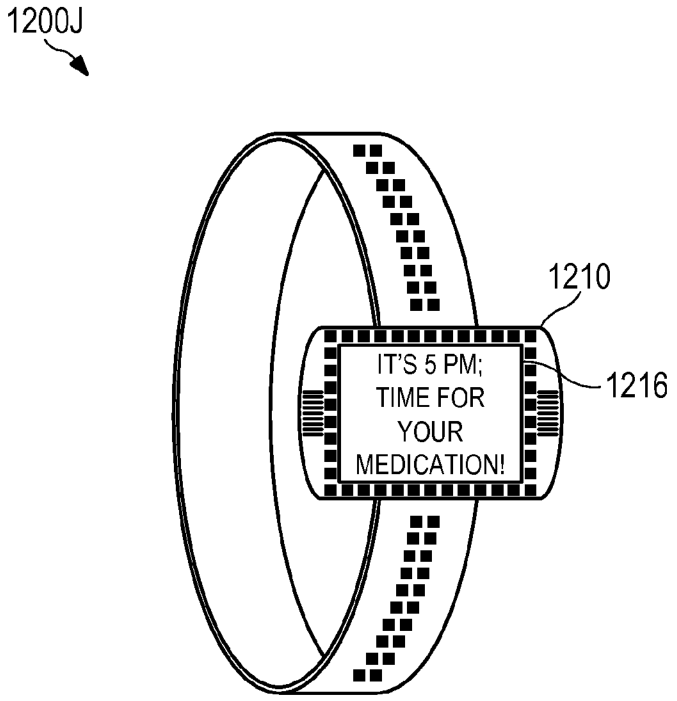
FIG. 12J is another illustration of near field game play on a gaming device, according to one embodiment.
Figure 12K:
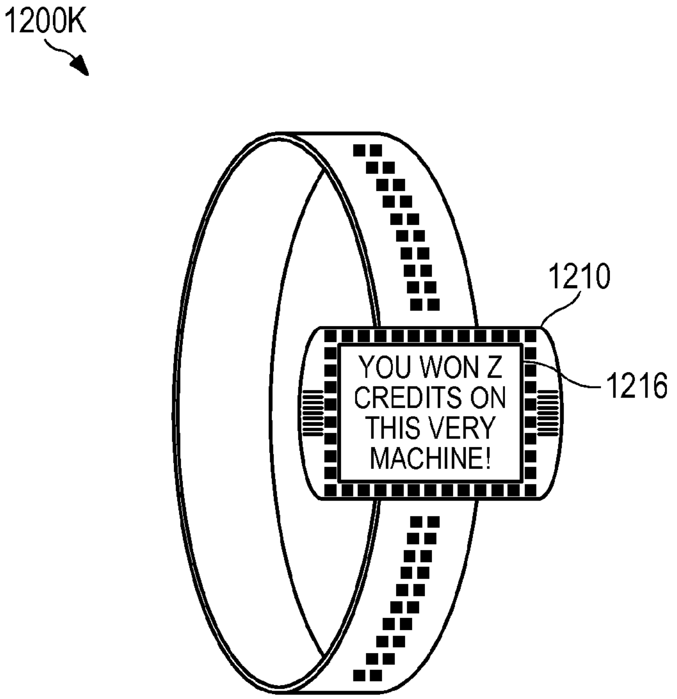
FIG. 12K is another illustration of near field game play on a gaming device, according to one embodiment.
Figure 12L:
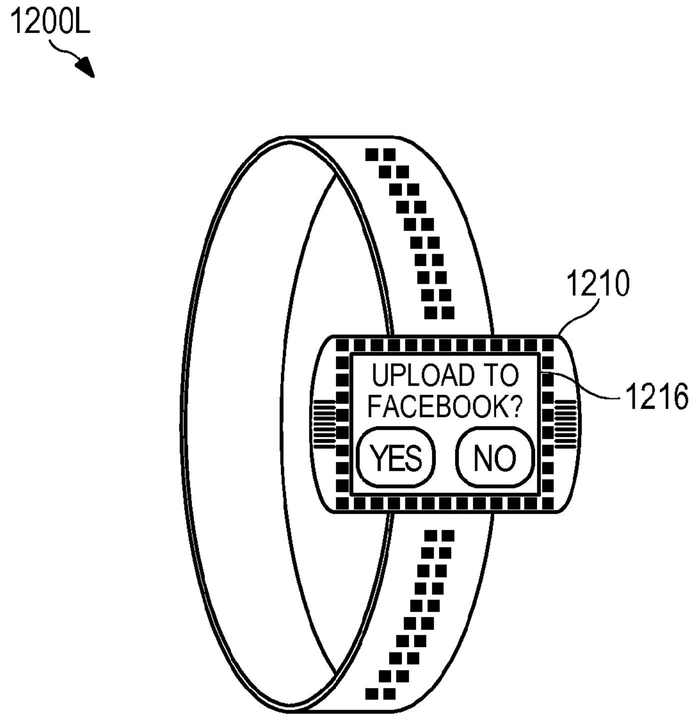
FIG. 12L is another illustration of near field game play on a gaming device, according to one embodiment.
Figure 12M:
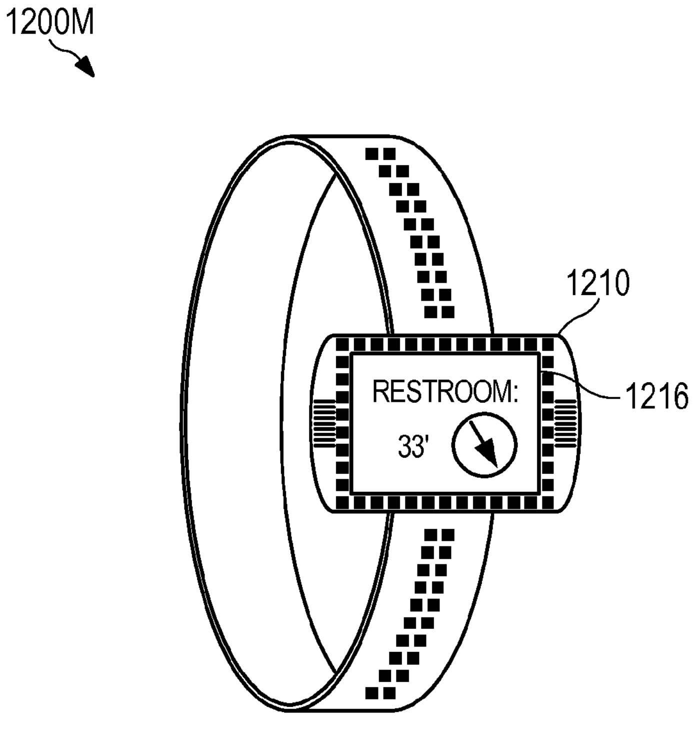
FIG. 12M is another illustration of near field game play on a gaming device, according to one embodiment.
Figure 12N:
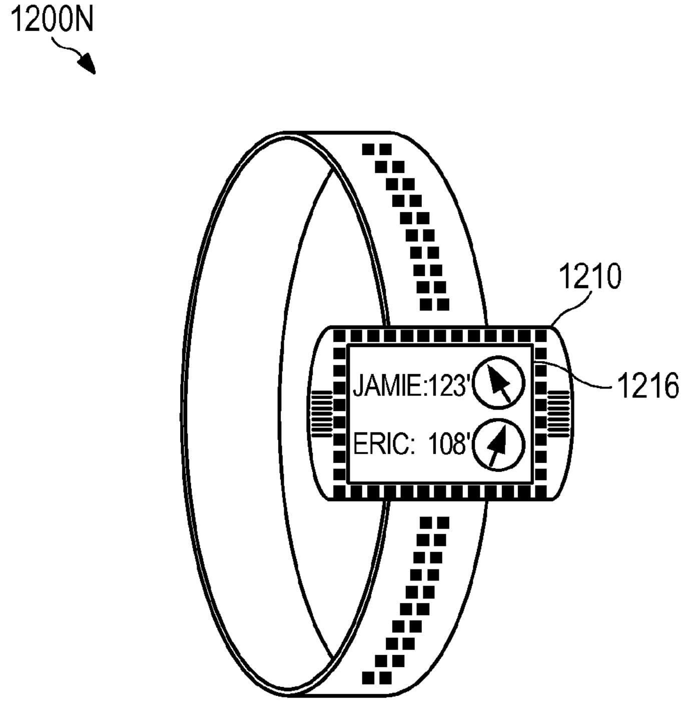
FIG. 12N is another illustration of near field game play on a gaming device, according to one embodiment.
Figure 12P:
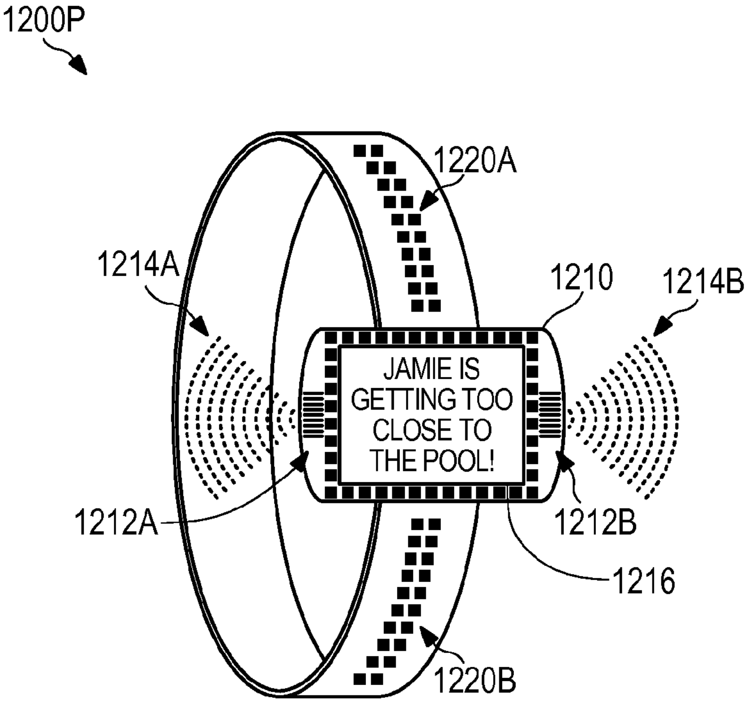
FIG. 12P is another illustration of near field game play on a gaming device, according to one embodiment.
Figure 12R:
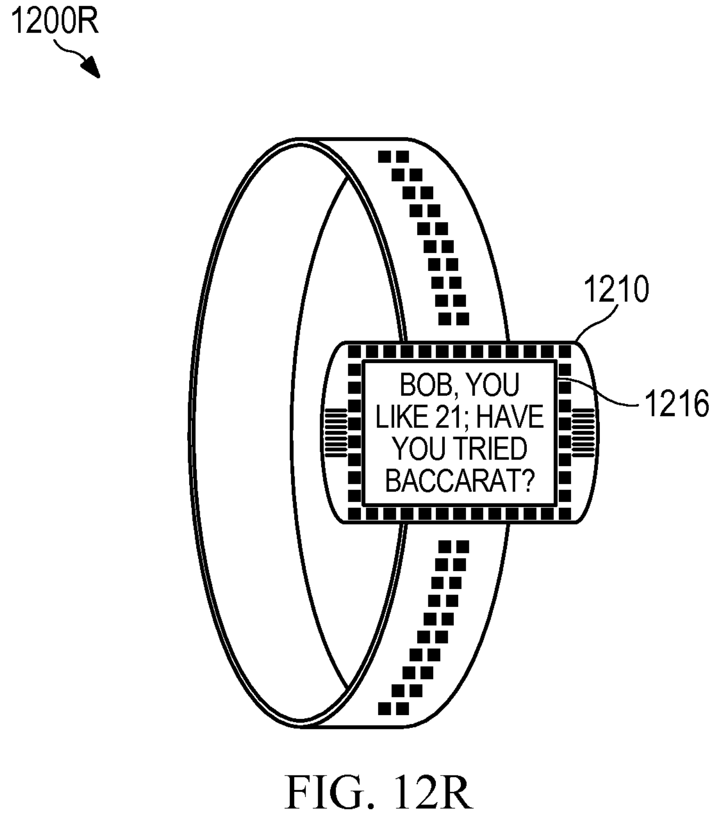
FIG. 12R is another illustration of near field game play on a gaming device, according to one embodiment.

In another example shown in FIG. 12J, near field device 1202 may indicate one or more personal notifications. For example, a message may state "IT'S 5 PM; TIME FOR YOUR MEDICATION!" In various examples, any scheduling information can be utilized and/or linked to the electronic gaming device. In another example, a message may state "YOU WON Z CREDITS ON THIS VERY MACHINE!" (see FIG. 12K). Further, a player may upload one or more gaming events to Facebook and/or any other sites (see FIG. 12L). Lastly, one or more directional data (e.g., restroom directions) may be displayed on near field device (see FIG. 12M). Further as seen in FIG. 12N, the near field device 1202 may display where one or more people are located. In addition, one or more warnings may be generated and/or displayed. For example, a message may state that Jamie (your child) is getting too close to the pool (see FIG. 12P). In addition, near field device 1202 may make one or more table game recommendations. For example, a message may state "BOB, YOU LIKE 21; HAVE YOU TRIED BACCARAT?" (see FIG. 12R).

Figure 13:
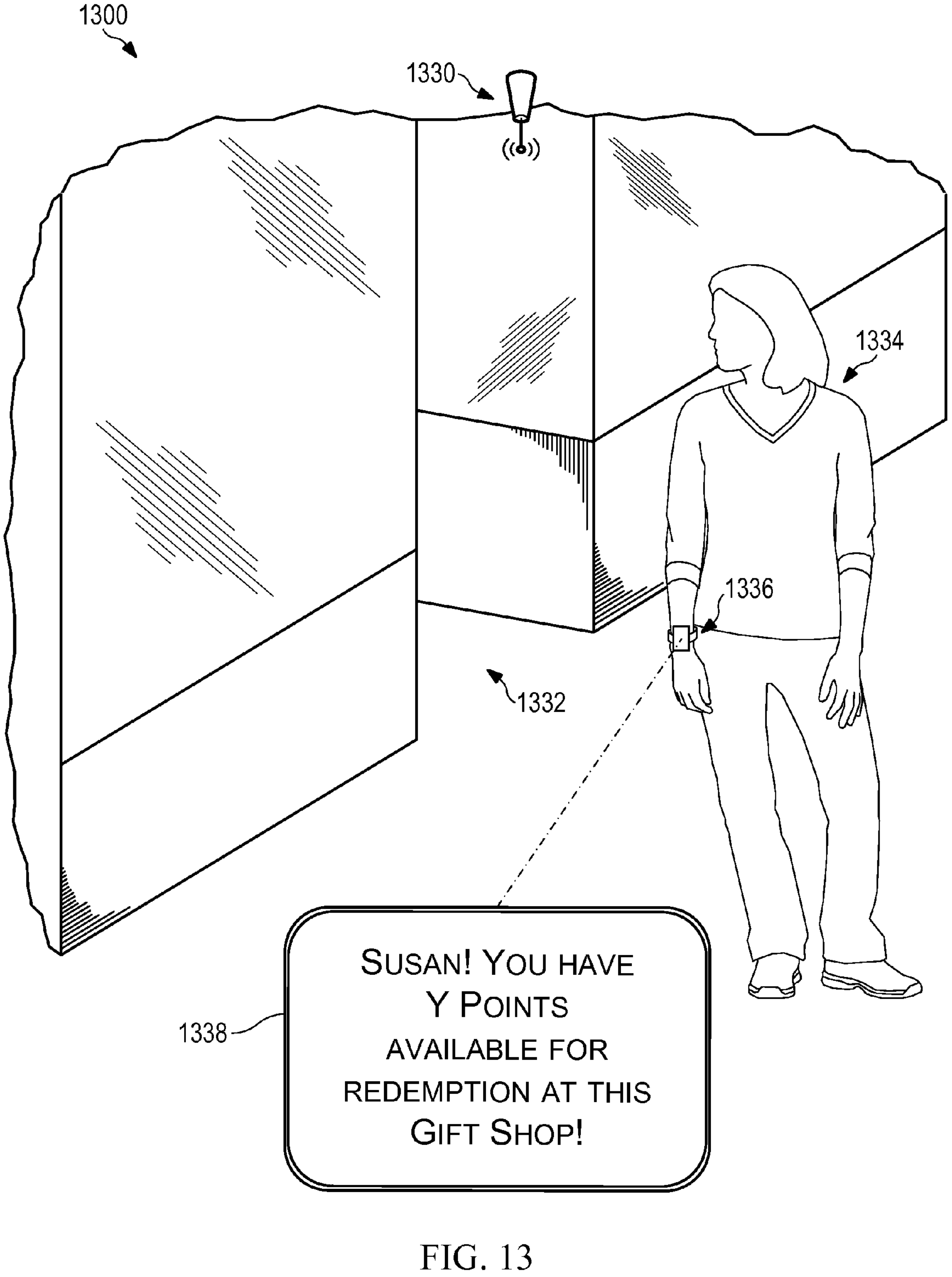
FIG. 13 is another illustration of near field game play on a gaming device, according to one embodiment.

In FIG. 13, another illustration of near field game play on a gaming device is shown, according to one embodiment. In one example, a store 1300 may include one or more sensors and/or communication devices 1330 and one or more doors 1332. Once a person 1334 who is wearing a communication device 1336 may come within a predetermined distance from the store 1300. When the player has entered the predetermined distance a message 1338 may state "SUSAN! YOU HAVE Y POINTS AVAILABLE FOR REDEMPTION AT THIS GIFT SHOP!"

Figure 14:
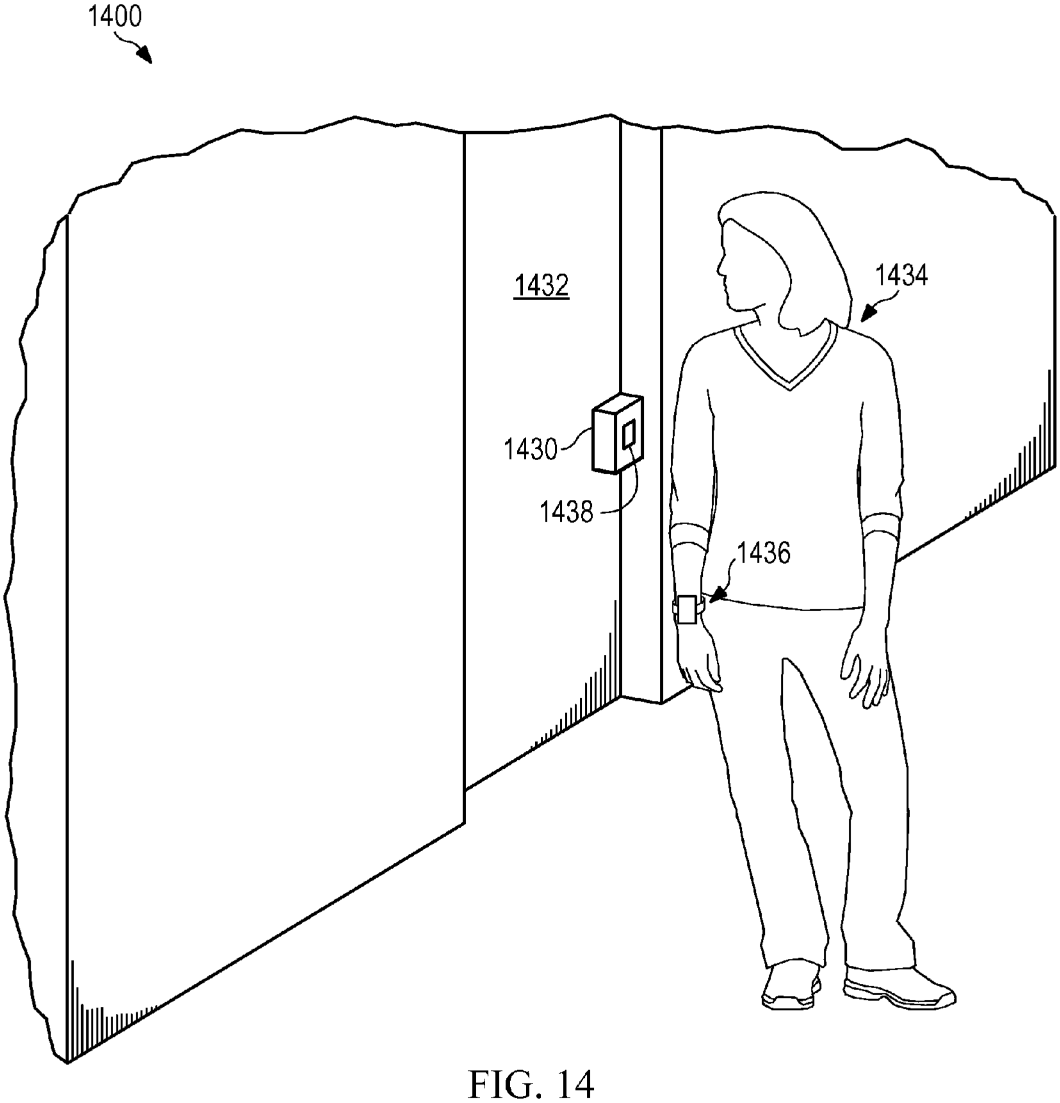
FIG. 14 is another illustration of near field game play on a gaming device, according to one embodiment.

In FIG. 14, another illustration of near field game play on a gaming device is shown, according to one embodiment. A first image 1400 may include a room door 1432, a room lock 1430, a room entry pad 1438 (e.g., a communication device), a person 1434, and a player communication device 1436. In this example, as the player communication device 1436 comes into range of room entry pad 1438 the room becomes unlocked. For security reasons, a player may be required to make one or more motions (e.g., hand moves from left to right etc.) to lock and/or unlock the door.

Figure 15A:
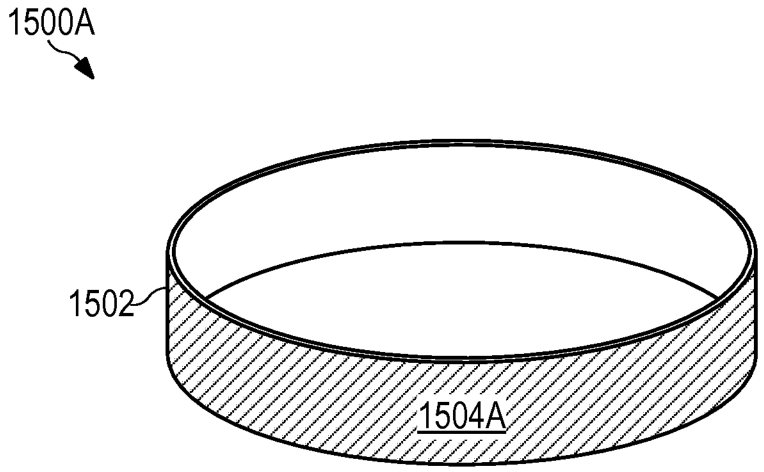
FIG. 15A is another illustration of near field game play on a gaming device, according to one embodiment.

In FIG. 15A, another illustration of near field game play on a gaming device is shown, according to one embodiment. In this example, a near field device 1502 may include a water proof material 1504A which may allow for the near field device 1502 to be utilized in the shower and/or pool and/or waterpark.

Figure 15B:
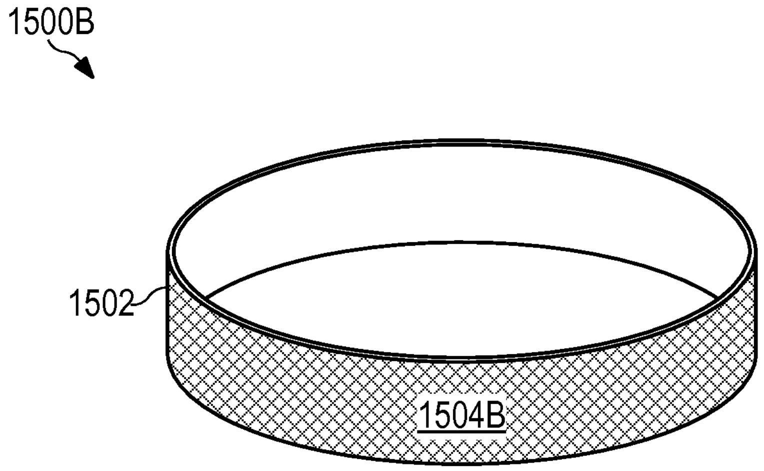
FIG. 15B is another illustration of near field game play on a gaming device, according to one embodiment.

In FIG. 15B, another illustration of near field game play on a gaming device is shown, according to one embodiment. In this example, near field device 1502 may include digital exterior 1504B which may be utilized to tap one or more bingo boards to tab one or more bingo areas.

Figure 16:
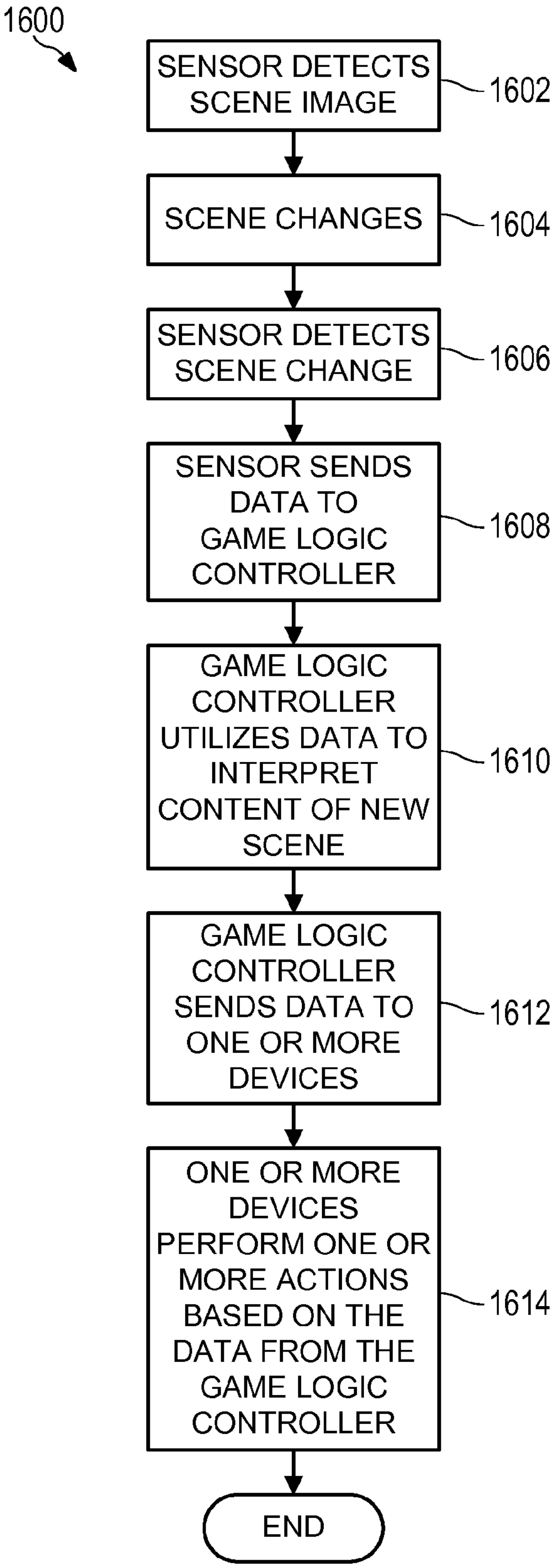
FIG. 16 is a game play flow diagram, according to one embodiment.

FIG. 16 is a flow diagram for depth image sensing of a scene, according to one embodiment of the present disclosure. The method illustrated in FIG. 16 may be a method of detecting a scene change 1600, and may include one or more sensors detecting a scene image (step 1602). In one embodiment, the sensor may detect the scene image in 2D (and/or 3D). For example, the one or more sensors may include a type of camera, which may detect the relative position of pictured objects. In another embodiment, the one or more sensors may detect the scene image in 3D. For example, the sensor may include an IR light source and a CMOS sensor, which may cooperatively work to help determine the relative 3D position of objects within a scene.

At step 1604, the scene detected at step 1602 may change. In one embodiment, the changed scene may be a player attempting to interact with the gaming system via one or more depth image sensing devices. In another embodiment, the changed scene may be a player moving unaware of the one or more depth image sensing devices.

At step 1606, the sensor may detect the scene change. In one embodiment, the at least one depth image sensor may detect movement of a physical body within the scene. For example, at least one depth image sensor may detect the actual movement of a player's hand from a first position to a second position, thereby determining that there was a scene change. In another embodiment, the at least one depth image sensor may periodically detect the scene and communicate data related to the detected scenes, which may then be compared to detect changes in the scene. For example, one or more depth image sensing devices may scan a field at intervals of one second, and upon a first scan of the field detects a player's hand at a first position, and upon a second scan detects the player's hand at a second position. This data may then be utilized to determine that there was a scene change. The timed intervals may be any length of time (e.g., 1 second, 2 seconds, 3 seconds, 10 seconds, 5 minutes, etc.).

At step 1608, the sensor may send data to a game logic controller. In one embodiment, such data may be transmitted wirelessly. In another embodiment, such data may be transmitted via a wired connection. In another embodiment, such data could be communicated via a bus connection (e.g., for example, a universal serial bus ("USB") connection).

At step 1610, the game logic controller may utilize the data received from the sensors to interpret the content of the new scene. In one embodiment, the data may be basic data, which may represent at a digital level the content of the scene change, with no associated interpretation. For example, the data may only include a 3D representation of the changed scene, but may not include any associated interpretation of what any of the bodies (and/or objects) within the scene are and/or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change, along with one or more associated interpretations. For example, the data may include a 3D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another example, the data may only include a 2D representation of the changed scene, but may not include any associated interpretation of what any of the bodies (and/or objects) within the scene are or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change along with one or more associated interpretations. For example, the data may include a 2D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another example, the data may include both a 3D representation and a 2D representation of the changed scene, but may not include any associated interpretations of what any of the bodies (and/or objects) within the scene are or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change, along with one or more associated interpretations. For example, the data may include both a 2D representation and a 3D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another embodiment, the data transmitted to the game logic controller at step 1610 may include at least some associated interpretation. For example, the data received from the sensors may include interpretive data that a hand moved from a first point to a second point, and then the game controller may then determine what such movement of a player's hand represents. In this example, it may be possible to share the data interpretation workload amongst the sensors and the game logic controller.

At step 1612, the game logic controller may send data to one or more devices. In one embodiment, the data the game logic controller forwards at step 912 may include new data, such as data resulting from interpreting the data received from the sensors. For example, the game logic controller may interpret the data from the sensors and determine that a player moved their hand from a first point to a second point, and then may further determine that this action is a recognized action for performing a first command in a play of a game, and then may forward new data related to the first command to one or more devices.

In one example, if the data indicates a first activity (e.g., walking), then a first action (e.g., initiate a light display) may be commanded by the one or more processors to be implemented on one or more gaming devices (or non-gaming devices and/or any combination thereof). In a second example, if the data indicates a second activity (e.g., sitting), then a second action (e.g., initiate program one, which may be a game overview) may be commanded by the one or more processors to be implemented on one or more gaming devices (or non-gaming devices and/or any combination thereof). In another example, if the data indicates a third activity (e.g., groups of people), then a third action (e.g., initiate a multi-game presentation) may be commanded by the one or more processors to be implemented on one or more gaming devices (or non-gaming devices and/or any combination thereof). In another example, if the data indicates a fourth activity (e.g., groups of people playing another game), then a fourth action (e.g., initiate an attraction mode, which may include a bonus for coming over to play this game) may be commanded by the one or more processors to be implemented on one or more gaming devices (or non-gaming devices and/or any combination thereof).

In one example, one or more sensors may detect the absence of a patron (e.g., an empty chair and/or an empty scene in front of the cabinet) and based on this detection, one or more processors may initiate an attract mode, an activity rest mode, and/or a low light mode.

In another example, if the patron is seated but there are no credits present in the machine, one or more sensors may prompt the game controller to present graphics and/or audio presentations inviting the patron to become a player by entering credits.

In another example, the overall function of the sensor system (e.g., 2D, 3D, and/or a combination thereof) may be to detect the presence, orientation, and movement of a person and/or a group of patrons within the game system area and thereby altering and/or adapting the interaction of the game system with the patrons either in an attract mode during non-game play and/or during game play.

In another example, a screen cursor may follow a player's pointing gesture—and gestures to select targets under the cursor, and gestures to execute those targets.

In another embodiment, the data transmitted by the game logic controller at step 1612 may include at least a portion of the data the game controller may have received from the sensor at step 1608. For example, the sensor may have sent data representative of a player's hand moving to the game logic controller, which then included such data representative of the player's hand moving to one or more devices.

In another embodiment, the game logic controller may determine which of the one or more devices may need to perform one or more actions based on the received data, and then may only forward such data to those devices. For example, the game logic controller may determine that the data representative of a specific hand movement by the player should cause an associated display screen to change displays, a command may be sent to the associated display screen to change displays, but the command may not be sent to an associated ticket printer as the ticket does not have any associated actions to perform. In another embodiment, the game logic controller may determine an appropriate command at step 1610 based on the data received at step 1608, and may then broadcast the determined command to all associated devices. The devices may have the appropriate configuration in order to determine if the broadcast command applies to each machine and/or whether the device needs to perform an action based on the broadcast command.

In one example, a command signal to initiate one or more actions may be transmitted to one or more gaming devices based on data from one or more scenes. In this example, an attraction presentation signal may be sent to three gaming devices. However, only two gaming devices (e.g., the first gaming device and the second gaming device) may initiate an attraction presentation because the third gaming device is already in use. The one or more scene data may be generated by any number of devices (e.g., first gaming device, first non-gaming device, second gaming device, second non-gaming device, third gaming device, etc.). In another example, a command signal may be transmitted to a first gaming device, a first non-gaming device, a second gaming device, a third gaming device, and a fourth gaming device. However, fourth gaming device may not initiate the active requested by command signal because of the distance fourth gaming device is away from one or more locational data points (e.g., the scene has moved away from fourth gaming device).

In one embodiment, the one or more devices may be part of the same physical structure as the gaming system. For example, the one or more devices may be at least one display screen, which may also be utilized to display a play of a game on the gaming system. In another embodiment, the one or more devices may not be part of the same physical structure as the gaming system. For example, the one or more devices may be a separate computer located at a casino bar, which may, based on the data received from the game logic controller, display a request for a waitress to visit the player playing at the gaming system.

In another example, one or more scenes may initiate one or more activities (e.g., attraction mode, attraction presentation, drink service, food service, help, host request, emergency response, special promotion, etc.). In one example, based on data from one or more scenes, an emergency response is required (e.g., someone is ill, being threatened, etc.). In another example, all of the gaming machines (and/or a portion thereof) are being utilized in a specific area, which generates a special promotion (e.g., five free spins for everyone, 10 percent extra payout for the next five minutes, etc.).

At step 1614, one or more devices may perform one or more actions based on the data from the game logic controller. In one embodiment, multiple devices may receive the same data, and each may then have to filter the received data to determine if they need to perform any actions based on the data. In another embodiment, the game logic controller may filter at least some of the data and forward data to one or more devices only if the receiving one or more devices is/are required to perform an action based on the received data.

Figure 17:
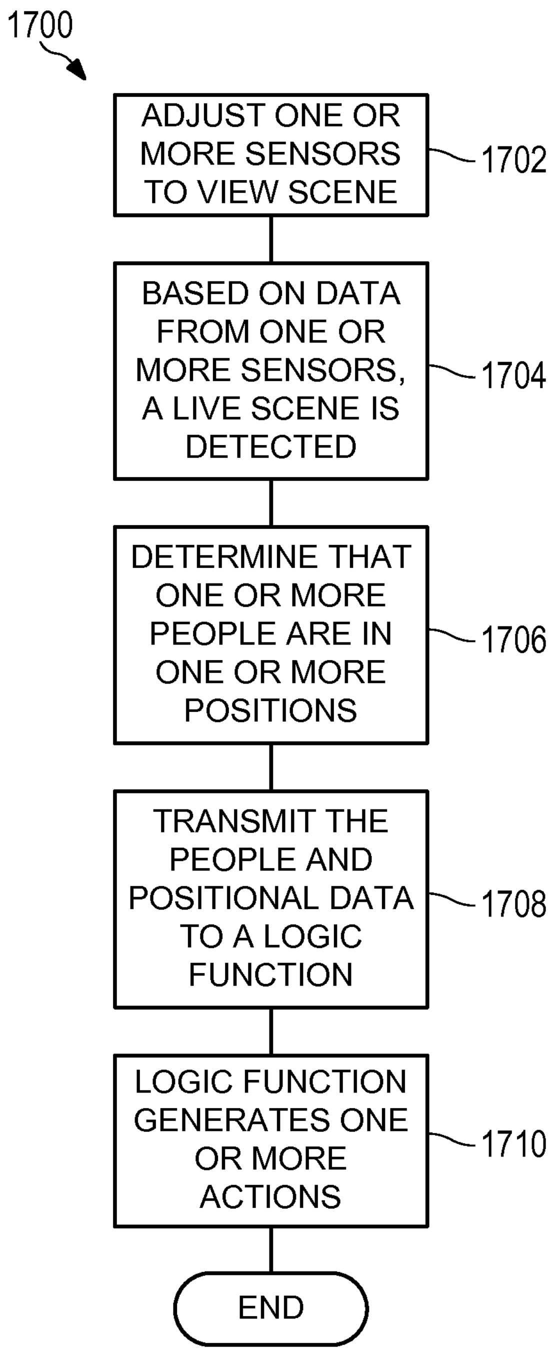
FIG. 17 is a game play flow diagram, according to one embodiment.

FIG. 17 is another flow diagram for depth image sensing of a scene, according to one embodiment as disclosed herein. The method may include detecting a live scene 1700, and may include adjusting one or more sensors to view a scene (step 1702). In one embodiment, step 1702 may include a physical adjustment to one or more depth image sensing devices. For example, one or more depth image sensing devices may include servos and/or similar movement devices, in order to physically move the one or more depth image sensing devices and/or components thereof. In one example, a movement device may adjust the position of the depth image sensor as a whole in order to adjust an associated field of view. In another example, one or more depth image sensing devices may allow different focusing to occur with one or more components of the one or more depth image sensing devices. For example, one or more sensor components may include a physical lens, and the lens may be physically manipulated in order to adjust an associated field of view.

In another embodiment, step 1702 may include a digital adjustment. For example, one or more sensor components may include a physical lens, and a picture relayed by the lens may be digitally zoomed or otherwise digitally enhanced. In another example, hardware components of the one or more depth image sensing devices may be recalibrated via software instructions in order to relay better data from a viewed scene.

At step 1704, a live scene may be detected based on the data from one or more sensors. In one embodiment, a live scene may include people making movements. In another embodiment, a live scene may include people making movements in relation to a play of a game on an associated gaming system. In another embodiment, a live scene may include multiple people making movements in relation to a play of a multiplayer game on a multiplayer gaming system. In one embodiment, the detection of a human body part (e.g., for example, a hand) may determine that a live scene is detected. In another embodiment, the detection of movement within a certain distance of the one or more depth image sensing devices may determine that a live scene is detected.

At step 1706, it may be determined if one or more people are in one or more positions. In one embodiment, the system may attempt to determine the location of one or more people in relation to one or more associated gaming system interfaces. For example, a multiplayer gaming system may have interfaces for five different players, and the system may attempt to determine the location of persons at each of the interfaces.

At step 1708, the method may include the step of transmitting the people and positional data to a logic function. In one embodiment, the logic function may reside on a specifically configured processor. In another embodiment, the logic function may reside on a game logic controller. In one embodiment, the logic function may be a dedicated logic function, wherein it may solely function to receive people and positional data. In another embodiment, the logic function may have multiple tasks it is capable and/or responsible to undertake.

At step 1710, the logic function may generate one or more actions. In one embodiment, the one or more actions may be commands to one or more devices. In another embodiment, the one or more actions may be the retransmission of part or all of the people and positional data to another logic function and/or one or more devices. In another embodiment, the one or more actions may include a reconfiguration of, and/or writing to, at least one memory device.

Figure 18:
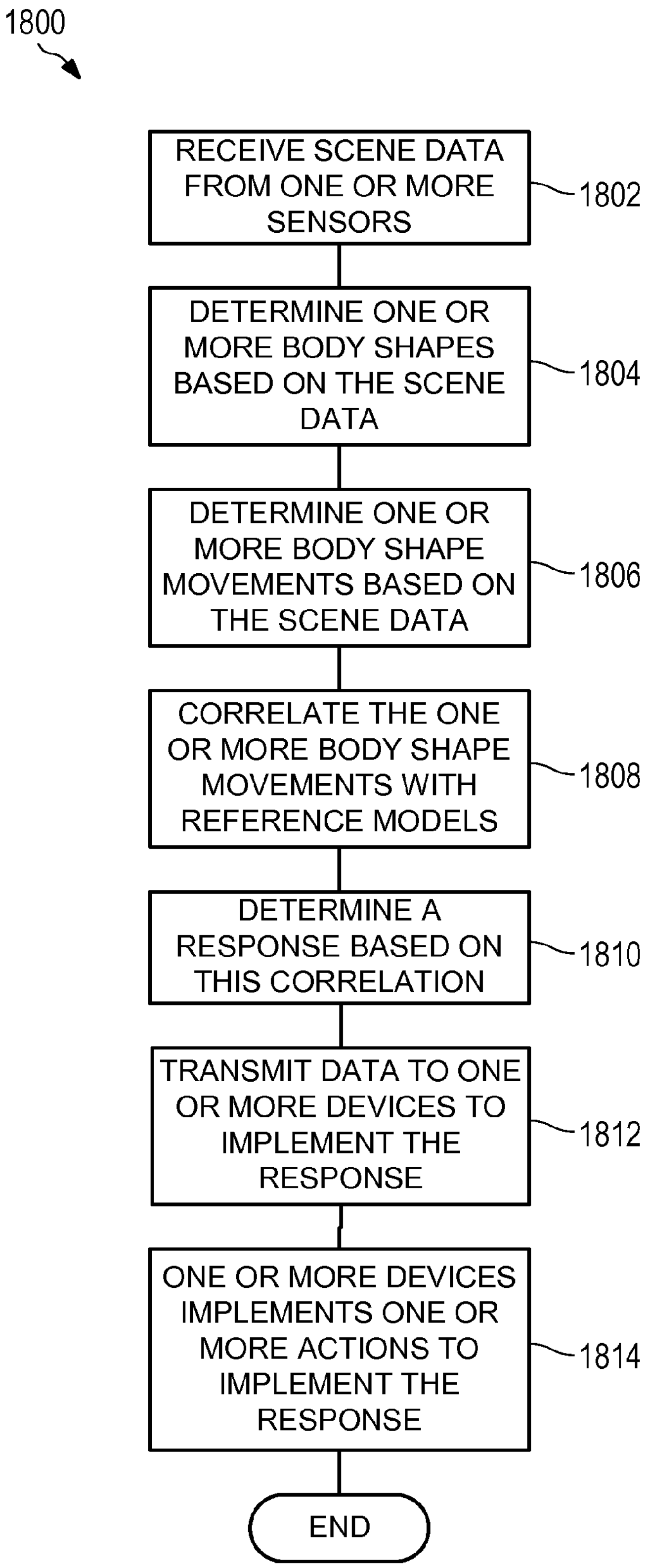
FIG. 18 is a flow diagram for game play, according to one embodiment.

FIG. 18 is another flow diagram for depth image sensing of a scene, according to one embodiment. FIG. 18 may be a method of correlating scene data 1800, and may include receiving scene data from one or more sensors (step 1802). In one embodiment, the data may be basic data, which may represent at a digital level the content of the scene, with no associated interpretation. For example, the data may only include a 3D representation of the scene (also may be 2D and/or a combination of 2D and 3D), but may not include any associated interpretation of what any of the bodies (and/or objects) within the scene are or what the bodies (and/or objects) are doing. In another embodiment, the data transmitted may include at least some associated interpretation. For example, the data received from the one or more sensors may include interpretive data that a hand moved from a first point to a second point. In this example, it may be possible to share the data interpretation workload amongst the sensors and a separate logic device.

At step 1804, the method may include determining one or more body shapes based on the scene data. In one embodiment, the system may recognize body shapes. For example, the system may recognize hand and fingers, but may not recognize feet. In another embodiment, the system may recognize each body extremity and/or the entire body.

At step 1806, the system may recognize one or more body shape movements. In one embodiment, the system may recognize some, but not all body shape movements. For example, the system may recognize a hand moving back and forth, but may not recognize a head shaking. In another embodiment, the system may recognize a preset number of body shape movements (e.g., the system may recognize five body shape movements; the system may recognize three body shape movements, etc.). In another embodiment, the system may expand the number of recognized movements it may recognize based on repeated observation of such movements, and in a sense, it may learn additional movements.

At step 1808, the method may include the step of correlating the one or more body shape movements with one or more reference models. In one embodiment, the one or more reference models are preloaded on the system. In another embodiment, some of the one or more reference models are preloaded on the system, but the system is configured to allow for the dynamic creation of additional models. For example, the system may store in memory one or more body shape movements that it was not able to determine, and also store in memory a subsequent action made by a player, such as an input made at the gaming system and/or a different body shape movement, and upon determining a pattern in such historical data, add the previously unrecognized body shape movement and its associated desired action to the listing of reference models. In this sense, the system may be able to learn additional body shape movements. In another example, the system may be able to learn movement patterns (e.g., body movements), but not have any preloaded movement profiles.

In another embodiment, reference models may include data representative of common movements. For example, a gaming system may include a bonus feature that instructs a player to move one or both hands in the play of the bonus feature, and the gaming system may include reference models, which may include data representative of a player playing with a left hand only, a player playing with a right hand only, and/or a player playing with both hands. In this example, it may be possible to configure an associated game logic controller to interpret received data even if one of the player's hands is hidden from view of the one or more sensors by another body part, which may help avoid incorrectly determined inputs. In one example, the system may obtain data from one or more other gaming devices and/or non-gaming devices to fill in any data gaps.

At steps 1810-1814, the method may include the steps of determining a response based on the correlation from step 1808 (step 1810), transmitting data to one or more devices to implement the response (step 1812), and/or the one or more devices implementing one or more actions to implement the response (step 1814). In one embodiment, the response may be selected from a listing of a plurality of possible responses, and may indicate a result in a game play mechanic. For example, a determined correlation may relate to a specific desired action by a player in a play of a gaming feature, and the associated determine response may be an indication of the outcome of the desired action, which is then, transmitted at least one display device, which then displays the determined outcome.

Figure 19:
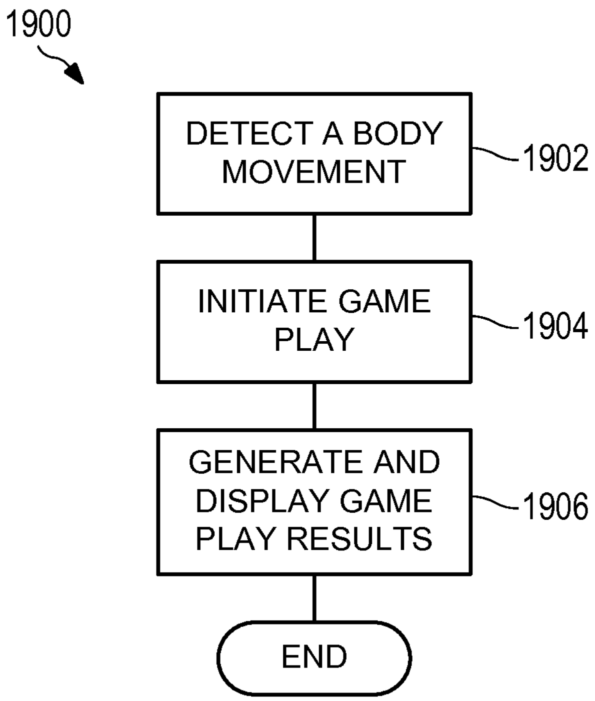
FIG. 19 is a flow diagram for game play, according to one embodiment.

FIG. 19 is another flow diagram for depth image sensing of a scene, according to one embodiment. The method illustrated in FIG. 19 may be a method of initiating game play based on scene data 1900, and may include detecting a body movement (step 1902). Such detection may be done in accordance with FIGS. 16-19, as discussed above.

At step 1904, the method may include the step of initiating game play. In one embodiment, one of a plurality of detected body movements may initiate game play. For example, a movement of a player's hand in a side-to-side motion, or a back-and-forth motion, may initiate a new play of the game. In another embodiment, the listing of movements, which may initiate a new play of a game, may be small. It is contemplated that due to the legal nature of initiating a new play of a game, the system provider may want to take measures to insure that player movements, which may be interpreted to initiate a new game play are limited and/or deliberate, in an effort to avoid misinterpreted player actions. In one embodiment, step 1904 may initiate a play of a secondary or bonus game. In another embodiment, the gaming system may allow only secondary or bonus games to be initiated by detected body movements. It is contemplated that this embodiment may be viewed as desirable in order to avoid unintentional initiations of new games by players, which could have legal ramifications.

At step 1906, the method may include the step of generating and displaying the game play results. In one embodiment, step 1906 may include the generating and displaying of results for a primary game. In another embodiment, step 1906 may include the generating and displaying of results for a secondary or bonus game. In one embodiment, the detected body movement from step 1902 may influence the generated and displayed game results. In another embodiment, the detected body movement may influence the displaying of the game results, but not the results themselves. For example, if a detected body movement included a player's hand moving from bottom to top, the reels of a video slot game may then spin from bottom to top based on the detected hand movement, but the results may be the same even if the player had caused the reels to spin in the opposite direction. In such an example, the detected body movement may still provide value in allowing the player to perceive control over the spin without actually allowing the player to control and/or affect the actual outcome. In another embodiment, the detected body movement may only cause the game play to be initiated, and may not affect how the game play is displayed and/or the results of the game play.

In another example, the method may include determining one or more responses, and may include receiving scene data from one or more sensors. In one embodiment, the data may be basic data, which may represent at a digital level the content of the scene, with no associated interpretation. For example, the data may only include a 3D representation of the scene, but may not include any associated interpretation of what any of the bodies (and/or objects) within the scene are or what the bodies (and/or objects) are doing. In another embodiment, the data transmitted may include at least some associated interpretation. For example, the data received from the one or more sensors may include interpretive data that a hand moved from a first point to a second point. In this example, it may be possible to share the data interpretation workload amongst the sensors and a separate logic device.

The method may include the steps of determining one or more responses based on the received scene data and implementing one or more actions on one or more gaming devices based on the one or more determined responses. In one embodiment, the determined response and/or implemented action may be made apparent to the player. For example, in response to a player moving his hand in a certain movement, a new play of a base game may be initiated. In another embodiment, the determined response and/or implemented action may not be made apparent to the player. For example, a repeated movement by a player may be determined to be a security risk, and the implemented action may be to send an electronic message to a security station, so that security personnel may be dispatched to further investigate and/or any other action may be taken.

Some of the embodiments disclosed may utilize one or more of the processes disclosed herein, and/or may utilize one or more of the depth image sensing devices disclosed herein.

In one example, a player may pick a symbol by tapping the air. In another example, the player may move an object located on the gaming system (e.g., a ship, a horse, a person, etc.) by turning their body.

In one embodiment, a gaming system may utilize one or more depth image sensing devices in order to initiate one or more sequences used to attract players. In one example, the one or more depth image sensing device may detect people walking by the machine, and the gaming system may utilize the information received from the one or more depth image sensing device to cause an associated display device to display images that are specific to the detected people. For example, four people may walk by the machine, and the gaming system, utilizing one or more depth image sensing devices, may cause an associated display device to display any four images (e.g., monkeys, GODS, woman, cars, etc.) walking across the screen at approximately the same rate. In another example, each of the monkeys may have a characteristic that is visually similar to one of the people walking by (e.g., hair length, relative height to the other people/monkeys, posture, gender, age, etc.). In another example, the images may move from one or more gaming devices to one or more other gaming devices.

In another example, a gaming system may utilize such detection data to use an audio system to direct sound and/or speech based on the detection data. For example, if a tall male is walking by slowly, the gaming system may utilize related detection data to cause an audible, "Hey, tall guy. Why don't you come play me," and/or other such personalized sound and/or speech. For example, the player may be wearing a cowboy hat and the message may be, "Hey, Cowboy. Why don't you sit for a spell and give this game a roll".

In a similar example, the one or more depth image sensing devices may detect that a person is looking at the game screen, and the gaming system may detect that the game is not actively being played, so the gaming system may initiate activities that are directed to inform the person about how the game mechanics may work. For example, at least one display device associated with the gaming system may start displaying a tutorial on the game play mechanics. In another example, the audio system may cause information on the game play mechanics to be broadcast. In one example, the gaming system may offer a free play bonus (e.g., five spins, 10 percent of inserted credits, etc.).

In another embodiment, the gaming system may utilize one or more depth image sensing devices in order to determine the state of the gaming system. For example, if the gaming system does not detect any people moving within a defined area around the gaming system, the gaming system may cause one or more components to go into a sleep mode, and/or otherwise cause them to utilize less power. In another example, the gaming system may cause one or more components to awake if the gaming system detects movement in close proximity to the gaming system. In such example, the one or more depth image sensing devices could be beneficial in allowing the gaming system to use less energy and/or increasing the useful life of associated gaming system components.

In another embodiment, a gaming system may utilize one or more depth image sensing devices for security purposes. In one example, the one or more depth image sensing devices may detect a repetitive pattern of unusual movements by a player. In another example, the one or more depth image sensing devices may detect a player attempting to access secure parts of the gaming system. In another example, the gaming system may analyze data received from the one or more depth images sensing devices and determine a security threat. In still another example, the gaming system may cause a message to be sent to a security system and/or a communication terminal at a security personnel location, which may be utilized to have security personnel further investigate.

In one embodiment, the gaming system may utilize one or more depth image sensing devices for player security purposes. In one example, the one or more depth image sensing devices may detect that a person has suspiciously walked up behind a player, and may cause an associated audio/visual device to alert the player of such an action. In another example, the gaming system may cause an associated display device to display a video likeness of the scene behind a player, as sort of a digital rear-view mirror, so that the player can become aware of his/her surroundings. In another example, the gaming system, via the one or more depth image sensing devices, may determine that a person walking by has taken something from the player's chair (e.g., a purse, etc.), and may alert the player and/or security personnel.

In one embodiment, the gaming system may utilize one or more depth image sensing devices for drink service purposes. For example, the gaming system may, based on data received from one or more depth image sensing devices, cause a casino waitress to visit the player at the machine with a new drink and/or in order to take a new drink order. In one example, the gaming system may recognize a specific gesture made by a player to indicate the player's desire to have drink service. In another example, the gaming system may then alert a nearby waitress station about the request. In another example, the gaming system may then cause an associated display device to display a plurality of drink choices, and allow the player to make a further input as to which drink they desire, and then may cause the selected choice to be communicated to a nearby bar station. In another example, the gaming system may recognize certain movements made by the player that may indicate that the player desires another drink. For example, it may have been detected that the player raised an object to his mouth a predetermined number of times (e.g., 3 times) and/or for a predetermined amount of time (e.g., 5 seconds), which the game logic controller may have been configured to determine that this action means that the player has taken a drink enough times to possibly be ready for a new drink, and so the game logic controller may then cause an associated display screen to display a drink order screen and/or alert a nearby waitress station.

In one embodiment, the gaming system may utilize one or more depth image sensing devices for food service purposes. In one example, the gaming system, via the one or more depth image sensing device, may detect a certain player movement and determine that the player wishes to order food. In one example, the gaming system may cause a food menu to be displayed. In another example, the gaming system may then detect an input made by the player indicating their food selection. In another example, the gaming system may communicate with a casino kitchen and/or other food provider, which may then cause a person to visit the player.

In one embodiment, a gaming system may utilize one or more depth image sensing devices for host service purposes. In one example, the gaming system, via the one or more depth image sensing device, may recognize one or more specific gestures made by a player as indicating that the player desires assistance by casino personnel. In another example, the gaming system may cause a casino host page to be displayed on an associated display device, and/or cause a communication to casino host personnel in regards to the request. In another example, the gaming system may recognize certain movement by the player as indicative of a player that may need assistance, and may notify casino personnel. For example, the gaming system may determine that a player's head moving left then right and then back to left, in repeated fashion, may indicate the player is looking around for assistance, and the gaming system may then communicate to a nearby casino host station the location of the detected movement. In another example, the player may take a predetermined amount of time (e.g., 1 minute, 2 minutes, 5 minutes, etc.) that may indicate the player is losing interest in the game, which the gaming system may then communicate to a nearby casino host station, electronic gaming device 100, and/or electronic gaming system 200 that the player needs some incentive (e.g., a free spin, a free drink, etc.) to keep them interested.

In one embodiment, a gaming system may utilize one or more depth image sensing devices for play of a primary wagering game. For example, the gaming system may recognize certain gestures made by a player as indicating one or more commands to the gaming system. In another example, the gaming system may allow a player to begin a spin of reels by utilizing hand gestures. In another example, the gaming system may display the spinning of the reels based on the hand gesture detected by the one or more depth image sensing device. For example, a detected first hand gesture may cause the reels to spin in a traditional top to bottom fashion, while a detected second hand gesture may cause the reels to spin in a nontraditional bottom to top fashion. In another example, the gaming system may recognize one or more gestures made by a player to cause the reels to stop spinning, which may be referred to as "slamming" the reels, or otherwise causing the reels to suddenly stop spinning prior to their default stop time.

In another embodiment, a gaming system may provide educational resources to players about utilization of the one or more depth images sensing devices. In one example, the gaming system could provide an informational display, such as a help screen, which may provide information on player gestures and their intended interpretation by the gaming system. In another example, the gaming system could provide one or more audio/visual resources, such as a tutorial video, in order to communicate to a player information on player gestures and their intended interpretation by the gaming system.

In one embodiment, a gaming system may utilize one or more depth image sensing devices for play of a secondary and/or bonus game. In one example, the gaming system may allow a player to make an input in space, without physically touching the machine. For example, in a traditional pick-and-reveal game, a player was required to touch the screen of a gaming system in order to make inputs as to which selection to pick, but in accordance with the present disclosure, the player may be allowed to make such an input in space, without ever physically touching the gaming device.

In another example, the gaming system may be able to detect the player's gestures in a 3D plane, which may then allow the game to offer gaming mechanics, which require 3D interaction. For example, a gaming system may provide a game with a 3D representation of a playing board, and the player may be able to manipulate game pieces around the virtual 3D board via 3D movements that the gaming system is able to detect. In another example, the gaming system may allow a player to make 3D gestures, which may then be represented on a virtual 3D screen in similar 3D movements of a piece. For example, a player may make both up-and-down and front-to-back gestures, and the gaming system may represent a bottle of champagne being shaken in similar up-and-down and front-to-back gestures until the cork explodes, which may then reveal an award.

In one embodiment, a gaming system may utilize one or more depth image sensing devices for use in a multiplayer game offering. In one example, a plurality of gaming systems are linked together in a multiplayer offering. In another example, a plurality of gaming systems are linked together and to one or more community display devices in a multiplayer offering. In still another example, each of the plurality of gaming systems may individually include one or more depth image sensing devices. In another example, the plurality of gaming systems collectively may be associated with one or more depth image sensing devices. In another example, the plurality of gaming systems collectively may be associated with one or more depth image sensing devices, but may not individually include depth image sensing devices. In another example, one or more depth image sensing devices may be associated with the one or more community display devices. In another example, the actions of a player from one of the networked gaming systems may cause the one or more community display devices to display one or more new display images. For example, the one or more community display devices might display a large selection game, and an associated one or more depth image sensing device may detect a first player making a specific selection of one of the displayed selections, and may thereafter display that associated selection as being picked by the first player.

In one embodiment, a gaming system may utilize one or more depth image sensing devices to partially or wholly display a virtual recreation of a detected image. In one example, the gaming system may display a virtual hand that moves about a displayed image based on the player's actual movement of their hand. In another example, the gaming system may display a virtual humanoid figure that simulates one or more characteristics of a detected person. For example, if a player is tall and has long hair, the gaming system may display a virtual humanoid character (e.g., avatar) that is relatively tall and/or has long hair. In another example, the gaming system may display a virtual character that mimics movement made by a detected person. For example, if a player jumps, the gaming system may present a displayed virtual character jumping.

In one embodiment, a gaming system may utilize one or more depth image sensing devices to partially or wholly display simulated control over virtual icons. In one example, the gaming system may cause a displayed game piece, for example, a chess piece, moving based on one or more detected movements of a player's hand. In another example, the gaming machine may cause a cursor or other pointing representative display to move based on one or more detected movements by a player.

In another embodiment, a gaming system may utilize one or more depth image sensing devices to change a displayed image, but may not display any images that are representative of the player and/or the player's movements. For example, a gaming system may have multiple informational display screens, which a player may have the option of viewing, and the gaming system may allow a player to navigate through multiple screens by making certain gestures (e.g., for example, a swiping or page-turning gesture) but may not include a separate icon representative of the player's hand.

In one embodiment, the electronic gaming system may include one or more display devices, one or more depth image sensing devices, one or more memory devices, and/or one or more processors. The one or more processors may receive a plurality of instructions, which when executed by the one or more processors, may cause the one or more processors to operate with the one or more display devices and the one or more depth image sensing devices to generate one or more gaming functions. The one or more gaming functions may include one or more determining a wager placed by a player of the electronic gaming system, causing the at least one display device to display a first screen, detect a body part of the player, identifying the detected body part, detecting a movement (e.g., 2D, 3D, and/or both) of the detected body part, correlating the detected movement and the identified body part to one of a plurality of reference models, determining a player input based on the correlated reference model, determining a second screen to display based at least in part on the determined player input, causing the at least one display device to display the second screen, determining an outcome for the play of the game, and/or causing the gaming system to provide any awards based at least in part on the determined outcome in the play of the game.

In another example, the one or more depth image sensing devices may include at least one IR light source. In another example, the one or more depth image sensing devices may include at least one CMOS sensor. In another example, the one or more depth image sensing devices may include at least one light source and at least one image sensor. In one example, the determined outcome may be based at least in part on the determined player input. In another example, the determined outcome may not be based at least in part on the determined player input. In one example, the detected body part is a hand. In another example, the displayed second screen displays a menu of options to the player.

In one embodiment, the method of determining a player input via an electronic gaming system may include one or more of determining a wager placed by a player of the electronic gaming system, causing the at least one display device to display a first screen, detecting a body part of the player, identifying the detected body part, detecting a movement (e.g., 2D, 3D, and/or both) of the detected body part, correlating the detected movement and the identified body part to one of a plurality of reference models, determining a player input based on the correlated reference model, determining a second screen to display based at least in part on the determined player input, causing the at least one display device to display the second screen, determining an outcome for the play of the game, and/or causing the gaming system to provide any awards based at least in part on the determined outcome in the play of the game.

In one example, the determined second screen may include a bonus game. In another example, the displayed first screen may include a plurality of selections, which are selectable by the player. In one example, the displayed first screen may include a plurality of video reels. In another example, the determined outcome may be based at least in part on the determined player input. The detected body part may be a hand. In one example, the displayed second screen may include at least one characteristic of the detected body part.

In another embodiment, the electronic gaming system may include a plurality of electronic gaming machines, at least one community display device, a communication network connecting the plurality of electronic gaming machines with the at least one community display device, one or more depth image sensing devices, at least one memory device, and/or at least one processor. The one or more processors may receive a plurality of instructions from the at least one memory device, which when executed by the at least one processor, may cause the at least one processor to operate with the at least one community display device and the one or more depth image sensing devices.

The system may cause the at least one community display device to display a first screen in association with a play of a community game. The system may detect a first body part of a first player, detect a second body part of a second player, identify the detected first and second body parts, detect a first movement (e.g., 2D, 3D, and/or both) of the detected first body part, detect a second movement (e.g., 2D, 3D, and/or both) of the detected second body part, correlate the detected first movement and the identified first body part to a first one of a plurality of reference models, correlate the detected second movement and the identified second body part to a different second one of the plurality of reference models, determine a first player input based on the correlated first reference model, determine a second player input based on the correlated second reference model, determine a second screen to display in association with the play of the community game, wherein the determined second screen may be based at least in part on the determined first and second player inputs, cause the at least one community display device to display the second screen, determine an outcome for the play of the community game, cause a first electronic gaming machine of the plurality of electronic gaming machines to provide any awards based at least in part on the determined outcome of the play of the community game, and/or cause a second electronic gaming machine of the plurality of electronic gaming machines to provide any awards based at least in part on the determined outcome of the play of the community game.

In another example, the determined outcome of the community game may be based at least in part on the determined first and second inputs. The determined first input may affect the determination of the determined second input. The determined first input may allocate a selection to the first player and prevent the allocated selection from further selection. In another example, the displayed second screen may include at least one first characteristic based on the detected first body part and at least one second characteristic based on the detected second body part.

Figure 20:
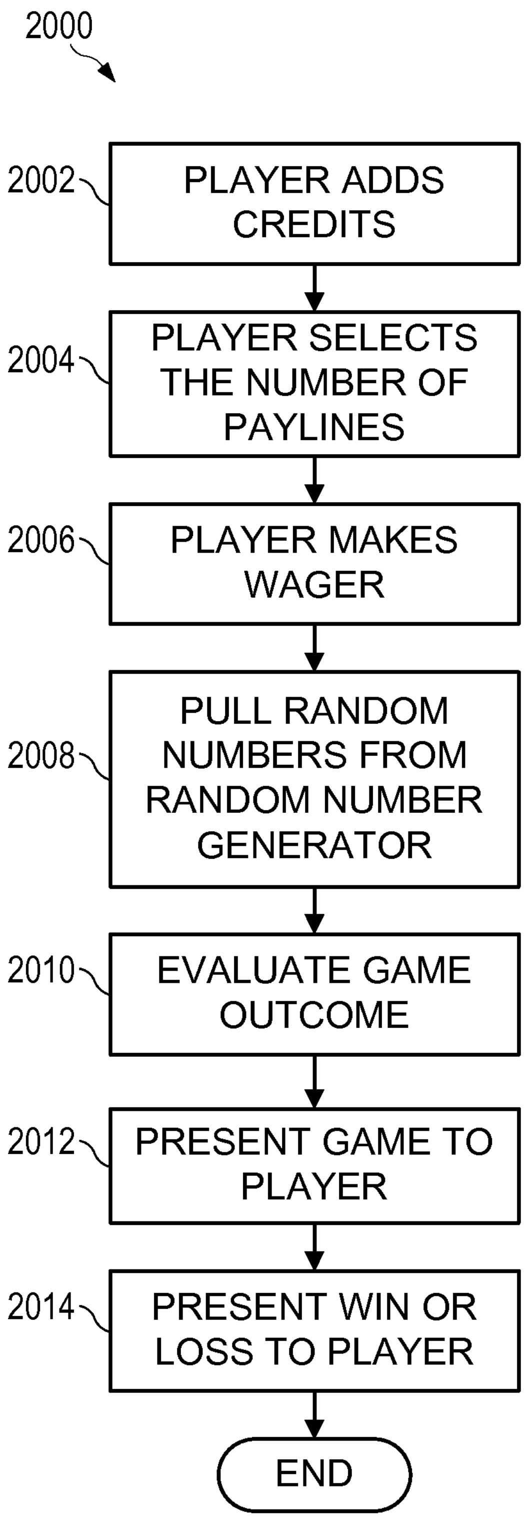
FIG. 20 is a flow diagram for game play, according to one embodiment.

In FIG. 20, a process flowchart of one example of a primary game play 2000 on an electronic gaming system is shown, according to one embodiment. The method may include the step of a player adding credit to the electronic gaming system (step 2002). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 2004, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 2006, the player makes a wager on the game. In one embodiment, the wager may be a multiple of the number of paylines selected at step 2004. In another embodiment, the wager may not be a multiple of the number of paylines selected at step 2004. In a further embodiment, the wager may include a side-wager (e.g., ante bet), which may, in one example of such an embodiment, be used to make the player eligible to be awarded the extra functionality discussed above. It should be appreciated that in some embodiments, the order of steps 2004 and 2006 may be not critical, and so for example, a player can select the wager they wish to place, and then select the number of paylines they want it applied to, and that these embodiments are expressly contemplated as being within the scope of the present disclosure.

Continuing to step 2008, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 2010 and 2012, the gaming system utilizes the random numbers pulled at step 2008 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 2014, the win or loss outcome may be identified for the player. In one embodiment, this step can include additional messaging, which provides information related to the win or loss, such as why the player won or lost. In another embodiment, this step can include identification of the amount of any award earned by the player.

Figure 21:
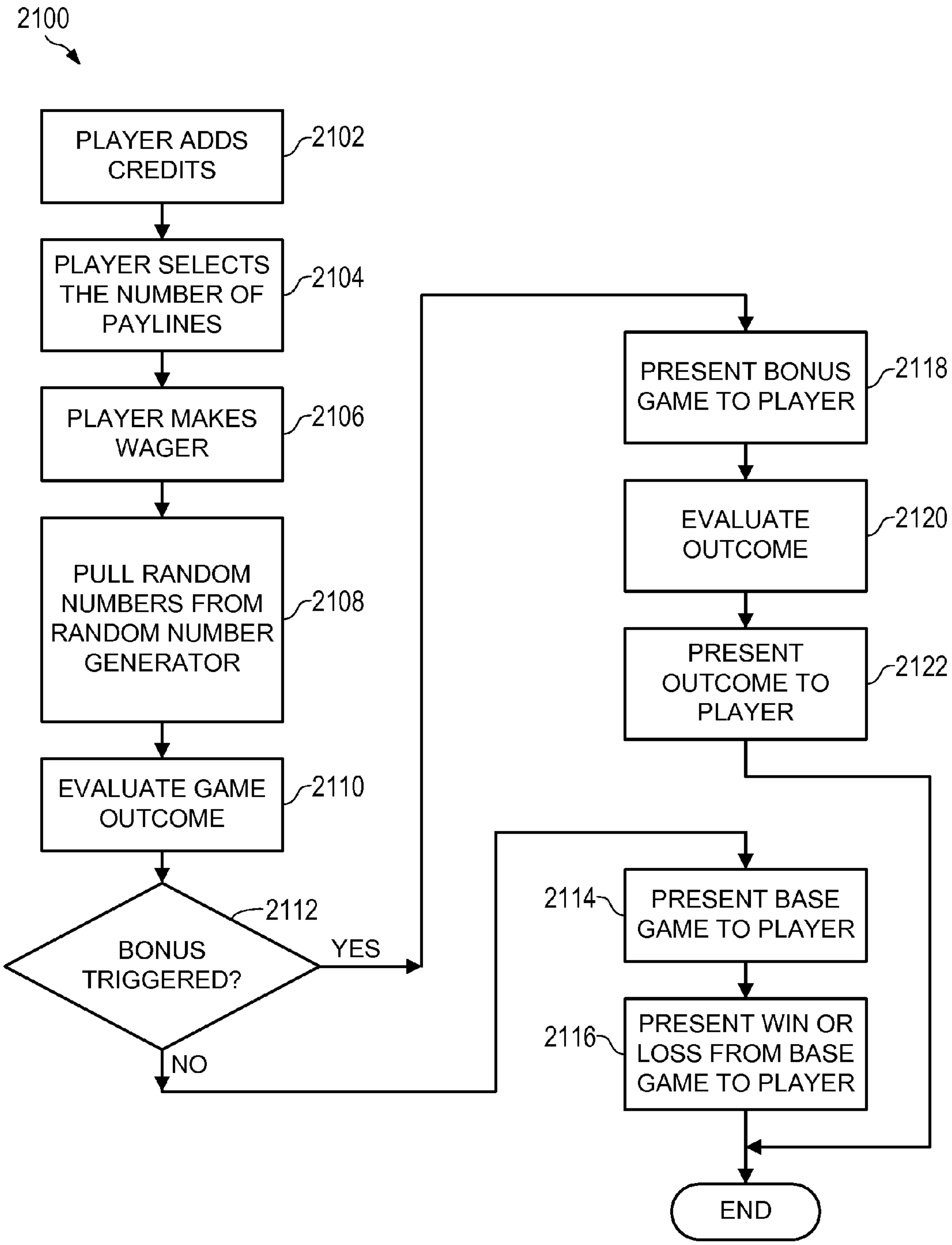
FIG. 21 is a flow diagram for game play, according to one embodiment.

FIG. 21 is a process flowchart of one example of a combined primary and secondary game play 2100 on an electronic gaming system, according to one embodiment. The method may include the step of a player adding credit to the electronic gaming system (step 2102). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 2104, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 2106, the player makes a wager on the game. In one embodiment, the wager may be a multiple of the number of paylines selected at step 2104. In another embodiment, the wager may not be a multiple of the number of paylines selected at step 2104. In a further embodiment, the wager may include a side-wager, which may, in one example of such an embodiment, be used to make the player eligible to be awarded the extra functionality discussed above. It should be appreciated that in some embodiments, the order of steps 2104 and 2106 may be not critical, and so for example, a player can select the wager they wish to place, and then select the number of paylines they want it applied to, and that these embodiments may be expressly contemplated as being within the scope of the present disclosure.

Continuing to step 2108, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 2110, the gaming system utilizes the random numbers pulled at step 2108 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 2112, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the $2^{nd}$, $3^{rd}$ and $4^{th}$ reel. In another example, the bonus game may be triggered if matching symbols are displayed on the $1^{st}$, $2^{nd}$ and $3^{rd}$ reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 2114, where the base game may be fully presented to the player. As discussed above, the orders of step 2110, 2112, and 2114 can be changed without affecting the novel concepts disclosed herein.

At step 2116, the win or loss outcome of the primary game may be identified for the player. In one embodiment, this step can include additional messaging, which provides information related to the win or loss, such as why the player won or lost. In another embodiment, this step can include identification of the amount of any award earned by the player If it is determined at step 2112 that a bonus or secondary game was triggered, then process 2100 continues to step 2118, where the secondary game may be presented to the player. As discussed above, there are numerous ways to present the secondary or bonus game to the player.

At steps 2120 and 2122, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player. In one embodiment, instead of the process 2100 ending after step 2122, the process continues to step 2114 so as to finalize the primary game outcome presentation to the player.

Figure 22:
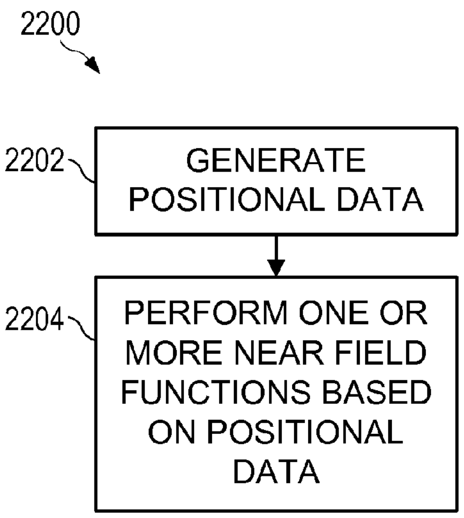
FIG. 22 is a flow diagram, according to one embodiment.

In FIG. 22, a flow diagram is shown, according to one embodiment. The method may include generate positional data (step 2202) via one or more near field sensor, far field sensors, GPS, and/or any other positional system. The method may include performing one or more near field functions based on the positional data (step 2204).

Figure 23:
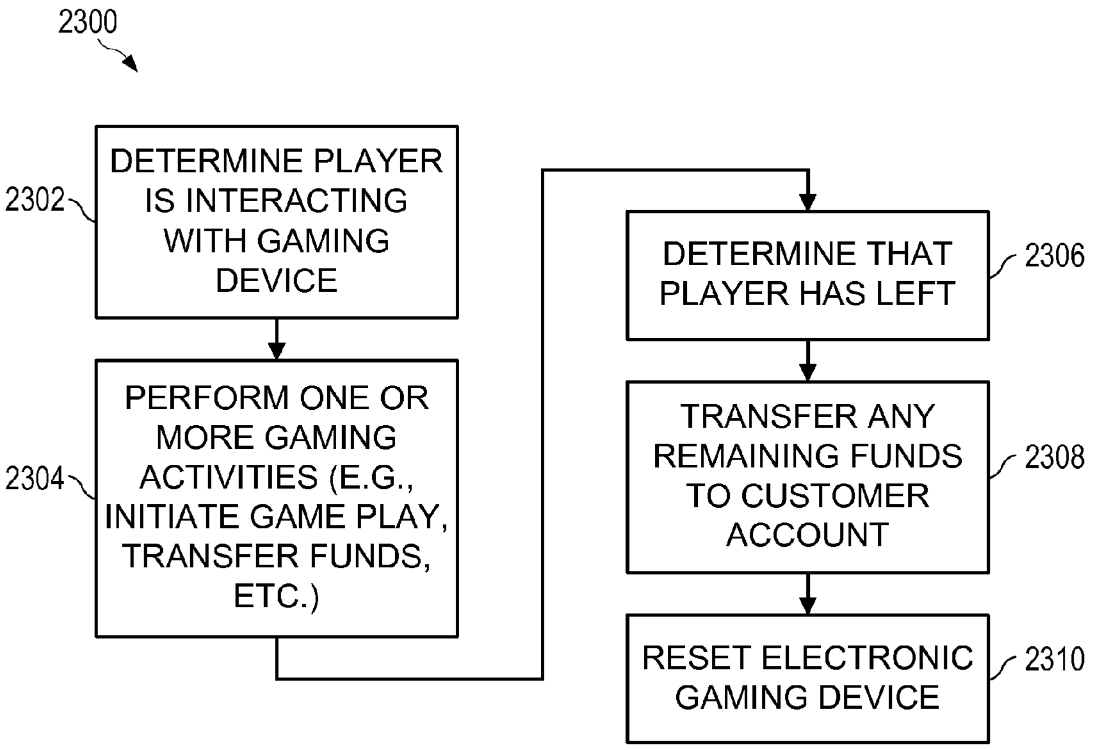
FIG. 23 is a flow diagram, according to one embodiment.

In FIG. 23, a flow diagram is shown, according to one embodiment.

The method may include determining that the player is interacting with the gaming device (step 2302). The method may include performing one or more gaming activities (e.g., initiating game play, transferring funds, etc.) (step 2304). The method may include determining that the player has left the gaming device (step 2306). The method may include transferring any remaining funds to the player's account (step 2308). The method may include resetting the electronic gaming device (step 2310).

Figure 24:
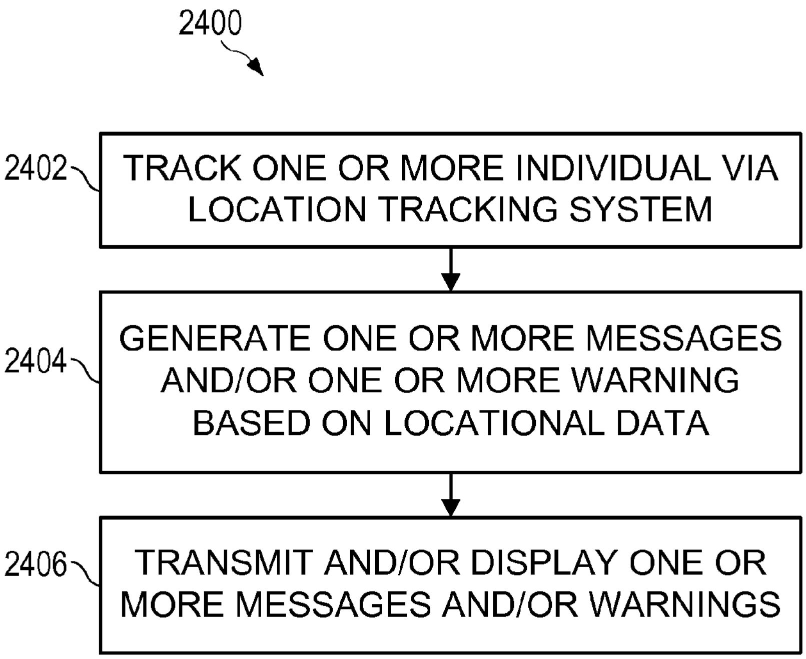
FIG. 24 is a flow diagram, according to one embodiment.

In FIG. 24, a flow diagram is shown, according to one embodiment. The method may include tracking one or more individuals via a location tracking system (step 2402). The method may include generating one or more messages and/or one or more warnings based on the locational data (step 2404). The method may include transmitting and/or displaying one or more messages and/or warnings (step 2406).

Figure 25:
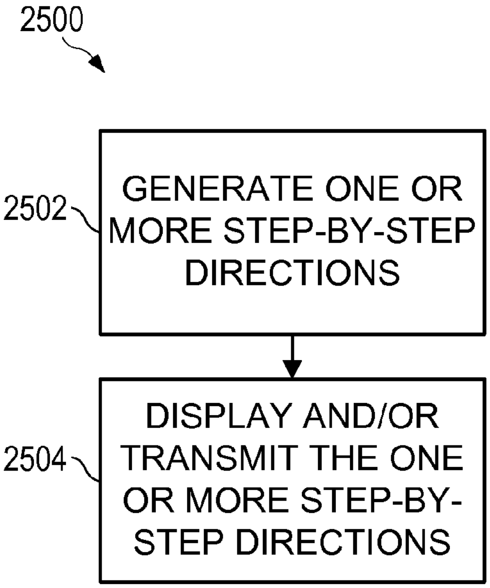
FIG. 25 is a flow diagram, according to one embodiment.

In FIG. 25, a flow diagram is shown, according to one embodiment.

The method may include generating one or more step-by-step directions (step 2502). The method may include displaying and/or transmitting the one or more step-by-step directions (step 2504).

In one example, one or more data points (e.g., programming data, updates, etc.) may be transferred from a first electronic gaming device to an Nth electronic gaming device via one or more near field devices. Therefore, a programmer may only need to update one machine which then this update machine may update one or more other electronic devices via one or more near field devices. Further, one or more credit amounts may be transferred from a first electronic gaming device to an Nth electronic gaming device via one or more near field devices.

In one example, a new method of player tracking utilizing wristbands and near field communication may be employed. For example, using Near Field Communication technology (NFC), an NFC tag may be embedded into a wristband and tag readers into any machines which would make use of the bands. This wristband is then given to the player rather than a traditional player loyalty card. All a player must do now is bring their hand close to a machine's button panel or screen, as they would do normally to play any game, to have it recognize them and perform any other desired actions just as if they had inserted a card, such as cashing in. When they are done, all they have to do is walk away. The machine can then recognize this as well and take any desired actions. This provides multiple benefits over a traditional card. It is one less step for the player as it tracks them based on the natural actions of moving their hand to the play area, and walking away when done. Since it is worn on the wrist it would prevent a player from accidentally dropping or losing it as easily as a traditional card, as well as being more difficult to steal over a traditional card. The wristbands themselves may then be branded, which could catch the attention of other potential customers as it is out in the open, bringing in more business for the casino In one embodiment, the electronic gaming device may include a plurality of reels where the plurality of reels including one or more areas, a memory which may include one or more near field modules, and a processor which may generate one or more symbols to be located in the one or more areas. Further, the processor may initiate one or more game play functions based on location data.

In another example, the processor may transfer credits based on the location data. Further, the processor may start game play based on at least one of location data and a near field device movement. In addition, the processor may reconfigure the electronic gaming device. In one example, the processor may initiate an attraction mode presentation. In addition, the processor may generate one or more advertising messages. Further, the processor may stop game play based on the location data. In addition, the processor may transfer a player's credits to a player account based on a game play stoppage. In one example, the processor may generate one or more status updates. Further, the one or more status updates may include a current bet update, a friend update, and/or a family member update.

In another embodiment, the method of providing game play via an electronic mobile device may include generating one or more location data and initiating one or more game play functions based on location data.

In another example, the method may include transferring credits based on the location data; starting game play based on at least one of location data and a near field device movement; reconfiguring the electronic gaming device; initiating an attraction mode presentation; and/or stopping game play based on the location data.

In another embodiment, the electronic gaming system may include a server including a server processor and a server memory and a display device including a plurality of reels, the plurality of reels including one or more areas. The server memory may include one or more near field structures. The server processor may generate one or more symbols to be located in the one or more areas. The server processor may initiate one or more game play functions based on location data.

In another example, the server processor may transfer credits based on the location data, start game play based on at least one of location data and a near field device movement, and/or reconfigure the electronic gaming device.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed. Further, one or more gaming options may be Internet based gaming options. Therefore, all of the examples and/or embodiments may be utilized via an Internet based gaming system.

The invention claimed is:

1. A gaming machine comprising:

at least one display device;

at least one player input device configured to receive input from a player;

at least one sensor configured to detect a signal transmitted from a mobile device of said player when said player is within a predetermined distance from said gaming machine;

a credit device configured to accept an physical item associated with a monetary value to increase a credit balance at the gaming machine;

a memory device;

a controller; and machine-readable code executable by said controller to cause said controller to receive input from said player via said at least one player input device to initiate wagering game play and, in response thereto, to automatically present via said at least one display device game play for a plurality of wagering games without further input by said player to said gaming machine via said at least one player input device, so long as said player continues to be detected within the predetermined distance from said gaming machine by said at least one sensor; and machine-readable code executable by said controller to cause said controller to determine an outcome of said wagering games and, for winning outcomes having an associate award, increase said credit balance based upon said award.

2. The gaming machine in accordance with claim 1 wherein said mobile device comprises a wearable wristband.

3. The gaming machine in accordance with claim 1 wherein said signal comprises a player ID.

4. The gaming machine in accordance with claim 1 further comprising said controller receiving input from said player of a wager size for said wagering games and presenting each of said plurality of wagering games by automatically deducting said wager size from said credit balance.

5. The gaming machine in accordance with claim 1 wherein said input from said player comprises a detected movement of said mobile device in a defined manner.

6. The gaming machine in accordance with claim 1 wherein said mobile device comprises a near field communication tag worn by said player.

7. The gaming machine in accordance with claim 1 further comprising machine-readable code executable by said controller to cause said controller to suspend presentation of the game play for said plurality of wagering games when said at least one sensor no longer detects said identification signal.

* * * * *